United States Patent [19]
Le et al.

[11] Patent Number: 5,729,683
[45] Date of Patent: Mar. 17, 1998

[54] PROGRAMMING MEMORY DEVICES THROUGH THE PARALLEL PORT OF A COMPUTER SYSTEM

[75] Inventors: Hung Quang Le; Patrick R. Cooper, both of Houston, Tex.

[73] Assignee: Compaq Computer Corporation, Houston, Tex.

[21] Appl. No.: 444,068

[22] Filed: May 18, 1995

[51] Int. Cl.⁶ .................................................. G06F 13/12
[52] U.S. Cl. ..................... 395/200.01; 395/652; 395/712
[58] Field of Search ................. 364/514 R; 395/200.01, 395/200.02, 425, 430, 500, 700, 712, 200.09, 825, 427, 853, 652

[56] References Cited

U.S. PATENT DOCUMENTS

| | | | |
|---|---|---|---|
| 5,142,680 | 8/1992 | Ottman et al. | 395/700 |
| 5,195,130 | 3/1993 | Weiss et al. | 379/98 |
| 5,321,840 | 6/1994 | Ahlin et al. | 395/700 |
| 5,325,529 | 6/1994 | Brown et al. | 395/700 |
| 5,408,624 | 4/1995 | Raasch et al. | 395/700 |
| 5,430,877 | 7/1995 | Naylor | 395/700 |
| 5,495,593 | 2/1996 | Elmer et al. | 395/430 |

FOREIGN PATENT DOCUMENTS 43-07 413 A1  9/1993  Germany.

OTHER PUBLICATIONS

IBM Technical Disclosure Bulletin, "Remote Initial Program Load of a Diskless Computing Device Via a Standard Serial or Parallel Port", vol. 34, No. 10b, Mar. 1992, pp. 211–213.

IBM Technical Disclosure Bulletin, "Method for Downloading Firmware to RAM", vol. 33, No. 7, Dec. 1990, pp. 342–346.

S.L. Diamond, IEEE Micro, "A new parallel interface standard", vol. 14, No. 4, Aug. 1994, pp. 3, 78.

*Primary Examiner*—Hassan Kizou
*Attorney, Agent, or Firm*—Pravel, Hewitt, Kimball & Krieger

[57] ABSTRACT

A controller circuit that controls the transfer of a computer operating system from a host computer into a hand-held computer system through the parallel port without the need of intervention from the microprocessor. The operating system is loaded into flash memory devices located in the hand-held computer. The protocol used for the transfer is the IEEE 1284 bi-directional parallel port specification. To begin the transfer of data, the host computer performs a negotiation according to the 1284 standard with the hand-held computer. After the host computer has determined that the hand-held computer is 1284 compliant, it embeds two flash command bytes to indicate the type of command to be performed, selects the desired banks of flash memory, and selects the block in the flash memory. The commands that are performed include a write, a read array, a block erase, a read ID, a read status register, a clear status register, and a parallel port disable command. The controller circuit performs handshaking functions through the parallel port with the host computer, and it seizes control of the system data bus when a transfer is desired.

31 Claims, 26 Drawing Sheets

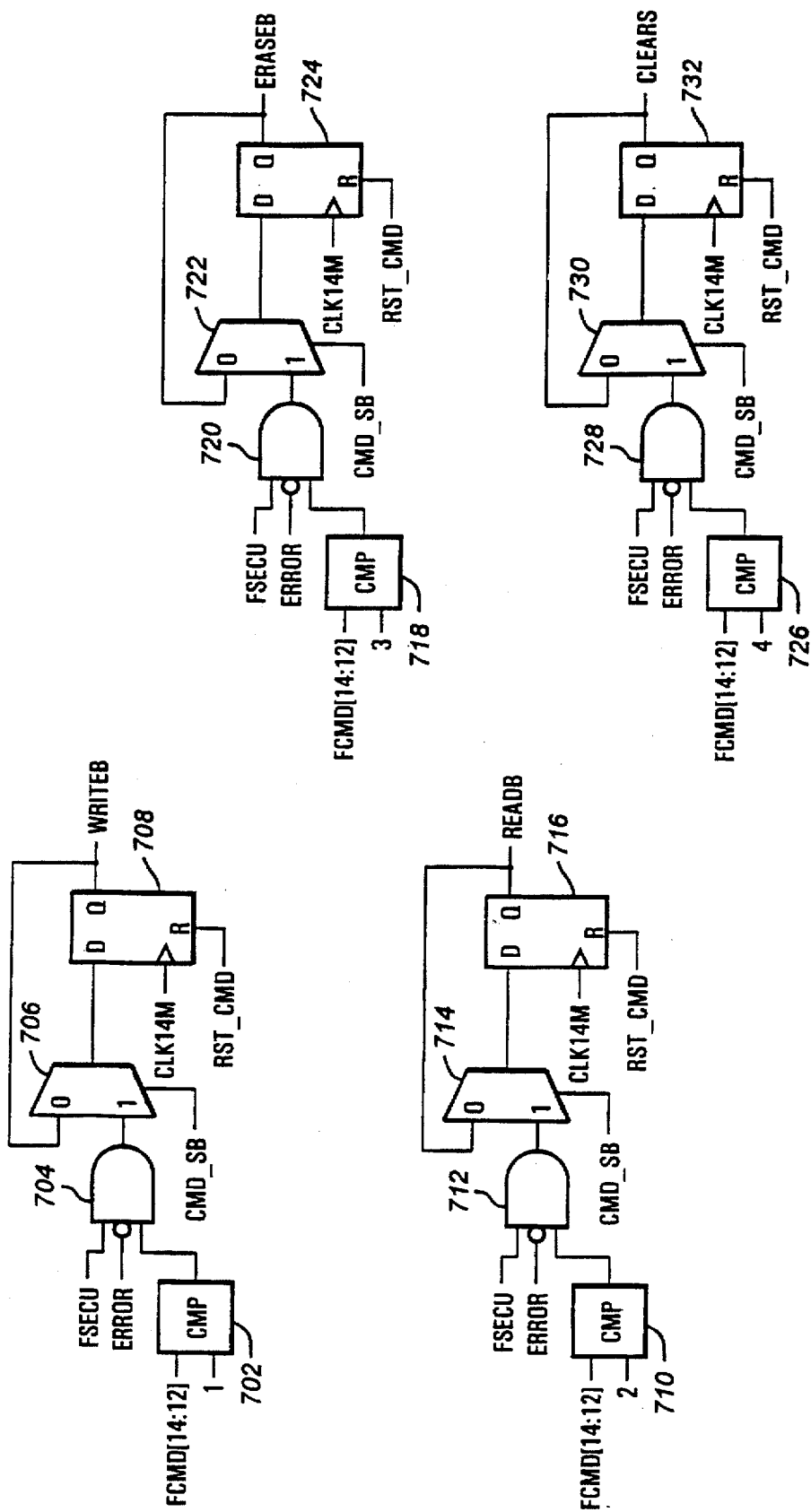

PROGRAMMING MEMORY DEVICES THROUGH THE PARALLEL PORT OF A COMPUTER SYSTEM

BACKGROUND OF THE INVENTION

1. Field of the Invention

The invention relates to the transfer of data through the parallel port of a computer system, and more particularly, to a technique of programming memory in the computer system through the parallel port.

2. Description of the Related Art

Modern computers are typically managed by a supervisory program called an operating system. In a computer system, several concurrent processes are usually competing for system resources, which include memory and I/O address space, DMA channels and interrupt levels. A basic function of the operating system is to schedule the processes and to assign the system resources to prevent a conflict from occurring. An operating system includes a large number of computer resource management programs, such as processor scheduling routines, virtual memory management routines, and I/O device control programs (device drivers). Commonly used utility programs, such as programming language translators and text editors, are often considered part of the operating system and are invoked by commands to the operating system. As a result of the large number of programs included as part of the operating system, only a portion of the operating system is stored in main memory continuously. This portion of the operating system, which is used the most frequently, is generally referred to as the kernel or nucleus. The remaining portions of the operating system are typically stored in secondary memory, such as the hard disk, and are loaded into main memory only when needed.

In hand-held computer systems, however, the operating system is usually stored in a flash EEPROM. Thus, during boot-up of the hand held computer system, the operating system is retrieved from the flash EEPROM and loaded into main memory. Several issues are encountered when using flash memory to store the operating system. The first of these issues relates to the method of programming the flash memory. Conventionally, a flash memory device is programmed using special equipment before they are soldered onto a system board. However, because several flash EEPROMs are required to store an entire operating system, it would be difficult to keep track of which flash memory device contains which portion of the operating system if the flash memory devices are programmed outside of the hand-held computer systems.

A second issue relates to reprogramming the flash memory devices once they have been soldered onto the system board. A new operating system may need to be reloaded if determined to be defective. Since the operating system controls the programming of the flash memory devices, a defective operating system may not be able to perform the appropriate functions to program the flash memory devices. In addition, the operating system may be entirely non-functional, which would render the entire hand-held computer system non-functional. In either case, the flash memory devices would have to be removed to be reprogrammed. However, removing soldered-down flash memory devices may cause permanent damage. Further, such removal is highly inefficient due to the time and labor involved. Therefore, it is desired that an alternative method of programming the flash memory devices be developed.

SUMMARY OF THE PRESENT INVENTION

The circuit according to the present invention controls the loading of an operating system into non-volatile memory through the parallel port of a computer system without the need for intervention by the system microprocessor. The parallel port is connected to an external computer, which communicates with the circuit to perform the transfer of data through the parallel port. In the preferred embodiment, the protocol used to transfer data through the parallel port is compatible with the IEEE 1284 specification. The external computer establishes a communications link with the circuit by performing a negotiation cycle. If the circuit responds by asserting the proper status lines, the external computer provides two flash command bytes to the parallel port. The flash command bytes indicate the type of command to be performed and the starting and ending banks of the flash memory. The flash command bytes also specify the block on which the command is to be performed. One of the commands that can be specified is the write command, which allows the external computer to load the desired data, such as an entire operating system program, into the flash memory devices. Other commands include a read array command, a read status register command, a read identifier command, a clear status register command, and a parallel port disable command. Upon receipt of the flash command bytes, the circuit seizes control of the system bus. The circuit then performs a transfer of data according to the command requested. For the write operation, the data are loaded into the circuit one byte at a time and written to the flash memory devices via the system bus. The circuit thus allows a new operating system to be loaded into the non-volatile memory without the need for intervention by the microprocessor.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
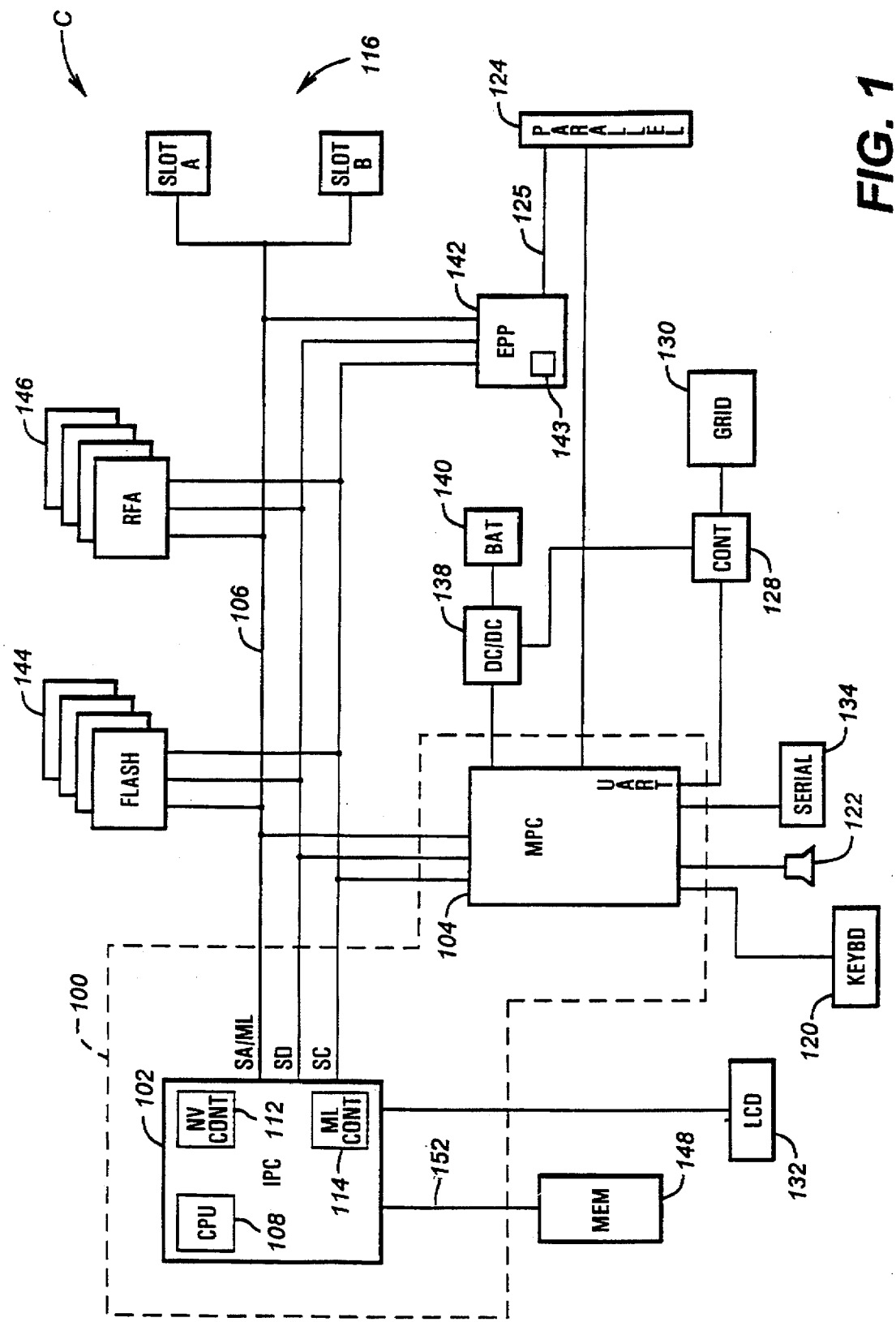
FIG. 1 is a block diagram of a hand-held computer system according to the preferred embodiment of the present invention.

Referring now to FIG. 1, an exemplary hand-held computer system C according to the preferred embodiment of the present invention is shown. A central processing chipset 100, which includes an integrated processor controller (IPC) 102 and a multiple peripheral controller (MPC) 104, is connected to a system bus 106 having a data bus SD, an address bus SA and a control bus SC. The integrated processor controller or IPC 102 includes a CPU 108, preferably a 32-bit 386SL microprocessor from Intel Corporation. The CPU 108 can be operated at 3.3 volts for low power consumption or at 5 volts for higher performance. As the preferred embodiment of the computer system C is a hand-held system, the CPU 108 and the rest of the system is powered at 3.3 volts for maximum power efficiency. The IPC 102 also includes a non-volatile memory controller 112, as well as an ML bus controller 114 to interface with PCMCIA slot controllers 116, which are connected to the ML bus. The ML bus and system address bus SA are multiplexed on the same physical lines to save routing space. The IPC 102 also contains a video controller for controlling an LCD display (not shown) connected through an LCD connector 132.

A bank of memory 148 is connected to the IPC 102 via a memory bus 152. The bank of memory 148, preferably implemented with 2 Mbytes of DRAM chips, is used as both main and video memory.

The multiple peripheral controller or MPC 104 is also connected to the system bus 106. The MPC 104 provides an interface to a parallel port 124, a serial port 134, a keyboard 120 and a speaker 122. The MPC 104 includes a real-time clock (RTC), which provides various real-time clock functions, and an extended CMOS memory to provide storage for various system configuration information.

The hand-held computer system C utilizes a pen as the primary input device. A digitizer grid 130 is used to interface the pen to an auxiliary microcontroller 128, which is connected to the MPC 104 via a serial link into a special UART input of the MPC 104. The auxiliary microcontroller 128 is also connected to a DC/DC power converter 138. The auxiliary microcontroller 128 is used for such other functions as battery charge control and termination, and power supply control and supervision. The DC/DC converter 138 is connected between the MPC 104 and a battery 140.

An enhanced parallel port (EPP) controller 142 according to the present invention is connected between the parallel port 124 and the system bus 106. The EPP controller 142 is connected to the parallel port 124 via a parallel port bus 125, which includes a parallel port data bus PD[7:0] and status signals. The EPP controller 142 is used to control transfer of data between the parallel port 124 and an external host device (not shown) connected to the parallel port 124. In the preferred embodiment an external host computer is utilized, but other devices could be utilized. The data is transferred between the host computer and the hand-held computer system C according to the Enhanced Parallel Port (EPP) communications protocol described in the IEEE 1284 specification, *Standard Signaling Method for a Bi-directional Parallel Peripheral Interface for Personal Computers*, IEEE STD 1284-XXXX (Feb. 1, 1993), which is hereby incorporated by reference. The EPP controller 142 can be used with either bi-directional or uni-directional parallel ports.

The EPP controller 142 includes a mode register 143. The mode register 143 indicates one of three modes: a hardware mode, a software slave mode, and a software master mode. In the hardware mode, which is indicated by a signal HW_MODE being asserted high, the transfer of data between the host computer and the hand-held computer system C is controlled exclusively by the EPP controller 142. In software slave mode, which is indicated by a signal SW_SLAVE being asserted high, the transfer of data between the host computer and the hand-held computer system C is controlled by software. The software master mode allows the EPP controller 142 to communicate with another hand-held computer system C, as long as that other system is in software slave mode.

The hand-held computer system C also includes two banks (banks 0 and 1) of flash EEPROMs 144 to store the operating system. The total size of the flash EEPROMs 144 is preferably 4 Megabytes (MB), implemented with 4 1M×8 flash EEPROM chips. Thus, each bank of the flash EEPROMs 144 contains two 1M×8 flash memory chips. Additional storage capacity in the form of a resident flash array (RFA) 146 is also provided with the computer system C. The RFA 146 is also implemented with two banks (banks 2 and 3) of flash EEPROMs, which are connected to the system bus 106. The RFA 146 is used as a mass storage device for storage of system and user data. The total capacity of the RFA 146 is preferably 4 MB, although additional flash memory devices can be added to increase the storage capacity to 12 MB. Furthermore, the RFA 146 is also expandable with flash memory cards inserted through the PCMCIA slots 116.

A brief description of IEEE 1284 status signals provided through the parallel port 124 is provided here to assist the understanding of the operations of the EPP controller 142. The EPP controller 142 is assumed to be in EPP mode for this description. A signal NSTROBE is used to denote an address or data read or write operation between the host and a peripheral device such as the hand-held computer system C in the case of the preferred embodiment. If the signal NSTROBE is asserted low, then a write is indicated; if high, a read is indicated. Address and data signals are transferred through a parallel port data bus PD[7:0]. A signal NACK is used by the hand-held computer system C to interrupt the host computer. The rising edge of the signal NACK causes the interrupt. A signal BUSY is used by the hand-held computer system C to notify the host computer that a data or address transfer has been completed and that the hand-held computer C is ready for the next cycle. A signal NAUTOFD, when asserted low by the host computer, denotes that a data cycle is taking place. A signal NINIT, when asserted low by the host computer, initiates a termination cycle to return the EPP controller 142 to the compatible mode, which is an IEEE 1284 mode in which the host to peripheral communication is done via the traditional uni-directional interface. As will be discussed below, asserting the signal NINIT causes the EPP controller 142 to exit from the EPP mode, thereby halting the data transfer between the host computer and the hand-held computer system C. A signal NSELECTIN, when asserted low by the host computer, denotes an address cycle.

To communicate with the hand-held computer system C, an IEEE 1284 compliant host computer first enters into a negotiation cycle with the hand-held computer system C. The host computer verifies that the hand-held computer system C is IEEE 1284 compliant by monitoring signals PERROR and NFAULT through the parallel port 124, which must both be at logic high levels. After verifying that the hand-held computer system C is IEEE 1284 compliant, the host computer requests one of a plurality of communications modes provided by the IEEE 1284 specification, which includes the EPP mode. The EPP mode is requested by placing an extensibility value of 0×40 on the parallel port data bus PD[7:0] at the beginning of the negotiation phase. The EPP mode provides asymmetric bi-directional data transfers between the host computer and the hand-held computer system C. For a more detailed description of the EPP communications mode, refer to the IEEE 1284 Specification.

In the preferred embodiment, during the negotiation cycle with the EPP controller 142, the host computer provides additional information to the EPP controller 142 without violating the IEEE 1284 standard. The additional information preferably consists of two flash command bytes, which include a starting bank number, a block number, the type of command cycle to be performed on the flash EEPROMs 144 or 146, and an ending bank number. The starting and ending bank numbers refer to which bank or banks of the flash EEPROMs 144 and 146 are to be accessed. The block number designates the particular block in each of the flash EEPROMs 144 or 146 on which the specified command is to be performed.

After the negotiation cycle is completed, the EPP controller 142 issues a boundary scan tristate cycle on the system bus 106 to seize control of the system bus 106. Until the EPP controller 142 obtains control of the system bus 106, it blocks all transfers from the host computer by not responding to any read or write requests. Once the boundary scan tristate cycle has completed, the EPP controller 142 accepts transfer requests from the host computer. Communications between the EPP controller 142 and the flash EEPROMs 144 and 146 are accomplished over the system data bus SD and address bus SA, as well as other control signals. The control signals include four chip select signals CS0*–CS3*, a read signal MEMRD, a write signal MEMWR*, and a signal VPP_SW that causes the DC/DC converter 138 to activate the 12-volt VPP inputs of the flash EEPROMs 144 or 146 for erasing or programming.

Figure 2A:
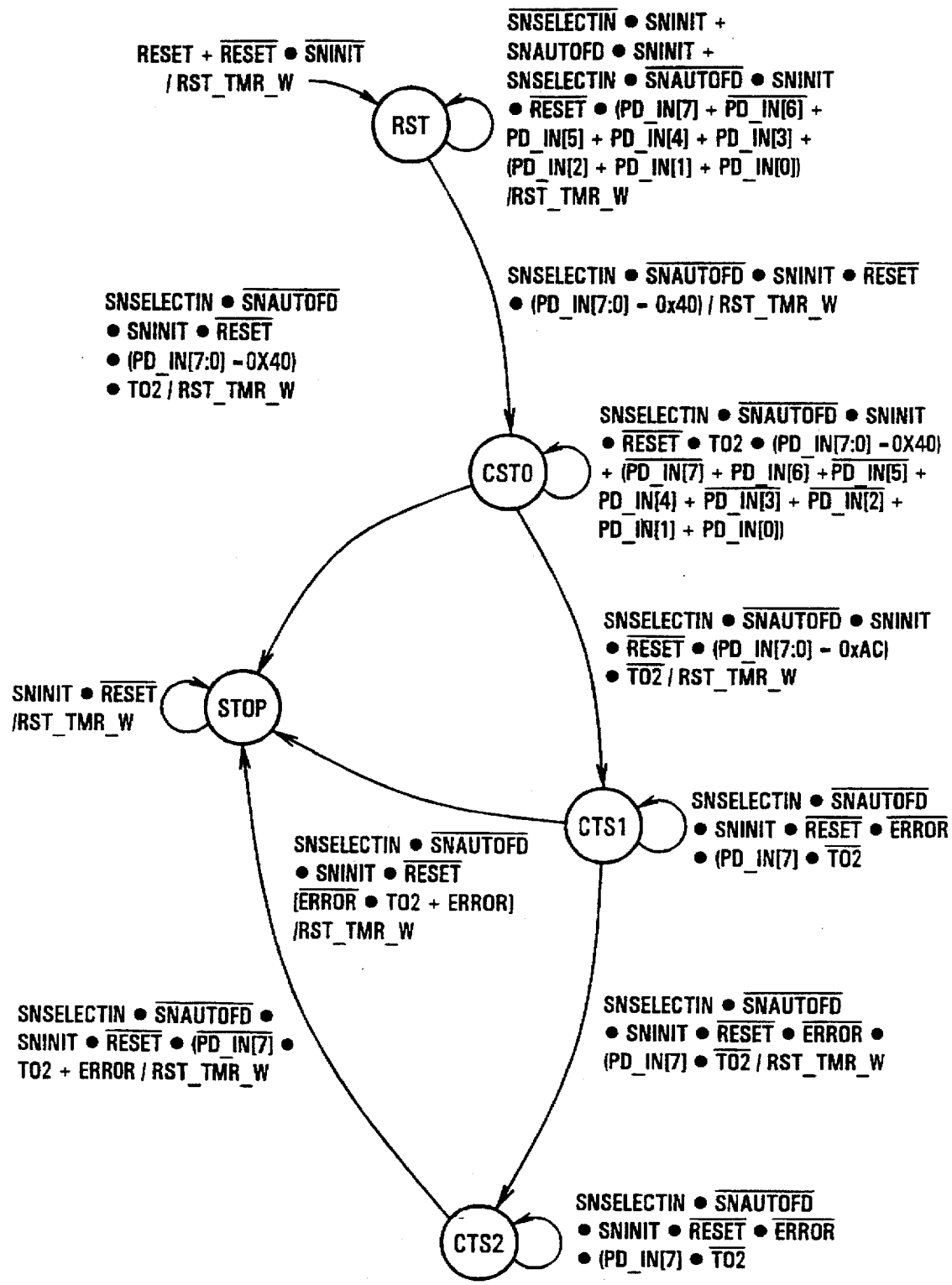
FIGS. 2A and 2B are a state diagram of a state machine that controls the capture of flash command bytes through the parallel port of the computer system of FIG. 1.
Figure 2B:
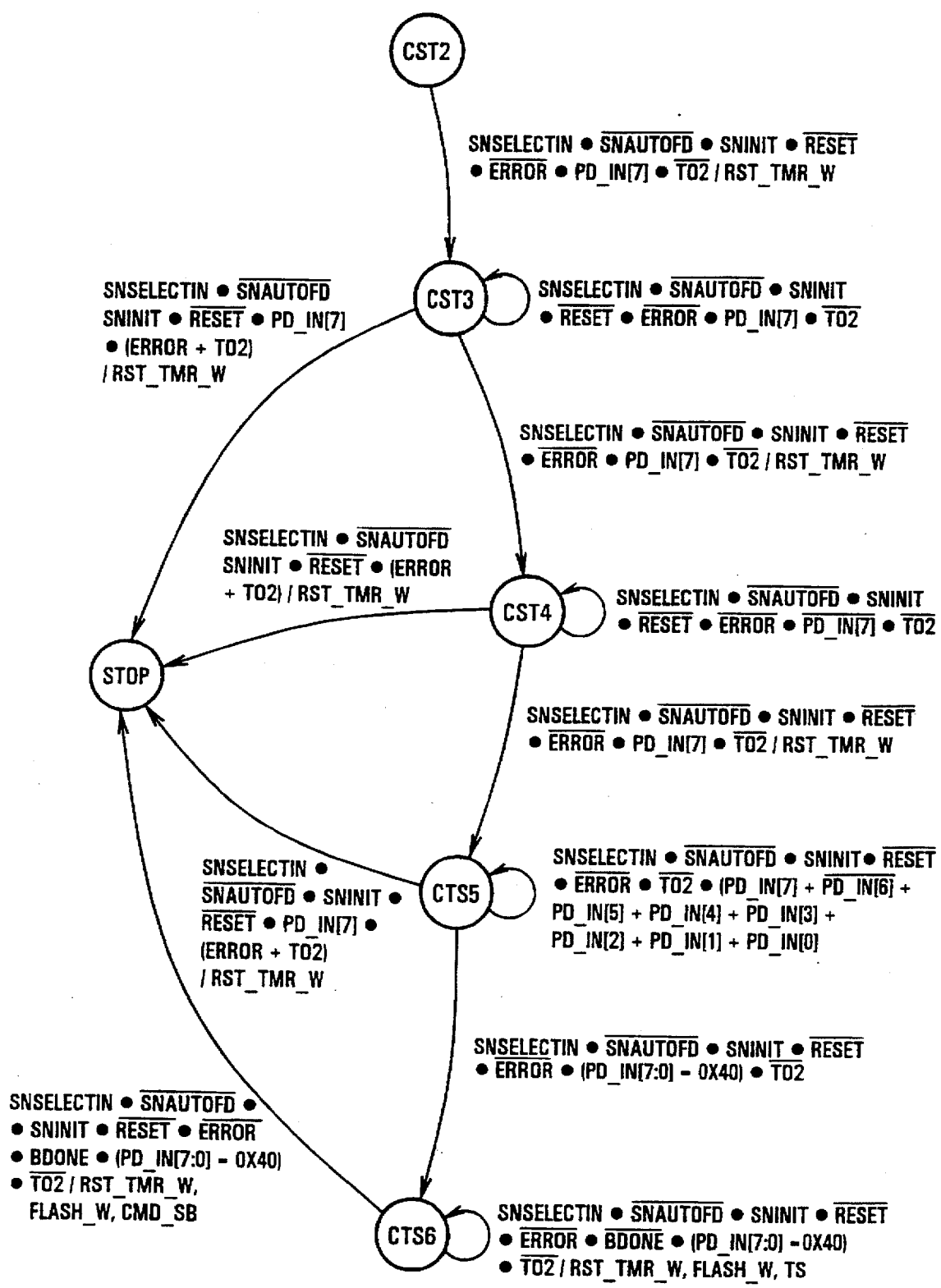

Referring now to FIGS. 2A and 2B, a state diagram is shown of a state machine FSTATE in the EPP controller 142 that controls the capture of the flash command bytes provided by the host computer. The inputs to the state machine FSTATE are state signals FSTATE[3:0] and signals SNSELECTIN, SNAUTOFD, SNINIT, RESET, ERROR, BDONE, PD_IN[7:0] and TO2. The outputs of the state machine FSTATE are state signals FSTATE_D[3:0] and signals RST_TMR_W, FLASH_W, TS and CMD_SB.

Figure 3:
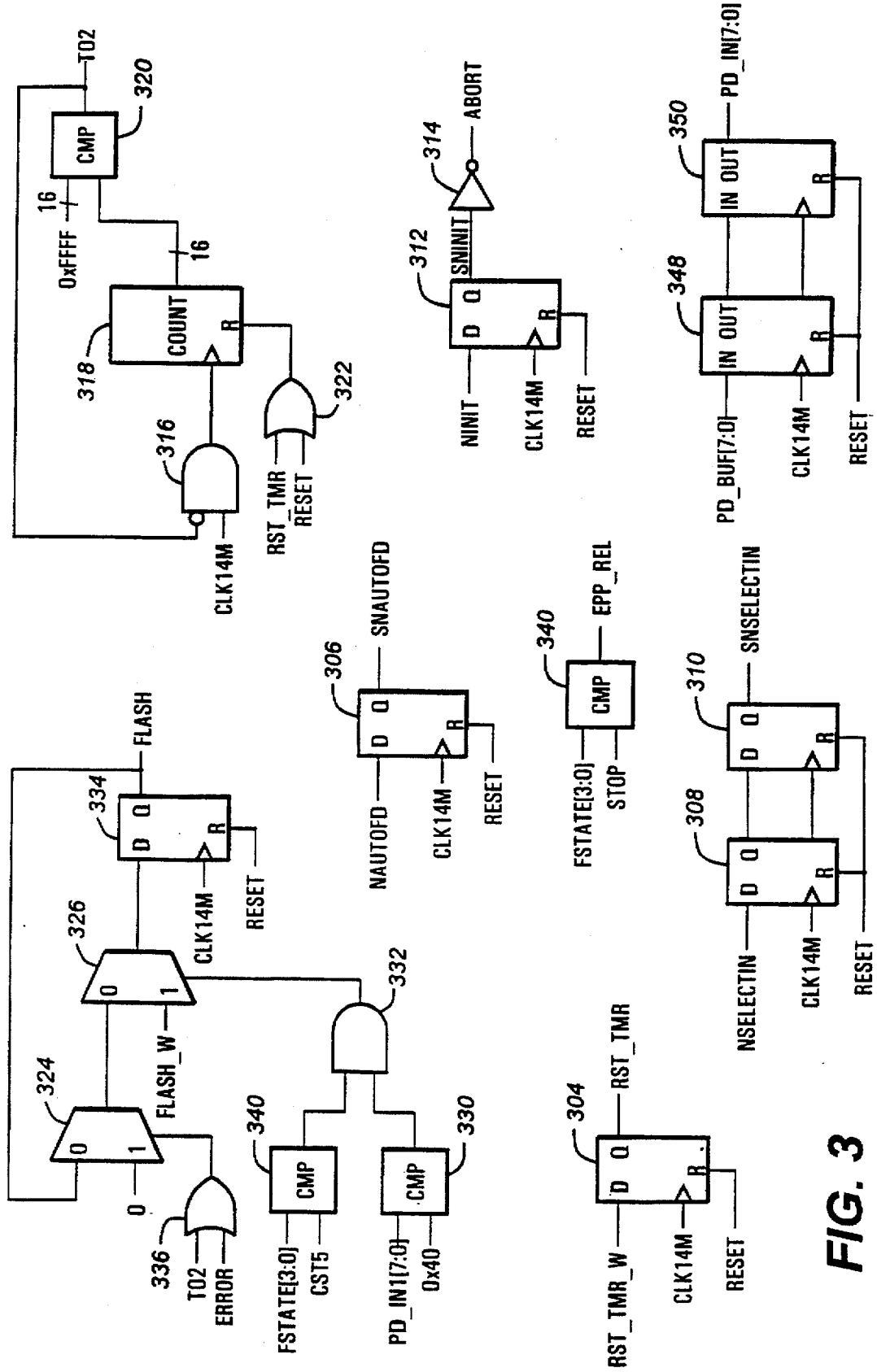
FIG. 3 is a logic diagram of circuitry that interfaces with signals provided to and by the state machine of FIGS. 2A and 2B.

Referring now to FIG. 3, logic used to interface with the signals provided by and to the state machine FSTATE is shown. The parallel port data bus PD[7:0] is provided to input buffers (not shown) in the EPP controller 142. The buffered signals are represented as signals PD_BUF[7:0]. The buffered parallel port data input signals PD_BUF[7:0] are double buffered through two registers 348 and 350 to generate latched data inputs PD_IN[7:0]. The registers 348 and 350 are clocked on the rising edge of CLK14M, a 14 MHz clock signal, and reset by the signal RESET. The data provided by the host computer onto the parallel port data bus PD[7:0] is asynchronous to the clock CLK14M, and thus must be double buffered to ensure that the EPP controller 142 receives valid data from the host computer.

The signal SNAUTOFD is provided by a D flip-flop 306, whose D input is connected to the parallel port status signal NAUTOFD. The signal SNSELECTIN is provided by a D flip-flop 310, whose input is connected to the output of another D flip-flop 308. The D input of the D flip-flop 308 is connected to the parallel port status signal NSELECTIN. The signal SNINIT is provided by a D flip-flop 312, whose D input is connected to the parallel port status signal NINIT. The D flip-flops 306, 308, 310 and 312 are all clocked by CLK14M. All of the D flip-flops 306, 308, 310 and 312 are reset on the rising edge of the system reset signal RESET. The parallel port signals NSELECTIN, NINIT, and NAUTOFD are latched through the D flip-flops to synchronize them to the clock CLK14M.

The signal SNINIT is connected to the input of an inverter 314, which drives a signal ABORT. As discussed above, the parallel port status signal NINIT, when asserted low, initiates a termination cycle. This causes the signal SNINIT to be asserted low, and the signal ABORT to be asserted high, on the next rising edge of the clock CLK14M.

The timeout signal TO2 is provided by a comparator 320, which compares the output of a counter 318 with the value 0×FFFF. The timeout signal TO2 is asserted high whenever the counter 318 counts to the value 0×FFFF. The clock input of the counter 318 is connected to the output of an AND gate 316. The first input of the AND gate 316 is connected to the clock CLK14M and its second input is connected to the inverted state of the timeout signal TO2. Thus, once the timeout signal TO2 is asserted high when the counter 318 reaches the value 0×FFFF, the clock input of the counter 318 is disabled, thereby maintaining the signal TO2 high. The reset input of the counter 318 is connected to the output of an OR gate 322, whose inputs are connected to a signal RST_TMR and the system reset signal RESET. When either of these signals is asserted high, the counter 318 is reset to the value 0.

The signal FLASH_W is provided by the state machine FSTATE to the 1 input of a multiplexor 326, whose output is connected to the D input of a D flip-flop 334. The 0 input of the multiplexor 326 is connected to the output of a multiplexor 324. The output of the D flip-flop 334 is connected to a signal FLASH, which is connected to the 0 input of the multiplexor 324. The signal FLASH indicates to the other portions of the EPP controller 142 that the flash EEPROMs 144 or 146 are being accessed through the parallel port 124. The 1 input of the multiplexor 324 is tied low. The select input of the multiplexor 326 is connected to the output of an AND gate 332, whose inputs are connected to the output of a comparator 328 and the output of a comparator 330. If the state machine FSTATE is in state CST5 and the parallel port data inputs PD_IN[7:0] contain the value 0×40, then the AND gate 332 causes the multiplexor 326 to select the signal FLASH_W to latch into the D flip-flop 334. Otherwise, the multiplexor 326 selects the output of the multiplexor 324, whose select input is connected to the output of an OR gate 336. The inputs of the OR gate 336 are connected to the timeout signal TO2 and the signal ERROR, which indicates that the flash command bytes latched by the EPP controller 142 are erroneous. If either of the signals TO2 or ERROR is asserted high, the multiplexor 324 selects the value 0. Otherwise the output of the D flip-flop 334 is selected. Thus, if the state machine FSTATE is in state CST5 and the value of the parallel port bus PD_IN[7:0] contains the value 0×40, then the signal FLASH_W is latched into the D flip-flop 334. Otherwise, the signal FLASH is deasserted low if either the signal TO2 or ERROR is asserted high and remains unchanged otherwise.

The signal RST_TMR_W is connected to the D input of a D flip-flop 304, which is clocked by the clock CLK14M. The output of the D flip-flop 304 is connected to the signal RST_TMR, which when asserted resets the counter 318. The D flip-flop 304 is reset by the signal RESET.

Returning now to FIG. 2A, the state machine FSTATE enters into state RST from any other state if the signal RESET is asserted high or if the signal RESET is deasserted low and the signal SNINIT is asserted low. In state RST, the signal RST_TMR_W is asserted high. The state machine FSTATE transitions from state RST to state CST0 if the following condition is true: the signals SNSELECTIN and SNINIT are high, the signals SNAUTOFD and RESET are low and the data inputs PD_IN[7:0] contain the value 0×40. This condition represents the IEEE 1284 negotiation cycle, which is initiated by the host computer to request an EPP communications mode. On the transition from state RST to state CST0, the signal RST_TMR_W is asserted high while the remaining output signals of the state machine FSTATE are deasserted low. The signal RST_TMR_W is asserted high to reset the timeout counter 318.

In state CST0, if the states of the signals SNSELECTIN, SNAUTOFD, SNINIT, RESET and PD_IN[7:0] remain unchanged and the timeout signal TO2 transitions high to indicate that no activity has occurred in 64K (0×FFFF) CLK14M cycles, the state machine FSTATE transitions from state CST0 to state STOP. The state machine remains in state STOP until either the reset signal RESET is asserted high or the termination initiation signal SNINIT is asserted low, whereupon the state machine FSTATE transitions back to state RST. With the transition from state CST0 to state STOP, the signal RST_TMR_W is asserted high.

In the ensuing description of FIGS. 2A and 2B, the signals SNSELECTIN and SNINIT are assumed to be high and the signals SNAUTOFD and RESET are assumed low unless otherwise specified. As noted earlier, this condition indicates a negotiation cycle. If the timeout signal TO2 remains deasserted, the state machine stays in state CST0 if any one of the following conditions is true: the value of the data inputs PD_IN[7:0] is equal to the value 0×40, the bit PD_IN[7] is low, the bit PD_IN[6] is high, the bit PD_IN[5] is low, the bit PD_IN[4] is high, the bit PD_IN[3] is low, the PD_IN[2] is low, the bit PD_IN[1] is high or the bit PD_IN[0] is high.

If the value of the parallel port bus PD[7:0] is changed by the host computer to the value 0×AC and the timeout signal TO2 remains deasserted low, then the state machine FSTATE transitions from state CST0 to state CST1. With the transition, the signal RST_TMR_W is asserted high. By placing the value 0×AC on the parallel port bus PD[7:0], the host computer is signaling to the EPP controller 142 that flash command bytes will follow. Once in state CST1, if the timeout signal TO2 is asserted high and the error signal ERROR is deasserted low or if the signal ERROR is asserted high, then the state machine transitions from state CST1 to STOP. The signal RST_TMR_W is asserted high with the transition.

At this point, the bit PD_IN[7] corresponds to a clock bit provided by the host computer. If the clock bit PD_IN[7] is asserted high and the signals ERROR and TO2 are low, then the state machine stays in state CST1, with all the output signals being deasserted low.

When the host computer is ready to place the first flash command byte on the parallel port data bus PD[7:0], it deasserts the clock bit PD_IN[7] low. If the signals ERROR and TO2 are also low, then the state machine transitions from state CST1 to state CST2. The signal RST_TMR_W is asserted high with the transition.

Once in state CST2, if the clock bit PD_IN[7] is low and the timeout signal TO2 is high, or if the error signal ERROR is asserted high, then the state machine FSTATE transitions from state CST2 to state STOP. The signal RST_TMR_W is asserted high with the transition. However, if the signals ERROR, PD_IN[7] and TO2 remain low, then the state machine stays in state CST2.

Once the flash command byte is valid on the parallel port data bus PD[7:0], the host computer asserts the clock bit PD_IN[7] high. If the signals ERROR and TO2 remain deasserted low, then the state machine transitions from state CST2 to state CST3, asserting the output signal RST_TMR_W high. The transition to state CST3 causes the EPP controller 142 to latch in the first flash command byte.

In state CST3, if the clock bit PD_IN[7] remains high and either of the signals ERROR or TO2 are asserted high, then the state machine FSTATE transitions from state CST3 to state STOP. However, if the signals ERROR and TO2 remain low and the clock bit PD_IN[7] remains high, then the state machine stays in state CST3. The state machine FSTATE transitions from CST3 to state CST4 when the clock bit PD_IN[7] is deasserted low and the signals ERROR and TO2 remain low. The clock bit PD_IN[7] deasserted low indicates that the host computer is placing the second flash command byte on the parallel port data bus PD_IN[7:0]. With the transition from state CST3 to state CST4, the signal RST_TMR_W is asserted high.

In state CST4, the state machine FSTATE transitions to state STOP if either of the signals ERROR or TO2 are asserted high. The signal RST_TMR_W is asserted high with the transition. However, if the signals ERROR and TO2 remain low and the clock bit PD_IN[7] also remains low, then the state machine stays in state CST4. If the clock bit PD_IN[7] is asserted high and the signals ERROR and TO2 remain low, then the state machine transitions from state CST4 to state CST5. This causes the second flash command byte to be latched into the EPP controller 142. The signal RST_TMRW is asserted high with the transition.

From state CST5, the state machine transitions to state STOP if the clock bit PD_IN[7] is high and either of the signals ERROR or TO2 is also asserted high. The signal RST_TMR_W is asserted high with the transition. The state machine remains in state CST5 if the signals ERROR and TO2 both remain low and one of the following conditions is true: the bit PD_IN[7] is high, the bit PD_IN[6] is low, the bit PD_IN[5] is high, the bit PD_IN[4] is high, the bit PD_IN[3] is high, the bit PD_IN[2] is high, the PD_IN[1] is high or the bit PD_IN[0] is high. The state machine FSTATE remains in state CST5 until the host computer places the value 0×40 back onto the parallel port data bus PD[7:0]. While in state CST5, all of the output signals of the state machine FSTATE are deasserted low.

The state machine transitions from state CST5 to state CST6 when the value of the latched data inputs PD_IN[7:0] is changed to the value 0×40. The state machine waits in state CST6 until the signal BDONE is asserted high to indicate that other bus masters on the system bus 106 have relinquished control of the system bus 106, and that the EPP controller 142 has seized control of the system bus 106. Thus, the state machine remains in state CST6 if the signals ERROR, BDONE, and TO2 are low and the latched data inputs PD_IN[7:0] contain the value 0×40. While in state CST6, the signals RST_TMR_W, FLASH_W and TS are asserted high. As noted above, the signal FLASH_W is latched to produce the signal FLASH, which indicates to the other portions of the EPP controller 142 that an access to the flash EEPROMs 144 or 146 is about to occur. The signal TS, when asserted high, causes a state machine BSCAN (FIG. 5) to issue a boundary scan tristate cycle to allow the EPP controller 142 to seize control of the system bus 106. When the signal BDONE is asserted, the state machine FSTATE transitions to state STOP if the signals ERROR and TO2 remain low and the data inputs PD_IN[7:0] contain the value 0×40. The signals RST_TMR_W, FLASH_W and CMD_SB are asserted high with the transition. As will be described in FIG. 7, the signal CMD_SB causes decoding of the latched flash command bytes to generate one of a plurality of signals to indicate the type of command cycle to be executed.

Figure 4A:
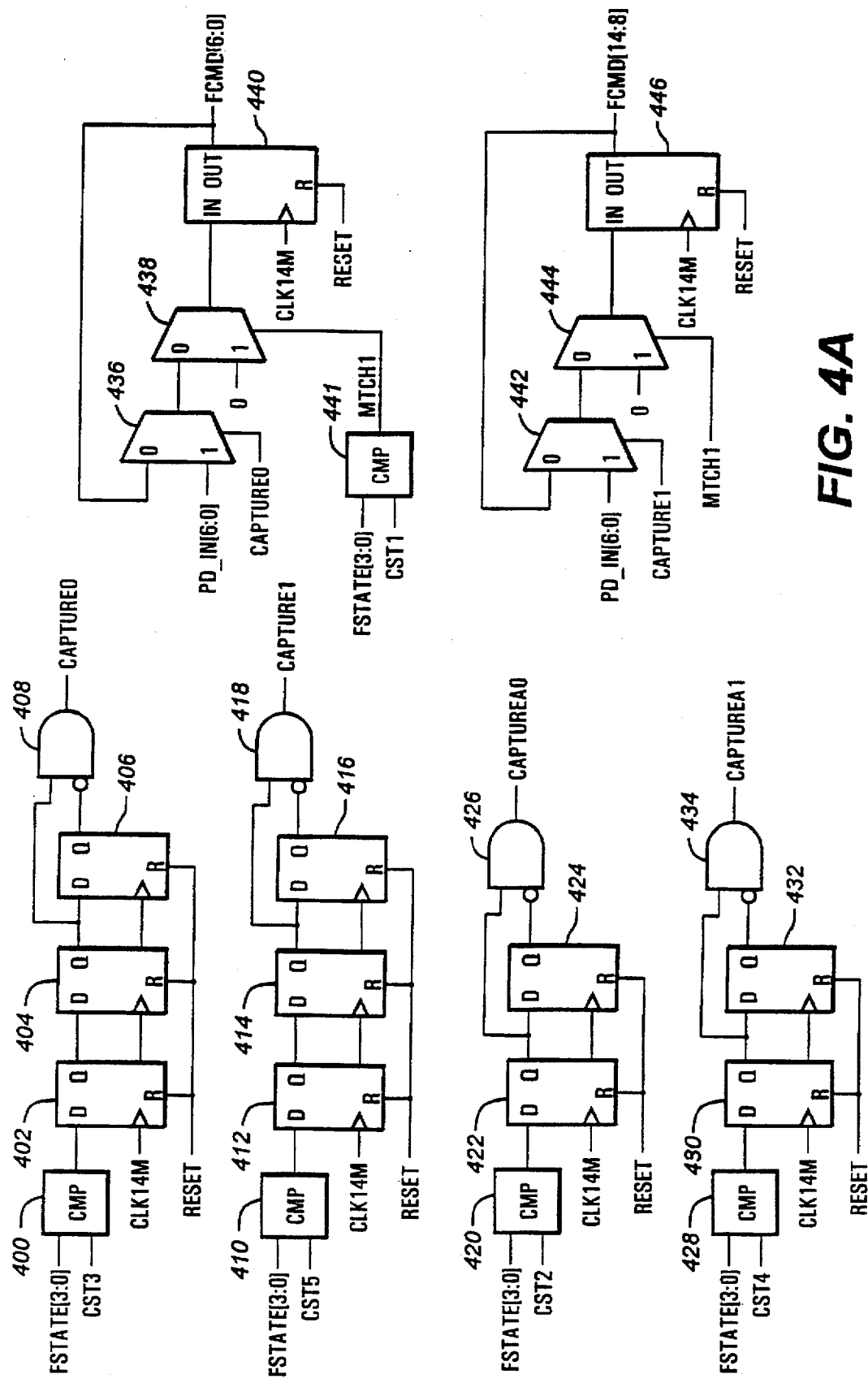
FIGS. 4A and 4B are a logic diagram of circuitry used to capture the flash command bytes.
Figure 4B:
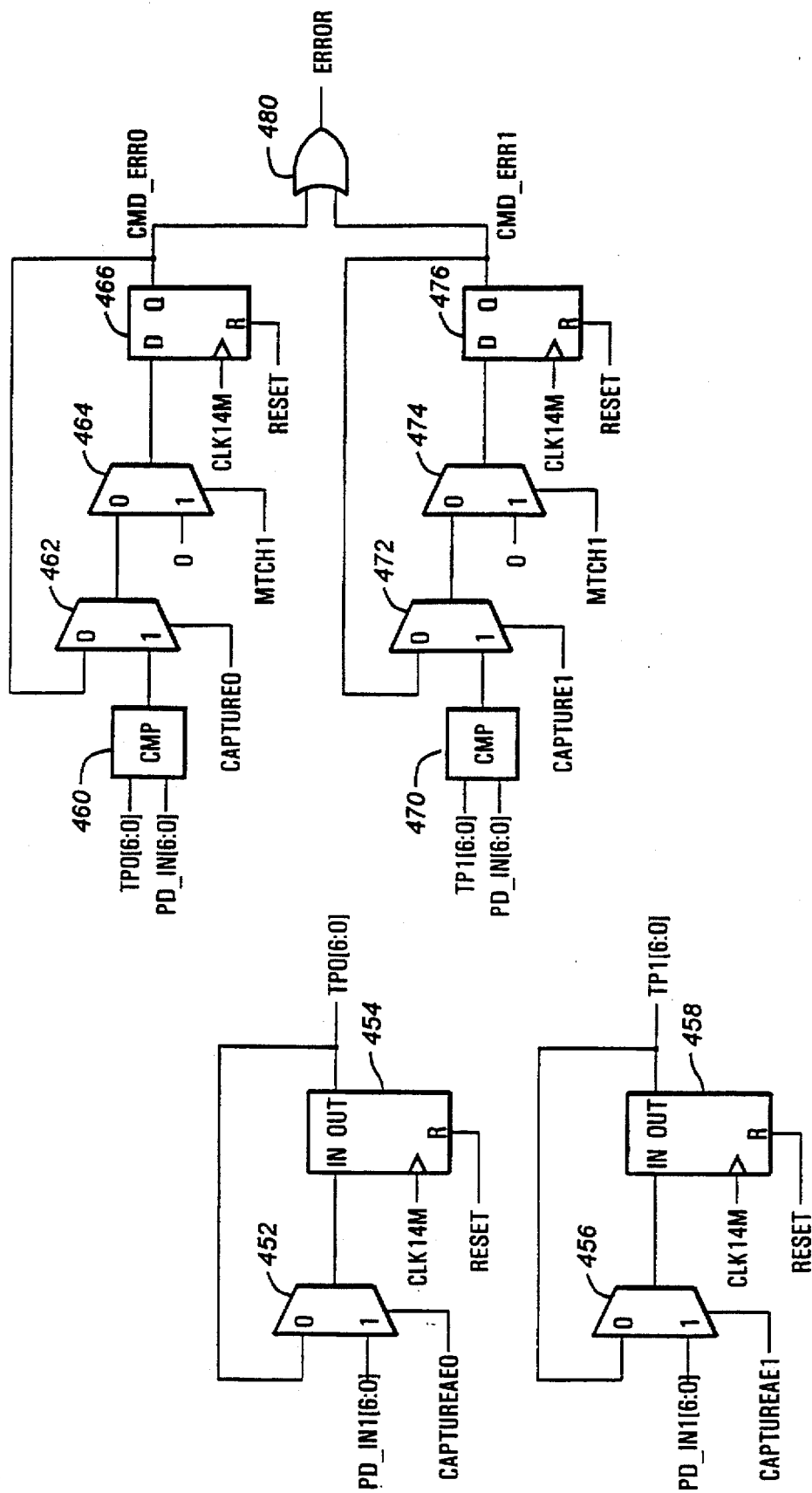

Referring now to FIGS. 4A and 4B, logic responsive to signals provided by the state machine FSTATE and used to capture the flash command bytes from the host computer is shown. Capture signals CAPTURE0, CAPTURE1, CAPTUREA0 and CAPTUREA1 are all pulsed signals. The signal CAPTURE0 is generated by the combination of a comparator 400, D flip-flops 402, 404 and 406, and an AND gate 408. If the comparator 400 determines that the state machine FSTATE is in state CST3, it latches a high into the D flip-flop 402 on the rising edge of the clock CLK14M. On the next rising edge of the clock CLK14M, the high state is latched into the D flip-flop 404. The output of the D flip-flop 404 is connected to the first input of the AND gate 408, whose other input is connected to the inverted state of the output of the D flip-flop 406. When the output of the D flip-flop 404 transitions high, the AND gate 408 asserts the signal CAPTURE0 high. On the next rising edge of the clock CLK14M, the high value from the comparator 400 is latched into the D flip-flop 406, at which point the signal CAPTURE0 is deasserted low. Thus, the signal CAPTURE0 is pulsed high for one CLK14M cycle.

The signal CAPTURE1 is generated in a similar manner by the combination of a comparator 410, D flip-flops 412, 414 and 416, and an AND gate 418. If the state machine FSTATE is in state CST5, the comparator 410 outputs a high state. The signal CAPTURE1 is also pulsed high for one CLK14M cycle.

The signal CAPTUREA0 is pulsed high by the combination of a comparator 420, D flip-flops 422 and 424, and an AND gate 426. If the state machine FSTATE is in state CST2, the comparator 420 outputs a high. The output of the comparator 420 is connected to the D input of the D flip-flop 422, which is clocked by CLK14M. On the next rising edge of the clock CLK14M, the high state provided by the comparator 420 is latched into the D flip-flop 422. The output of the D flip-flop 422 is provided to the first input of the AND gate 426 and also to the D input of the flip-flop 424. The other input of the AND gate 426 is connected to the inverted state of the output of the D flip-flop 424. Thus, when the D flip-flop 422 latches in a high value, the signal CAPTUREA0 is asserted high by the AND gate 426. On the next rising edge of the clock CLK14M, the D flip-flop 424 latches in the high value. As a result, the signal CAPTUREA0 is deasserted low.

The signal CAPTUREA1 is pulsed high in a similar fashion by the combination of a comparator 428, D flip-flops 430 and 432, and an AND gate 434. The signal CAPTUREA1 is pulsed high for one CLK14M cycle when the state machine FSTATE reaches state CST4.

The D flip-flops 402–406, 412–416, 422 and 424, and 430 and 432 are all reset low when the signal RESET is asserted high.

The latched parallel port data inputs PD_IN[6:0] are provided to the 1 input of a multiplexor 436. The 0 input of the multiplexor 436 is connected to the output of a register 440, which is connected to signals FCMD[6:0]. The signals FCMD[6:0] represent the 7 lower bits of the first flash command byte. The select input of the multiplexor 436 is connected to the signal CAPTURE0. The output of the multiplexor 436 is connected to the 0 input of a multiplexor 438, whose 1 input is tied low. The output of the multiplexor 438 is connected to the input of the register 440, and the select input of the multiplexor 438 is connected to the output of a comparator 441. The comparator 441 determines if the state machine FSTATE is in state CST1. The register 440 is clocked by CLK14M and reset by the signal RESET.

If the state machine FSTATE is in state CST1, the comparator 441 asserts a high output, causing the multiplexor 438 to select the value 0 to latch into the register 440. The register 440 is thus initialized to the value 0 whenever the state machine FSTATE transitions to state CST1 in response to a negotiation cycle. If the state machine FSTATE is not in state CST1, then the output of the multiplexor 436 is selected. The multiplexor 436 selects the signals FCMD[6:0] if the signal CAPTURE0 is low, keeping the state of signals FCMD[6:0] unchanged. The multiplexor 436 selects the parallel port data inputs PD_IN[6:0] if the signal CAPTURE0 is asserted high. Thus, the first command byte is latched into the register 440 when the signal CAPTURE0 is asserted high.

The second flash command byte is latched into a register 446 and provided onto signals FCMD[14:8] if the signal CAPTURE1 is asserted high. The data inputs PD_IN[6:0] are connected to the 1 input of a multiplexor 442. The 0 input of the multiplexor 442 is connected to the signals FCMD[14:8]. The select input of the multiplexor 442 is connected to the signal CAPTURE1. The output of the multiplexor 442 is connected to the 0 input of a multiplexor 444, whose 1 input is tied low. The output of the multiplexor 444 is connected to the input of the register 446, which is clocked by CLK14M and reset by the signal RESET. The select input of the multiplexor 444 is connected to the output of the comparator 441. Thus, if the state machine FSTATE is in state CST1, the value 0 is latched into the register 446. Otherwise, if the signal CAPTURE1 is deasserted low, the signals FCMD[14:8] remain unchanged. However, if the signal CAPTURE1 is asserted high, indicating that the state machine FSTATE has reached state CST5, the data inputs PD_IN[6:0] are latched into the register 446.

To ensure that the latched command bits FCMD[6:0] and FCMD[14:8] are valid, the state of the data inputs PD_IN[6:0] are also latched into registers 454 and 458 (FIG. 4B) in states CST2 and CST4, respectively. These values are compared to the values obtained in states CST3 and CST5 to ensure that no error has occurred. The host computer places valid first and second flash command bytes onto the parallel port data bus PD[7:0] during states CST2 and CST4, respectively. Comparing the values latched in states CST2 and CST4 with the values latched in states CST3 and CST5, respectively, ensures that the flash command bytes have been held long enough to satisfy hold time requirements.

Referring now to FIG. 4B, the state of the parallel port data inputs PD_IN[6:0] is latched into the registers 454 and 458, whose outputs are represented by signals TP0[6:0] and TP1[6:0], respectively. The data inputs PD_IN[6:0] are connected to the 1 input of a multiplexor 452, whose output is connected to the input of the register 454. The select input of the multiplexor 452 is connected to the signal CAPTUREA0, and its 0 input is connected to the signals TP0[6:0]. Thus, when the signal CAPTUREA0 is high, the state of the data inputs PD_IN[6:0] is latched into the register 454. Otherwise, the state of the signals TP0[6:0] remain unchanged.

Similarly, the data inputs PD_IN[6:0]0 are connected to the 1 input of a multiplexor 456, whose output is connected to the input of the register 458. The select input of the multiplexor 456 is connected to the signal CAPTUREA1, and the 0 input of the multiplexor 456 is connected to the signals TP1[6:0]. Both registers 454 and 458 are clocked by CLK14M and reset by the signal RESET.

The signals TP0[6:0] are compared to the values of the data inputs PD_IN[6:0] by a comparator 460. The output of the comparator 460 is connected to the 1 input of a multiplexor 462, whose output is connected to the 0 input of a multiplexor 464. The 0 input of the multiplexor 462 is connected to the output of a D flip-flop 466, which is connected to a signal CMD_ERR0. The D flip-flop 466 is clocked by CLK14M and reset by the signal RESET. The select input of the multiplexor 462 is connected to the signal CAPTURE0. The 1 input of the multiplexor 464 is tied low and its select input is connected to the output of the comparator 441, which determines if the state machine FSTATE is in state CST1. If the state machine FSTATE is in state CST1, the multiplexor 464 selects the value 0 to latch into the D flip-flop 466 to initialize the signal CMD_ERR0 low. Otherwise, if the signal CAPTURE0 is low, the state of the D flip-flop 466 remains unchanged. If the signal CAPTURE0 is high, indicating that the first flash command byte is being latched into the register 440, a comparison is made between the signals TP0[6:0] and the latched parallel port data inputs PD_IN[6:0]. If the values are not equal, then the comparator 460 outputs a high, which is latched into the D flip-flop 466 through the multiplexors 462 and 464. The output of the D flip-flop 466 is connected to the first input of an OR gate 480, whose output is connected to the signal ERROR.

The second flash command byte is compared in a similar fashion by the combination of a comparator 470, multiplexors 472 and 474, and a D flip-flop 476. The D flip-flop 476 is clocked by CLK14M and reset by the signal RESET. If the value of the signals TP1[6:0] is not equal to the value of the latched data inputs PD_IN[6:0] when the signal CAPTURE1 is asserted high, then the comparator 470 asserts a high, which is latched into the D flip-flop 476 through the multiplexors 472 and 474 on the rising edge of the clock CLK14M. The output of the D flip-flop 476 is connected to a signal CMD_ERR1, which is connected to the second input of the OR gate 480. The D flip-flop 476 is also initialized to the value 0 when the state machine FSTATE reaches state CST1. Thus, if either the first flash command byte or second flash command byte does not produce a match, then the signal ERROR is asserted high by the OR gate 480 to indicate an error.

In the preferred embodiment, the flash command bits FCMD[15:0] contain the following information. Bits FCMD[15] and FCMD[7] are clock bits used by the host computer to clock the flash command bytes into the EPP controller 142. The bits FCMD[6:5] determine the starting bank number, which can be one of the values 0–3. Bits FCMD[3:0] represent the block in the selected bank of flash memory. Each bank of the flash EEPROMs 144 and 146 contains 16 blocks, in which each block contains 64K bytes. In the second flash command byte, bits FCMD[14:12] contain the encoded value of the flash command. Available flash commands include a write command, a read command, a block erase command, a clear status register command, a read ID command and a parallel port disable command for the value of bits FCMD[14:12] equal to 1, 2, 3, 4, 5 and 6, respectively. Bits FCMD[11:10] are reserved for future expansion. Finally, bits FCMD[9:8] represents the ending bank number of the flash memory.

As described above, after the flash command bits FCMD[15:0] have been loaded into the EPP controller 142, the host computer switches the value of the parallel port bus PD[7:0] back to the value 0×40. This causes the state machine FSTATE to transition to state CST6 and to assert the signal TS high. The asserted signal TS causes the state machine BSCAN (FIG. 5) in the EPP controller 142 to issue a boundary scan tristate command to the IPC 102 so that the enhanced parallel port controller 142 can seize control of the system bus 106. Before it obtains control of the system bus 106, the EPP controller 142 is not ready to receive data from the host computer. As a result, the EPP controller 142 blocks all transfers from the host computer by not responding to any read or write requests from the host computer.

Figure 5:
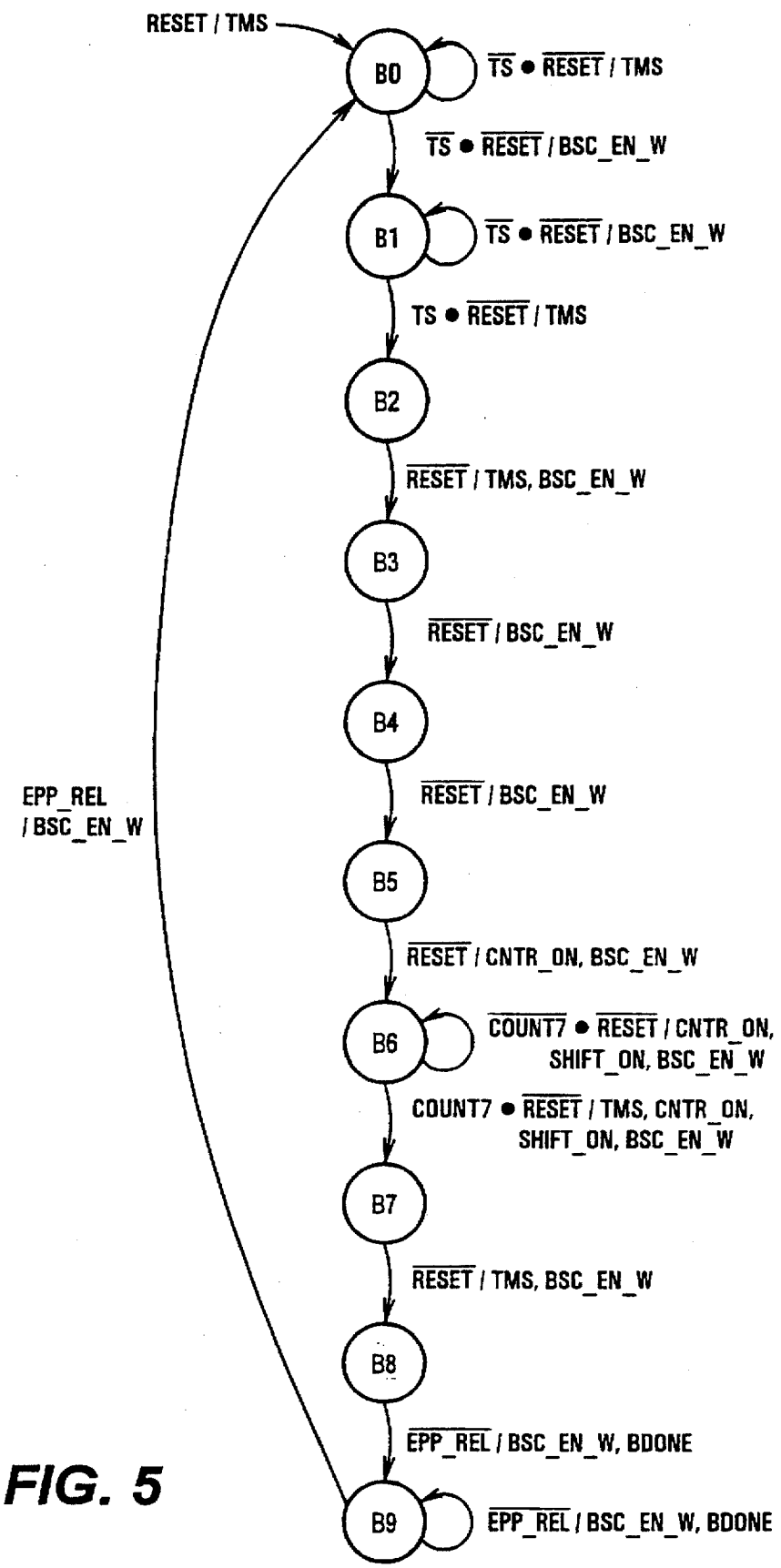
FIG. 5 is a state diagram of a state machine that performs a boundary scan tristate cycle to seize control of the system bus.

Referring now to FIG. 5, the state diagram of the state machine BSCAN is shown. The inputs to the state machine BSCAN are state signals BSTATE[3:0] and signals TS, COUNT7, RESET and EPP_REL. The signal EPP_REL is provided by a comparator 340 in FIG. 3. If the comparator 340 determines that the state machine FSTATE is in state STOP, then the signal EPP_REL is asserted high. The outputs of the state machine BSCAN are state signals BSTATE_D[3:0] and signals TMS, CNTR_ON, SHIFT_ON, BDONE and BSC_EN_W.

A system reset, indicated by asserting the signal RESET high, causes the state machine BSCAN to enter into its initial state B0. With this transition, the signal TMS is asserted high. The state machine BSCAN stays in state B0 while the signal TS is low and the signal RESET is low. The signal TMS is maintained high.

When the signal TS is asserted high, the state machine BSCAN begins the boundary scan tristate cycle on the system bus 106. The state machine BSCAN transitions from state B0 to B1, asserting the signal BSC_EN_W high. The signal BSC_EN_W causes output tristate buffers that drive the signals TMS and TDO to be enabled. The signals TMS and TDO are used to transmit the tristate command to other bus masters using the boundary scan protocol. In the preferred embodiment, the CPU 108 is the only other bus master that contains the boundary scan test logic. The signal TMS is provided to other bus masters to select the desired test operation. The signal TDO is a serial output for test instructions and data, which are provided to the boundary scan test serial input of the CPU 108. The CPU 108 includes a shift register into which data on the shift input is fed. The data in the shift register is then loaded into a test data register or test instruction register as appropriate.

If the signal TS is deasserted low when the state machine BSCAN is in state B1, it stays in state B1, maintaining the signal BSC_EN_W asserted high. However, if the signal TS is maintained high, the state machine BSCAN transitions from state B1 to B2, asserting the signals TMS and BSC_EN_W high. From state B2 the state machine transitions to state B3. The signals TMS and BSC_EN_W are maintained high. Asserting the signal TMS high over two clock periods places the test logic in the CPU 108 in a condition ready to accept a new test instruction. Next, the state machine transitions from state B3 to B4. With this transition, the signal TMS is deasserted low, but the signal BSC_EN_W is maintained high. From state B4, the state machine transitions to state B5, keeping the signal BSC_EN_W asserted high. The state machine then transitions from state B5 to B6. The signals CNTR_ON and BSC_EN_W are asserted high with this transition. The signal TMS is maintained low. At this point, the test logic in the CPU 108 is ready to shift data into the shift register.

The signal CNTR_ON enables the clock input of a three-bit counter 604, which is described below in FIG. 6. The state machine BSCAN stays in state B6 until the counter 604 reaches a predetermined value, as indicated by the signal COUNT7. Thus, if the signal COUNT7 is deasserted low, the state machine stays in state B6. While in state B6, the signals CNTR_ON and BSC_EN_W are maintained high and the signal SHIFT_ON is asserted high. As will be described below in FIG. 6, the signal SHIFT_ON causes the value 0b1101 to be serially shifted onto the signal TDO. This value is in turn shifted into the shift register of the CPU 108 through its test serial input. When the counter 604 reaches the predetermined value, the signal COUNT7 is asserted high and the state machine transitions from state B6 to state B7. With this transition, the signals TMS, CNTR_ON, SHIFT_ON and BSC_EN_W are all asserted high. Assertion of the signal TMS causes the test logic in the CPU 108 to stop shifting data into its shift register. From state B7, the state machine transitions to state B8 while maintaining the signals TMS and BSC_EN_W high. Maintaining the signal TMS high causes the instruction in the shift register to be loaded into the test instruction register of the CPU 108. This instruction is the tristate command, which causes the CPU 108 to tristate its pins to enable the EPP controller 142 to gain control of the bus 106. If the signal EPP_REL is deasserted low, indicating that the state machine FSTATE is not in state STOP, then the state machine BSCAN transitions from state B8 to B9. The signals BDONE and BSC_EN_W are asserted high with the transition. The signal BDONE indicates that the boundary scan cycle has completed. The state machine BSCAN remains in state B9 until the state machine FSTATE transitions from state CST6 to state STOP. When the signal EPP_REL is asserted high, the state machine BSCAN transitions from state B9 to state B1. The signal BSC_EN_W is maintained high. By asserting the signal EPP_REL high, the state machine FSTATE is also indicating to the state machine BSCAN that it has received the asserted signal BDONE and has responded by transitioning to state STOP.

Figure 6:
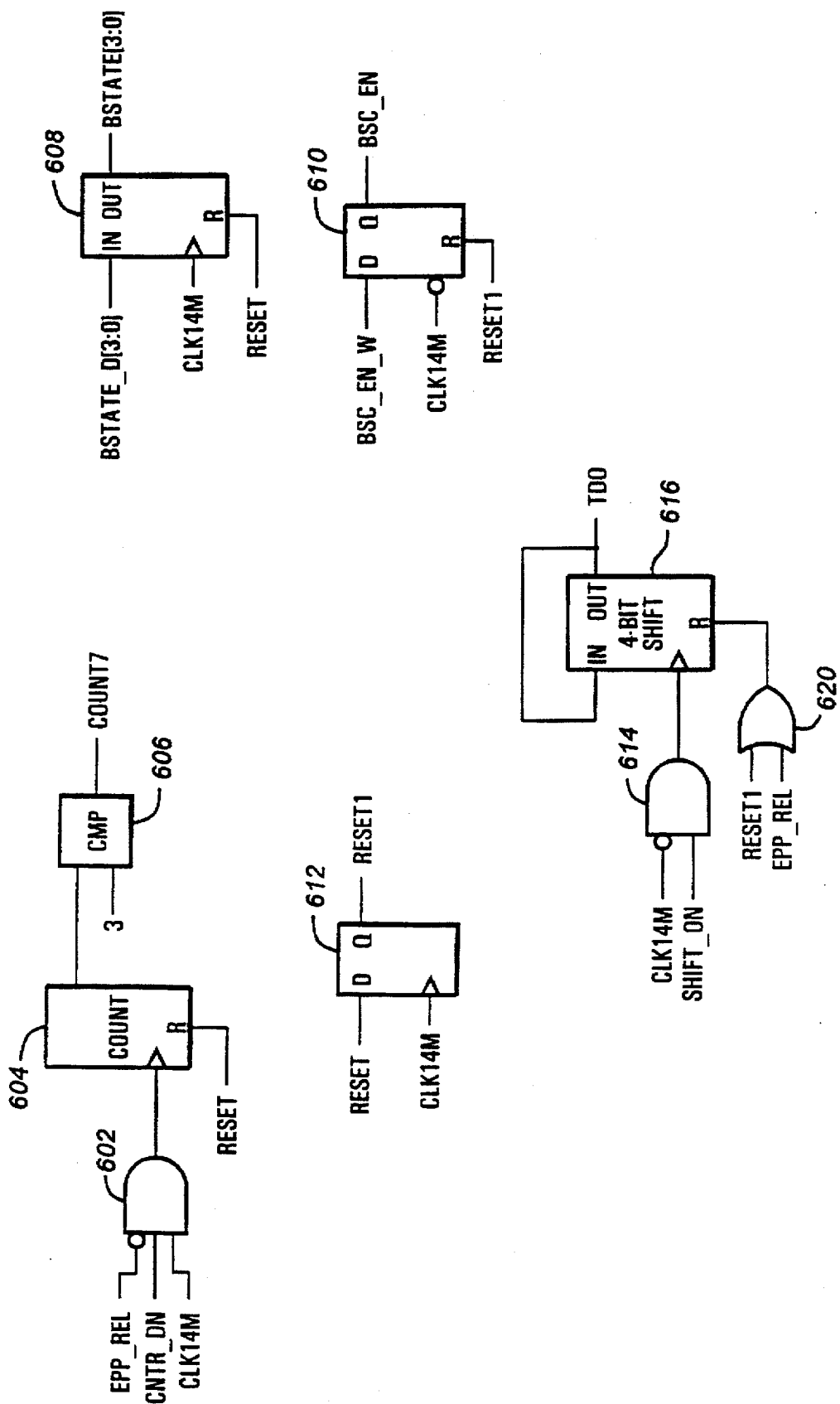
FIG. 6 is a logic diagram of circuitry that interfaces with signals provided to and by the state machine of FIG. 5.

Referring now to FIG. 6, logic that interfaces with signals provided by and to the state machine BSCAN is shown. The inputs of an AND gate 602 are connected to the inverted state of the signal EPP_REL, and to the signal CNTR_ON and the clock CLK14M. The output of the AND gate 602 is connected to the clock input of a three-bit counter 604, whose output is connected to signals COUNT[2:0]. The counter 604 is reset to the value 0 when the signal RESET is asserted high. The signals COUNT[2:0] are connected to one input of a comparator 606, which compares the value of COUNT[2:0] to the value 3. If a match occurs, the comparator 606 asserts the signal COUNT7 high.

The state signals BSTATE_D[3:0] provided by the state machine BSCAN are connected to the input of a register 608, which is clocked by CLK14M. The output of the register 608 is connected to state signals BSTATE[3:0]. The register 608 is reset to the value 0x0 on the rising edge of the signal RESET.

The signal BSC_EN_W is connected to the D input of a D flip-flop 610, which is clocked on the falling edge of CLK14M. The output of the D flip-flop 610 is connected to the signal BSC_EN. The signal BSC_EN is provided directly to enable the tristate buffers (not shown) driving the signals TMS and TDO. The D flip-flop 610 is reset by a signal RESET1, which is provided by a D flip-flop 612. The D input of the D flip-flop 612 is connected to the signal RESET, and it is clocked on the rising edge of CLK14M.

The signal SHIFT_ON is connected to one input of an AND gate 614. The second input of the AND gate 614 is connected to the inverted state of the signal CLK14M. The output of the AND gate 614 is connected to the clock input of a 4-bit shift register 616. The least significant bit of the shift register 616 is connected to a signal TDO, which is wrapped around and connected to the most significant bit of the 4-bit shift register 616. Thus, if the signal SHIFT_ON is asserted high, then a shift right operation occurs in the shift register 616 on each falling edge of the clock CLK14M. The reset input of the shift register 616 is connected to the output of an OR gate 620, whose inputs are connected to the signals RESET1 and EPP_REL. If either of these signals is asserted high, then the shift register 616 is reset to the value 0b1101. The shift register 616 works in conjunction with the counter 604. While the state machine BSCAN is in state B6, the signal CNTR_ON is asserted high to enable the counter 604, and the signal SHIFT_ON is asserted to enable the shift register 616. The state machine BSCAN remains in state B6 until the counter 604 counts to the value 3. This allows the shift register 616 to serially output the value 0b1101 through the signal TDO.

After the boundary scan tristate cycle has been successfully completed, as indicated by the signal BDONE being asserted high, the EPP controller 142 is ready to accept write and read cycles from the host computer. The EPP controller 142 interfaces with the flash EEPROMs 144 and 146 through the system data bus SD[15:0] and the system address bus SA[20:1]. In addition, four select signals CS0, CS1, CS2, and CS3, are provided to select banks 0, 1, 2 and 3, respectively, of the flash EEPROMs 144 and 146. A write to the flash EEPROMs 144 and 146 is indicated by a signal MEMWR*, which is connected to the write enable inputs of the flash EEPROMs 144 or 146. A read from the flash EEPROMs 144 and 146 is indicated by a signal MEMRD*, which is connected to output enable inputs of the flash EEPROMs 144 or 146. A signal VPP_SW is provided to the DC/DC converter 138 to activate the 12-volt VPP inputs to the flash EEPROMs 144 and 146. The 12-volt VPP supply voltage is needed to erase or program the flash EEPROMs 144 or 146. The flash EEPROMs 144 and 146 provide a signal RY to indicate if they are ready for the next command operation.

The following provides a brief description of the various command cycles that can be performed on the flash EEPROMs 144 and 146. The commands recognized by a flash memory device includes a read ID operation, a read status register operation, an erase operation, a clear status register, a write operation and a read array operation. The read ID operation allows the host computer to access the manufacturer code and device code of the flash EEPROMs 144 and 146 so that the host computer can automatically match the devices with their proper block erase and write algorithms. The read ID cycle is initiated by writing the value 0×90 into a command user interface located in each of the flash EEPROMs 144 and 146. Following the command write, a read cycle from address 0×00000 retrieves the manufacturer code and a read cycle from address 0×00001 returns the device code.

The read array command is initiated by writing the value 0×FF into the command user interface. The flash EEPROMs 144 and 146 remain enabled for reads until the contents of the command user interface are changed. In the preferred embodiment, an entire 64K block of the selected bank of the flash EEPROMs 144 or 146 is accessed in a read array operation. To that end, an address counter 800 (FIG. 8) is provided that increments the starting block address 64K times.

Each flash memory device contains a status register which may be read to determine when a write or block erase operation has completed successfully. The read status register operation is initiated by writing the value 0×70 to the command user interface. Any subsequent read operation outputs data from the status register. The status register is an 8-bit register. The most significant bit, or bit 7, of the register generates the signal RY. Bit 6 of the status register indicates whether an erase operation has been suspended. An erase operation can be suspended to allow data to be read from another block of the flash memory. Bit 5 of the status register, also represented as a signal ERASE_ERR, indicates whether an error has occurred during a block erase operation. Bit 4, also represented as a signal WRITE_ERR, indicates whether an error has occurred during a write operation. Bit 3, also represented as a signal VPP_ERR, indicates whether the voltage level of the VPP voltage input is below a predetermined threshold value.

A clear status register command is asserted to reset the erase and write status bits of the status register. The clear status register operation is initiated by writing the value 0×50 to the command user interface.

The block erase operation is executed to one 64k block of the flash memory device at a time and is initiated by a two-cycle command sequence. The first cycle is an erase setup command, which is initiated by writing the value 0×20 to the command user interface. The second cycle is an erase confirm command, which is asserted by writing the value 0×D0 to the command user interface.

The write operation is also executed by a two command sequence. First, a write set up command is indicated by writing the value 0×40 to the command user interface. The second command is the actual write command, in which the flash memory is programmed by specifying the address and data. The write is performed when the signal MEMWR, is asserted low. For both the block erase and write commands, completion is indicated by the signal RY or bit 7 of the status register being asserted high.

In the EPP controller 142, the write command is indicated by a signal WRITEB, the read array command is indicated by a signal READB, the block erase command is indicated by a signal ERASEB, the clear status register command is indicated by a signal CLEARS, a read ID command is indicated by a signal RD_ID, and a read status register command is indicated by a signal RD_STAT. In addition, the EPP controller 142 also recognizes a parallel port disable command. In response to such a command, a signal PD_DIS_LAT is used to disable the parallel port 124 in the reverse direction, that is, from the hand-held computer C to the host computer. When the parallel port 124 is disabled, the erase status bit ERASE_ERR, the write status bit WRITE_ERR and the VPP status bit VPP_ERR from the status register in the flash EEPROMs 144 or 146 are placed on the status lines PERROR, SELECT and NFAULT instead of on the parallel port data bus PD[7:0].

Figure 7B:
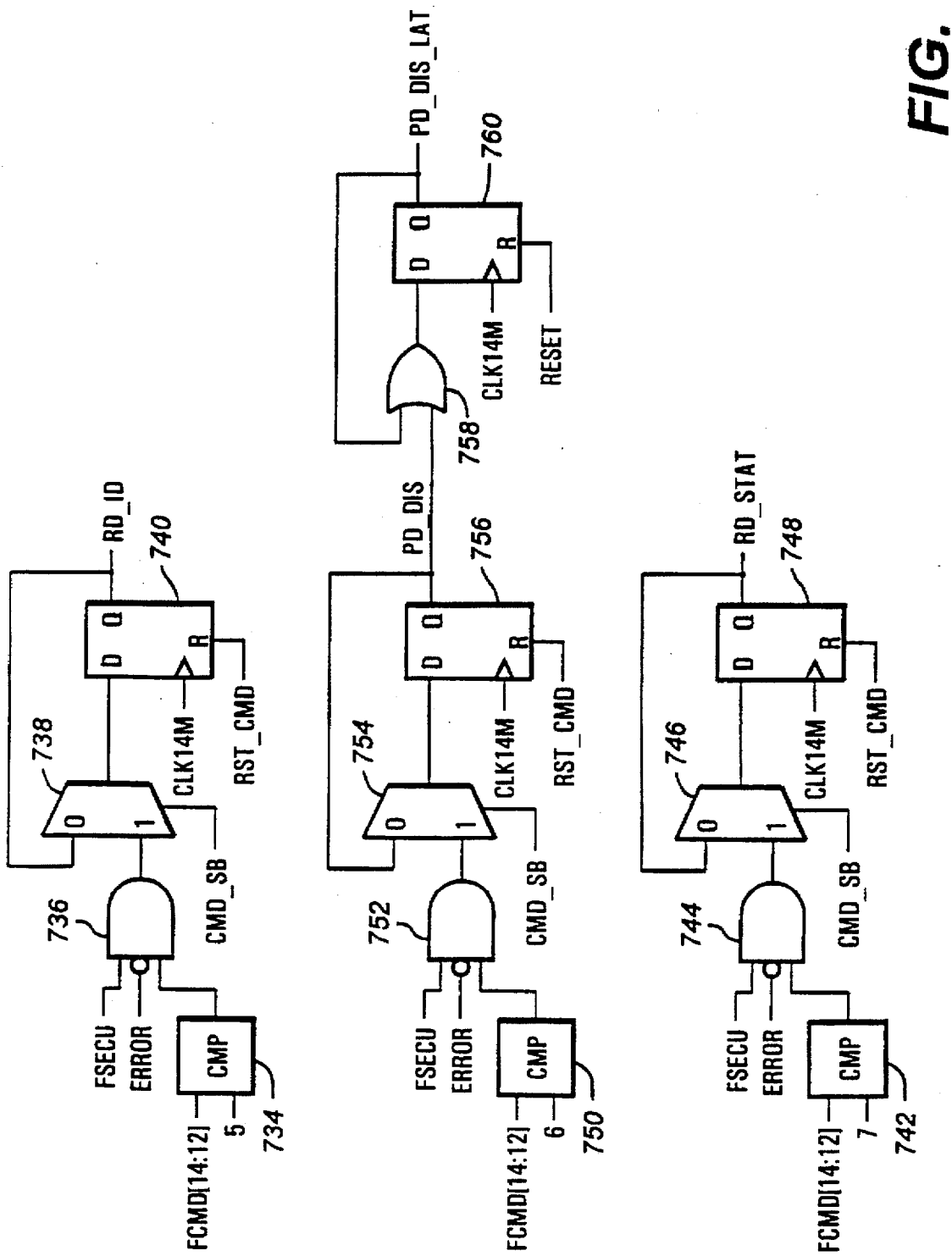
FIG. 7 is a logic diagram of circuitry for decoding the flash command bytes to determine the type of command requested.

Referring now to FIG. 7, logic used to generate the above listed signals is shown. As discussed above, the flash command bits FCMD[14:12] indicate the command to be performed on the flash EEPROMs 144 and 146. The flash command bits FCMD[14:12] are provided to inputs of comparators 702, 710, 718, 726, 734, 742, and 750. If the comparator 702 determines the value of the flash command bits FCMD[14:12] is equal to 1, then a high value is provided to an input of an AND gate 704. The second input of the AND gate 704 is connected to the inverted state of the signal ERROR, and its third input is connected to a signal FSECU. The signal FSECU is a security signal. If the signal FSECU is low, then the EPP controller 142 cannot be accessed by the host computer. Thus, if the security signal FSECU is high, the signal ERROR is low and the value of the flash command bits FSMD[14:12] is equal to 1, then the AND gate 704 outputs a high to the 1 input of a multiplexor 706. The output of the multiplexor 706 is connected to the D input of a D flip-flop 708, whose output is connected to the signal WRITEB. The signal WRITEB is connected to the 0 input of the multiplexor 706. The select input of the multiplexor 706 is connected to the signal CMD_SB, which is asserted by the state machine FSTATE when it transitions from state CST6 to state STOP. As noted above, this transition from state CST6 to state STOP indicates that the boundary scan tristate cycle has been completed by the state machine BSCAN and that the EPP controller is ready to receive additional commands from the host computer. The D flip-flop 708 is clocked by CLK14M and reset by the signal RESET. If the signal CMD_SB is asserted high, then the multiplexor selects the output of the AND gate 704 to latch into the D flip-flop 708. Otherwise, the state of the signal WRITEB remains unchanged.

Similarly, the signal READB is generated by the combination of the comparator 710, a three-input AND gate 712, a multiplexor 714 and a D flip-flop 716. If the comparator 710 determines that the value of the flash command bits FCMD[14:12] is equal to the value 2, and if the signal CMD_SB is asserted high, then the D flip-flop 716 asserts the signal READB high on the rising edge of the clock CLK14M.

The signal ERASEB is provided in a similar fashion by the combination of a comparator 718, an AND gate 720, a multiplexor 722 and a D flip-flop 724. The signal ERASEB is asserted high if the value of the flash command bits FCMD[14:12] is equal to 3, the signal CMD_SB is asserted high. The signal CLEARS is provided by the combination of a comparator 726, an AND gate 728, a multiplexor 730 and a D flip-flop 732. The signal CLEARS is asserted on the rising edge of the clock CLK14M if the value of the flash command bits FCMD[14:12] is equal to 4 and the command strobe CMD_SB is asserted high. The signal RD_ID is provided by the combination of a comparator 734, a three-input AND gate 736, a multiplexor 738 and a D flip-flop 740. The signal RD_ID is asserted high on the rising edge of CLK14M if the value of the flash command bits FCMD [14:12] is equal to 5 and the command strobe CMD_SB is asserted high. The signal RD_STAT is provided by the combination of a comparator 742, a three-input AND gate 744, a multiplexor 746 and a D flip-flop 748. The signal RD_STAT is asserted high on the rising edge of CLK14M if the value of the flash command bits FCMD[14:12] is equal to 7 and the command strobe CMD_SB is asserted high.

Finally, a signal PD_DIS is provided by the combination of a comparator 750, a three-input AND gate 752, a multiplexor 754 and a D flip-flop 756. The signal PD_DIS is asserted high on the rising edge of CLK14M if the value of the flash command bits FCMD[14:12] is equal to 6 and the command strobe CMD_SB is asserted high. The signal PD_DIS is provided to one input of an OR gate 758, whose output is connected to the D input of a D flip-flop 760. The output of the D flip-flop 760 is connected to the signal PD_DIS_LAT, which is also connected to the other input of the OR gate 758. Thus, once the signal PD_DIS causes the D flip-flop 760 to be set high, the OR gate 758 latches the state of the signal PD_DIS_LAT high. Thus, when the parallel port 124 is disabled, it cannot be enabled until a system reset is issued by asserting the signal RESET high.

Figure 8A:
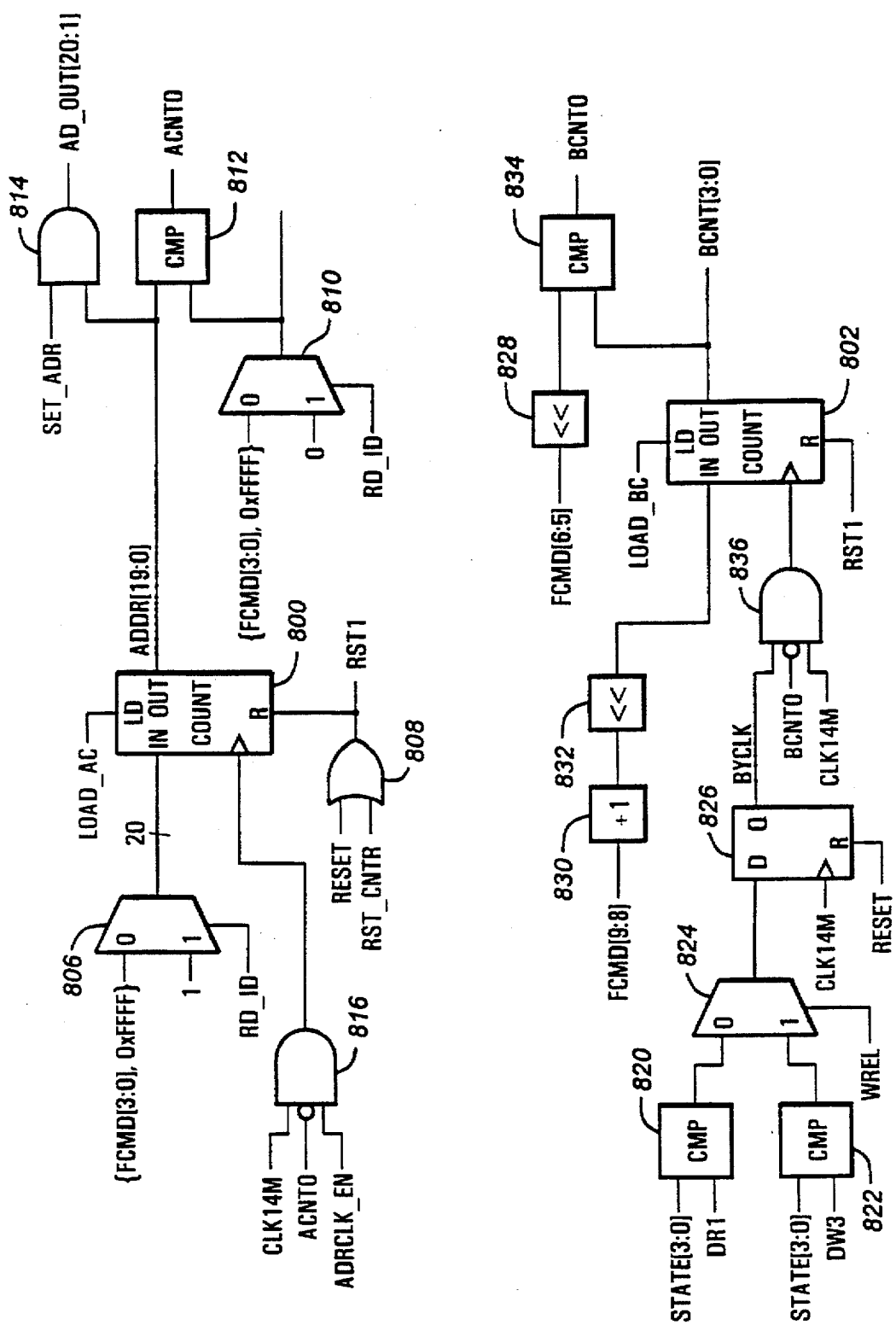
FIGS. 8A and 8B are a logic diagram of an address counter, a byte counter, and a word counter that provides the addresses to flash memory devices in the computer system of FIG. 1, keeps track of the number of bytes transferred through the parallel port in the computer system, and keeps track of the number of words provided over the computer system bus, respectively.
Figure 8B:
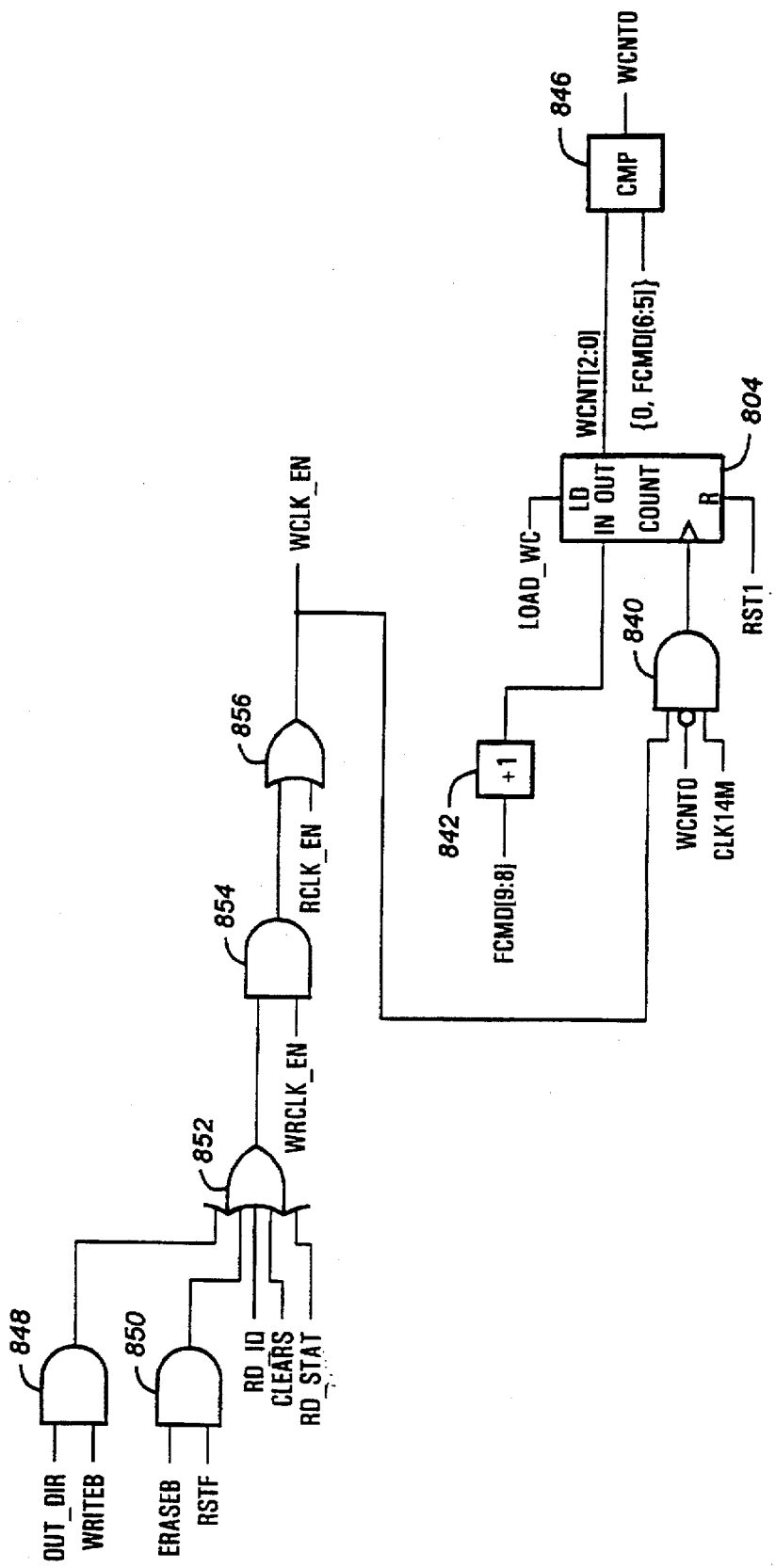

Referring now to FIGS. 8A and 8B, the address counter 800, a byte counter 802 and a word counter 804 are shown. The address counter 800 is a 20-bit decrementing counter that provides address signals to the flash EEPROMs 144 and 146 though the system address bus SA[20:1]. The clock input of the address counter 800 is connected to the output of a three-input AND gate 816. The first input of the AND gate 816 is connected to the clock CLK14M, the second input is connected to the inverted state of a signal ACNT0, and the third input is connected to a signal ADRCLK_EN. The signal ACNT0 indicates that the address counter 800 has counted 64k times, and the signal ADRCLK_EN is provided to enable the clock input of the address counter 800. The data input of the address counter 800 is connected to the output of a multiplexor 806, whose select input is connected to the signal RD_ID. The 1 input of the multiplexor 806 is tied high and the 0 input is connected to the value represented by {FCMD[3:0], 0xFFFF}. As noted above, the flash command bits FCMD[3:0] contain the block number of the flash EEPROMs 144 or 146. If a read ID operation is not being performed, that is, the signal RD_ID is low, then the ending block address {FCMD[3:0], 0xFFFF} is selected and loaded into the counter 800 on the rising edge of the clock CLK14M if a load signal LOAD_AC is asserted high, assuming that the clock input to the address counter 800 is enabled.

The reset input of the counter 800 is connected to the output of an OR gate 808, whose inputs are connected to the signals RESET and RST_CNTR. If either of these signals is asserted high, then the counter 800 is reset to the value 0. The output of the counter 800 is represented by signals ADDR[19:0], which are provided to an input of a comparator 812 and an input of an AND gate 814. The other input of the comparator 812 is connected to the output of a multiplexor 810, whose select input is connected to the signal RD_ID. The 1 input of the multiplexor 810 is tied low and the 0 input is connected to the value represented by {FCMD[3:0], 0x0000}. The second input of the AND gate 814 is connected to a signal SET_ADR, which is provided to enable the address signals ADDR[19:0] to be outputted to signals AD_OUT[20:1]. The state of the signals AD_OUT[20:1] is ultimately provided to the system address bus SA[20:1].

The output of the comparator 812 is connected to the signal ACNT0. In a non-read ID operation, the counter 800 decrements from the value {FCMD[3:0], 0xFFFF} down to the value {FCMD[3:0], 0x0000}. When the counter 800 decrements to the latter value, the comparator 812 asserts the signal ACNT0 high to indicate that the counter 800 has gone through one 64K block of the selected bank of the flash EEPROMs 144 or 146. The signal ACNT0 disables the counter 800 from further counting and from loading in new values.

In a read ID operation, the counter 800 starts at the value 1 and decrements down to the value 0, at which time the comparator 810 asserts the signal ACNT0 high. In a write or read operation, the address counter 800 allows the EPP controller 142 to access an entire block of the flash EEPROMs 144 and 146. In a read ID operation, only two bytes are needed from the flash EEPROMs 144 or 146—the manufacturer code and the device code.

The byte counter 802 ensures that the proper number of bytes of data are transferred through the parallel port 124. As noted earlier, each bank of the flash EEPROMs 144 or 146 is preferably implemented with two 1M×8 flash EEPROM chips. Consequently, for each selected bank of the flash EEPROMs 144 or 146, two bytes of data are transferred in each clock cycle between the host computer and the handheld computer system C through the parallel port data bus PD[7:0]. The clock input of the byte counter 802 is connected to the output of an AND gate 836, whose inputs are connected to the clock CLK14M, the inverted state of a signal BCNT0 and a signal BYCLK. The flash command bits FCMD[9:8] are connected to the input of an increment circuit 830, which increments the value of the command bits FCMD[9:8] by 1. As noted earlier, the flash command bits FCMD[9:8] represent the ending bank number. The output of the increment circuit 830 is connected to the input of a shifter 832, which performs a binary shift left operation on its input signals. The output of the binary shifter 832 is connected to the data input of the byte counter 802. The load input of the counter 802 is connected to a signal LOAD_BC. When the signal LOAD_BC is asserted high, the output of the binary shifter 832 is loaded into the counter 802 on the rising edge of the clock CLK14M. The output of the byte counter 802 is connected to signals BCNT[3:0], which are connected to an input of a comparator 834. The other input of the comparator 834 is connected to the output of a binary shifter 828, whose input is connected to the flash command bits FCMD[6:5], which represent the starting bank number. The binary shifter 828 performs a binary shift left operation on bits FCMD[6:5]. Thus the ending bank number is incremented by the value 1 by the increment circuit 830 and effectively multiplied by 2 by the binary shifter 832. That value forms the starting count for the counter 802, which decrements to the value of the starting bank number multiplied by 2. The comparator 824 then asserts the signal BCNT0 high to disable further decrementing or loading. Thus, if two banks of the flash EEPROMs 144 or 146 are selected, for example, banks 0 and 1, then the byte counter 802 decrements from the value 4 down to the value 0, at which time the signal BCNT0 is asserted high to indicate that four bytes of data have been transferred through the parallel port 124. The reset input of the counter 802 is connected to the output of the OR gate 828.

The byte counter 802 is enabled by the signal BYCLK. The signal BYCLK is provided by a D flip-flop 826, whose D input is connected to the output of a multiplexor 824. The D flip-flop 826 is clocked by CLK14M and reset by the signal RESET. The select input of the multiplexor 824 is connected to a signal WREL. The signal WREL indicates that the EPP controller 142 has received a write command from the host computer, and that it is ready to receive write data from the host computer. The 1 input of the multiplexor 824 is connected to the output of a comparator 822 and its 0 input is connected to the output of a comparator 820. The comparator 820 determines if a state machine PSTATE (described below in FIGS. 9A and 9B) is in state DR1. The comparator 822 determines if the state machine PSTATE is in state DW3. The state DR1 indicates that the host computer has requested a data read cycle. The state DW3 indicates that the host computer has requested a data write cycle. If a data read cycle is indicated, then the byte counter 802 is enabled to transfer the appropriate number of bytes to the host computer. If a data write cycle is indicated, then the byte counter 802 is enabled to transfer the appropriate number of data bytes from the host computer.

Just as the byte counter 802 is utilized to count the appropriate number of bytes transferred to and from the host computer through the parallel port data bus PD[7:0], the word counter 804 is used to count the appropriate number of words transferred over the system data bus SD[7:0]. For each bank of the flash EEPROMs 144 or 146 selected, a word is transferred in each clock cycle between the EPP controller 142 and the bank of the flash EEPROMS 144 or 146. The clock input of the word counter 804 is connected to the output of an AND gate 840, whose inputs are connected to the clock CLK14M, the inverted state of a signal WCNT0, and a signal WCLK_EN. The data input of the counter 804 is connected to an increment circuit 842, whose input is connected to the flash command bits FCMD [9:8], which contain the ending bank number. The load input of the counter 804 is connected to a signal LOAD WC. Thus, the incremented ending bank number is loaded into the counter 804 on the rising edge of the clock CLK14M when the signal LOAD_WC is asserted high. The output of the counter 804 is connected to signals WCNT[2:0], which are provided to an input of a comparator 846. The comparator 846 compares the value of the signals WCNT[2:0] with the value of the flash command bits FMD[6:5], which contain the starting bank number. If a match occurs, the signal WCNT0 is asserted high. When the signal WCNT0 is asserted high, the word counter 804 is disabled from further decrementing or loading. The reset input of the word counter 804 is also connected to the output of the OR gate 828.

The clock input of the counter 804 is enabled by the signal WCLK_EN, which is provided by an OR gate 856, whose first input is connected to a signal RCLK EN and second input is connected to the output of an AND gate 854. The signal RCLK EN is asserted high during a read cycle from the flash EEPROMs 144 or 146 to indicate that one word has been read. One input of the AND gate 854 is connected to the output of a 5-input OR gate 852, and the other input is connected to a signal WRCLK_EN. The signal WRCLK_EN is asserted high during a write to flash EEPROMs 144 or 146 to indicate that one word has been written. The inputs of the OR gate 852 are connected to the output of an AND gate 848, the output of an AND gate 850, and the signals RD_ID, CLEARS and RD_STAT. The inputs of the AND gate 848 are connected to signals OUT_DIR and WRITEB, and the inputs of the AND gate 850 are connected to signals ERASEB and RSTF. As noted earlier, the command sequence for both the write and block erase commands consist of two cycles. The signals OUT_DIR and RSTF, which are described below, ensure that the word counter 804 is decremented only after the two-cycle command sequence has bee performed. For the read ID, clear status register, or read status register command, the word counter 804 is enabled whenever the signal WRCLK_EN is asserted high.

Figure 9A:
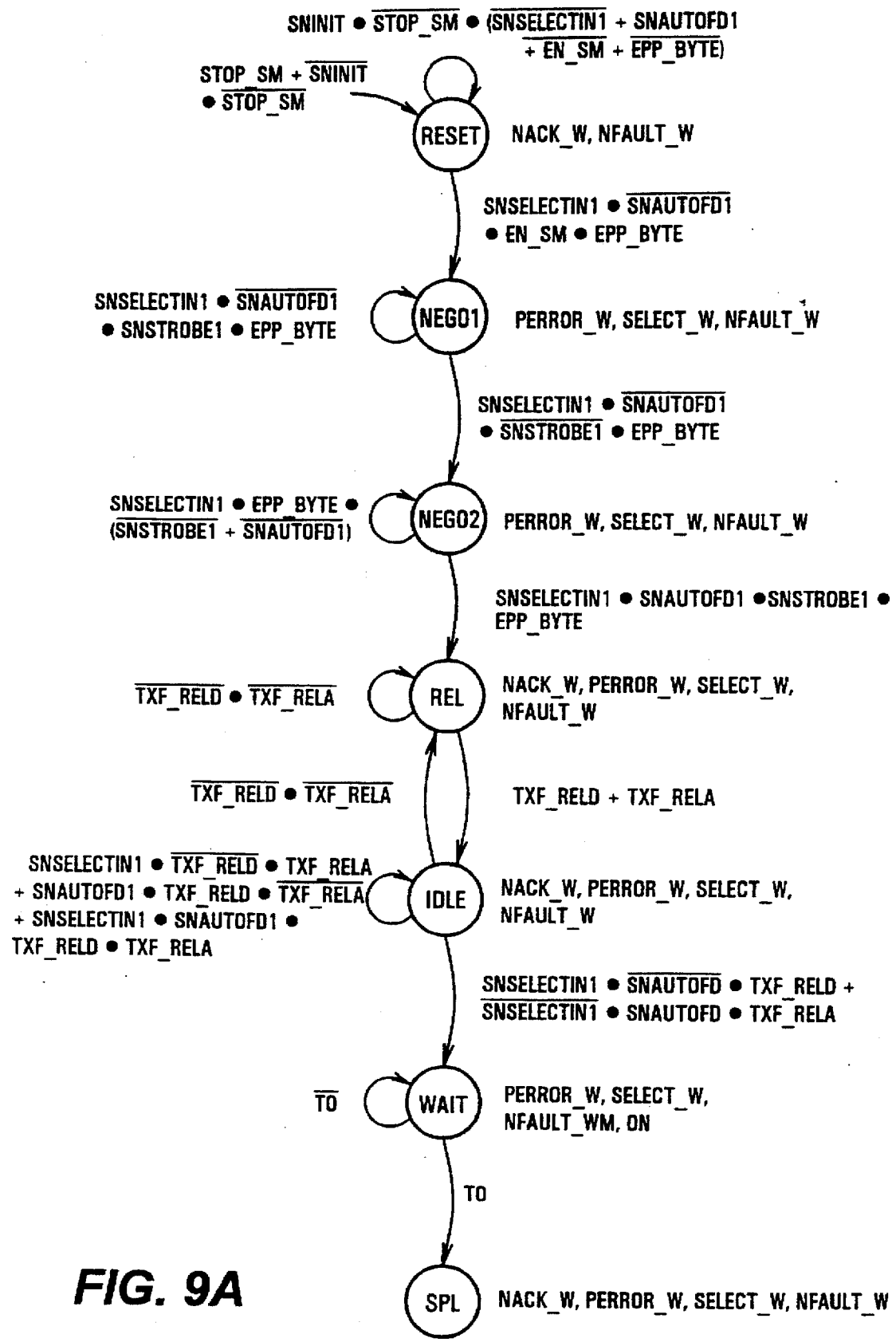
FIGS. 9A and 9B are a state diagram of a state machine that performs handshaking functions with an external computer connected to the parallel port of the computer system of FIG. 1.
Figure 9B:
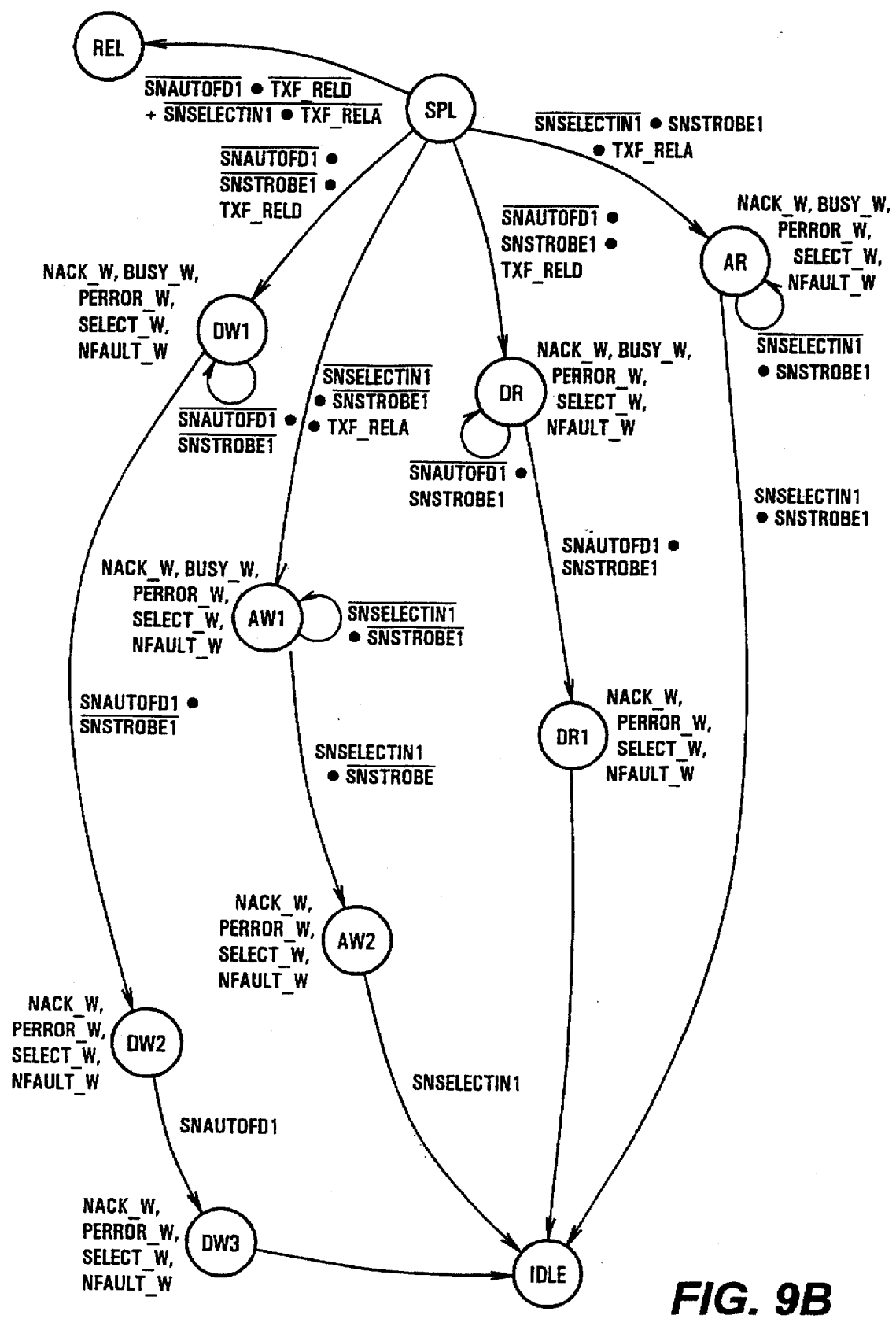

Referring now to FIGS. 9A and 9B, a state diagram is shown of a state machine PSTATE, which controls the handshaking between the EPP controller 142 and the host computer according to the IEEE 1284 standard. The inputs to the state machine PSTATE are state signals PSTATE[3:0] and signals SNSELCTIN1, SNAUTOFD1, SNSTROBE1, SNINIT1, STOP_SM, EN_SM, TXF_RELD, TXF_RELA, EPP_BYTE and TO. The signals SNSELECTIN1, SNAUTOFD1, SNSTROBE1, and SNINIT1 are latched versions of the 1284 parallel port signals NSELECTIN, NAUTOFD, NSTROBE, and NINIT, respectively. The outputs of the state machine PSTATE are state signals PSTATE_D[3:0] and signals NACK_W, BUSY_W, PERROR_W, SELECT_W, NFAULT_W, ON, T_RALU and T_RDLU.

The signal STOP_SM indicates that the system reset signal RESET is asserted high or the EPP controller 142 is not in hardware mode. When the signal STOP_SM is asserted high or if the signal STOP_SM is deasserted low and the signal SNINIT1 is asserted low, then the state machine PSTATE transitions to state RESET from any other state. In the ensuing description of the state machine PSTATE, the signal SNINIT1 is assumed to be deasserted high and the signal STOP_SM is assumed to be deasserted low. The state machine PSTATE remains in state RESET if any of the signals SNSELECTIN1, EN SM or EPP_BYTE is low or if the signal SNAUTOFD1 is high. In state RESET, the signals NACK_W and NFAULT_W are both asserted high. If the signal SNSELECTIN1 and the signal SNAUTOFD1 are asserted high and low, respectively, and the signals EN_SM and EPP_BYTE are both asserted high, then the state machine PSTATE transitions from state RESET to state NEGO1. The signal EPP_BYTE is asserted high when the parallel port data bus PD[7:0] contains the value 0×40. The signal EN_SM is asserted high if the signal EPP_REL is high and if the enhanced parallel port controller 142 is in hardware mode, as indicated by the mode register 143. Thus, the state machine PSTATE transitions to state NEGO1 after the proper negotiation signals for the EPP mode according to the 1284 protocol are presented by the host computer and after the state machine FSTATE (FIGS. 2A and 2B) has transitioned from state CST6 to state STOP. The transition of the state machine FSTATE from state CST6 to state STOP indicates that the EPP controller 142 has captured the flash command bytes and has seized control of the system bus 106, and thus is ready to receive signals from the parallel port 124. With the transition from state RESET to state NEGO1, the signals PERROR_W, SELECT_W and NFAULT_W are asserted high to indicate to the host computer that the hand-held computer system C is a 1284 compliant device. The state machine PSTATE stays in state NEGO1 if the signals SNSELECTIN1, SNSTROBE1 and EPP_BYTE are high and the signal SNAUTOFD1 is low. However, if the signals SNSELECTIN1 and EPP_BYTE are maintained high and the signals SNAUTOFD1 and SNSTROBE1 are asserted low, then the state machine PSTATE transitions from state NEGO1 to state NEG02. The signal NSTROBE is asserted low by the host computer for the purpose of latching in the extensibility value, which for the EPP communications mode is the value 0×40. The signals PERROR_W, SELECT_W and NFAULT_W are maintained high with the transition.

The state machine PSTATE stays in state NEG02 if the signals SNSELECTIN1 and EPP_BYTE are maintained high and if either of the signals SNSTROBE1 or SNAUTOFD1 is asserted low. If both signals SNAUTOFD1 and SNSTROBE1 are both deasserted high, the state machine PSTATE transitions from state NEGO2 to state REL, where the signals NACK_W, PERROR_W, SELECT_W and NFAULT_W are asserted high. The signals NSTROBE and NAUTOFD are brought back high by the host computer to acknowledge that the host computer has recognized that the hand-held computer C is a 1284 compliant device. By asserting the signal NACK_W high, the state machine PSTATE is indicating to the host computer that the other parallel port status lines, including the status signal BUSY, can be read.

The state machine PSTATE stays in state REL until either of signals TXF_RELD or TXF_RELA is asserted high. If either of the signals is asserted high, then the state machine PSTATE transitions from state REL to state IDLE, where the signals NACK_W, PERROR_W, SELECT_W and NFAULT_W are maintained high. The signals TXF_RELD and TXF_RELA, when asserted high, indicate that the EPP controller 142 is ready to begin a data or address transfer, respectively.

In state IDLE, if both signals TXF_RELD and TXF_RELA are low, the state machine PSTATE transitions back to state REL. The state machine stays in state IDLE if the signals SNSELECTIN1 and TXF_RELA are high and the signal TXF_RELD is low, or if the signals SNAUTOFD1 and TXF_RELD are high and the signal TXF_RELA is low, or all of the signals SNSELECTIN1, SNAUTOFD1, TXF_RELD and TXF_RELA are high. When the signal SNSELECTIN1 is asserted low, an address cycle is requested. When the signal SNAUTOFD1 is asserted low, a data cycle is asserted. If the signals SNSELECTIN1 and TXF_RELD are high and the signal SNAUTOFD1 is low, or the signals SNAUTOFD1 and TXF_RELA are high and the signal SNSELECTIN1 is low, then the state machine PSTATE transitions from state IDLE to state WAIT. Thus, the state machine transitions to the state WAIT when an address cycle is requested by the host computer and the EPP controller 142 is ready to receive or transmit an address, or if a data cycle is requested by the host computer and the EPP controller 142 is ready to receive or transmit data. The signals NACK_W, PERROR_W, SELECT_W, and NFAULT_W are maintained high and the signal ON is asserted high with the transition.

The asserted signal ON enables a timeout counter 1032 (FIG. 10A below) to increment. The state machine PSTATE stays in state WAIT until the timeout signal TO is asserted high, at which time the state machine PSTATE transitions to state SPL, where the signals NACK_W, PERROR_W, SELECT_W, NFAULT_W are maintained high. In state SPL, if the signals SNAUTOFD1 anSNSELECTID are low or if the signals SNSELECTIN1 and TXF_RELA are low, then the state machine PSTATE returns to state REL. These conditions indicate that neither a data or address transfer is requested, nor is the EPP controller 142 ready to perform an address or data transfer.

If the signals SNAUTOFD1 and SNSTROBE1 are asserted low and the signal TXF_RELD is asserted high, which indicate a data write cycle, then the state machine PSTATE transitions from state SPL to state DW1, where the signals NACK_W, BUSY_W, PERROR_W, SELECT_W and NFAULT_W are set high. When the signal BUSY_W transitions high, that indicates to the host computer that the EPP controller 142 is responding to the requested cycle. In response, the host computer deasserts the signal NAUTOFD high. Thus, the state machine PSTATE remains in state DW1 if both signals SNAUTOFD1 and SNSTROBE1 are asserted low. If the signal SNAUTOFD1 is asserted high and the signal SNSTROBE1 is maintained low, then the state machine PSTATE transitions to state DW2, where the signals NACK_W, PERROR_W, SELECT_W and NFAULT_W are maintained high and the signal BUSY_W is asserted low to indicate to the host computer that the EPP controller 142 is ready to receive the next cycle. In state DW2, if the signal SNAUTOFD1 is maintained deasserted high, the state machine PSTATE transitions to state DW3, where the signals NACK_W, PERROR_W, SELECT_W and NFAULT_W are maintained high and the signal BUSY_W is maintained low. From state DW3, the state machine transitions back to state IDLE.

If in state SPL, the signals SNSELECTIN1 and SNSTROBE1 are asserted low and the signal TXF RELA is asserted high, which indicate an address write cycle, then the state machine PSTATE transitions to state AW1, where the signals NACK_W, SELECT_W, PERROR_W, and NFAULT_W are maintained high and the signal BUSY_W is deasserted high. The low-to-high transition of the signal BUSY_W indicates to the host computer that the EPP controller 142 is ready to receive the address. The state machine PSTATE remains in state AW1 until the host computer deasserts the signal NSELECTIN to acknowledge receipt of the signal BUSY. Thus, if the signal SNSELECTIN1 is deasserted high and the signal SNSTROBE1 is maintained low, then the state machine PSTATE transitions from state AW1 to AW2, where the address is latched into the EPP controller 142. If the signal SNSELECTIN1 remains deasserted high, the state machine PSTATE transitions from state AW2 to state IDLE.

If in state SPL, the signal SNAUTOFD1 is asserted low, the signal SNSTROBE1 is deasserted high, and the signal TXF_RELD is asserted high, which indicate a data read cycle, then the state machine PSTATE transitions to state DR. The signals NACK_W, PERROR_W, SELECT_W and NFAULT_W are maintained high and the signal BUSY_W is deasserted high. Right before the signal BUSY_W is brought high, valid data has already been provided by the EPP controller 142 to the parallel port data bus PD[7:0] for transfer to the host computer. The low-to-high transition of the signal BUSY_W indicates to the host computer that valid data exists on the parallel port data bus PD[7:0]. In response, the host computer reads the data and deasserts the signal NAUTOFD, which causes the state machine PSTATE to transition to state DR1, where the signals NACK_W, PERROR_W, SELECT_W and NFAULT_W are maintained high. The state machine then transitions from state DR1 to state IDLE.

If in state SPL, the signal SNSELECTIN1 is asserted low, the signal SNSTROBE1 is deasserted high, and the signal TXF_RELA is asserted high, which indicate an address read cycle, then the state machine PSTATE transitions to state AR, where the signals NACK_W, PERROR_W, SELECT_W and NFAULT_W are maintained high and the signal BUSY_W is deasserted high. The low-to-high transition of the signal BUSY_W indicates to the host computer that an address byte is valid on the parallel port data bus PD[7:0]. The state machine PSTATE stays in state AR while the signal SNSELECTIN1 is asserted low and the signal SNSTROBE1 is deasserted high. During this time, the host computer is reading the address byte. The host computer then deasserts the signal NSELECTIN, which causes the signal SNSELECTIN1 to also be deasserted high. In response, the state machine PSTATE returns from state AR to state IDLE.

The parallel port input signals to the EPP controller 142, which include the data bus PD[7:0] and the status signals NSELECTIN, NSTROBE, NAUTOFD, and NINIT, are all double buffered. Double buffering is necessary because the parallel port signals provided by the host computer are asynchronous to the clock CLK14M. The signals are double buffered to ensure that the EPP controller 142 properly recognizes the state of the parallel port signals.

Figure 10A:
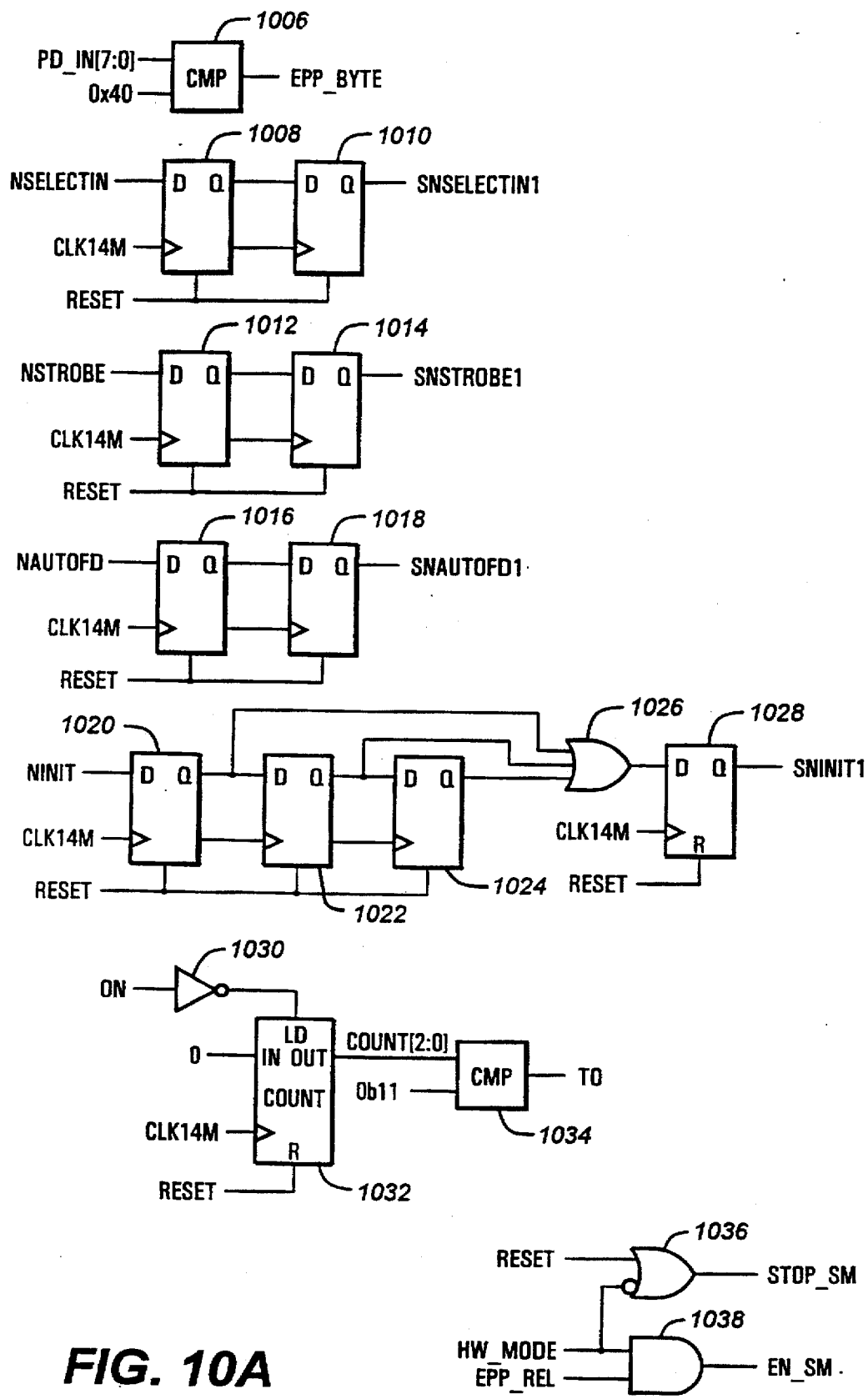
FIGS. 10A and 10B are a logic diagram of circuitry that interfaces with signals provided to and by the state machine of FIGS. 9A and 9B.

Referring now to FIG. 10A, the logic that provides certain of the input signals to the state machine PSTATE is shown.

The parallel port data inputs PD_IN[7:0], provided by the register 350 in FIG. 3, is provided to an input of a comparator 1006. If the comparator determines that the value of the data inputs PD_IN[7:0] is equal to the value 0x40, then the signal EPP_BYTE is asserted high.

The parallel port signals NSELECTIN, NSTROBE, and NAUTOFD are connected to the D inputs of D flip-flops 1008, 1012 and 1016, respectively, whose outputs are connected to the D inputs of D flip-flops 1010, 1014 and 1018, respectively. The D flip-flops 1008–1018 are clocked by CKL14M and reset by the signal RESET. The signals SNSELECTIN1, SNSTROBE1, and SNAUTOFD1 are provided by the outputs of the D flip-flops 1010, 1014, and 1018, respectively.

The signal NINIT is connected to the D input of a D flip-flop 1020. The output of the D flip-flop 1020 is connected to the D input of another D flip-flop 1022 and to a first input of a three-input OR gate 1026. The output of the D flip-flop 1022 is connected to the D input of a D flip-flop 1024 and to a second input of the OR gate 1026. The output of the D flip-flop 1024 is connected to the third input of the OR gate 1026. The output of the OR gate 1026 is connected to the D input of a D flip-flop 1028, which generates the signal SNINIT1. The D flip-flops 1020, 1022, 1024 and 1028 are all clocked by CKL14M and reset by the signal RESET. The combination of the D flip-flops 1020–1028 and the OR gate 1026 serves to extend the pulse of the parallel port status signal NINIT by six CLK14M cycles.

The timeout signal TO is generated by the combination of an inverter 1030, the counter 1032, and a comparator 1034. The signal ON, generated by the state machine PSTATE, is provided to the input of the inverter 1030, whose output is connected to the load input of the counter 1032. The data input of the counter 1032 is connected to the value 0b000, and its clock input is connected to CLK14M. The counter 1032 is reset by the signal RESET. Thus, if the signal ON is deasserted low, then the value 0b000 is loaded into the counter 1032 on the rising edge of each clock CLK14M, which prevents the counter 1032 from counting. If the signal ON is asserted high, then the load input of the counter 1032 is disabled, which allows the counter 1032 to increment with the rising edge of each clock CLK14M. The output of the counter 1032 is connected to signals COUNT[2:0], which are provided to an input of the comparator 1034. If the value of the signals COUNT[2:0] is equal to the value 0b11, then the comparator 1034 asserts the timeout signal TO high.

The signal STOP_SM is provided by an OR gate 1036, whose inputs are connected to the signal RESET and the inverted state of a signal HW_MODE. The signal HW_MODE is provided by the mode register 143 to indicate that the EPP controller 142 is in hardware mode. Thus, if the EPP controller 142 is not in hardware mode or the signal RESET is high, the OR gate 1036 asserts the signal STOP_SM high to prevent the state machine PSTATE from functioning.

The signal EN_SM is provided by an AND gate 1038, whose inputs are connected to the signals EPP_REL and HW_MODE. As noted earlier, the signal EPP_REL is asserted high when the state machine FSTATE has transitioned to state STOP (FIGS. 2A and 2B), which indicates either that a timeout condition has occurred, erroneous flash command bytes have been loaded into the EPP controller 142, or the flash command bytes have been successfully loaded and the EPP controller 142 has obtained control of the system bus 106. In the case of the timeout or error causing the state machine FSTATE to transition to state STOP, however, the signal TXF_REL would not be asserted high. As a result, the state machine PSTATE would stay in state REL, which would cause the EPP controller 142 not to respond to further requests by the host computer.

Figure 10B:
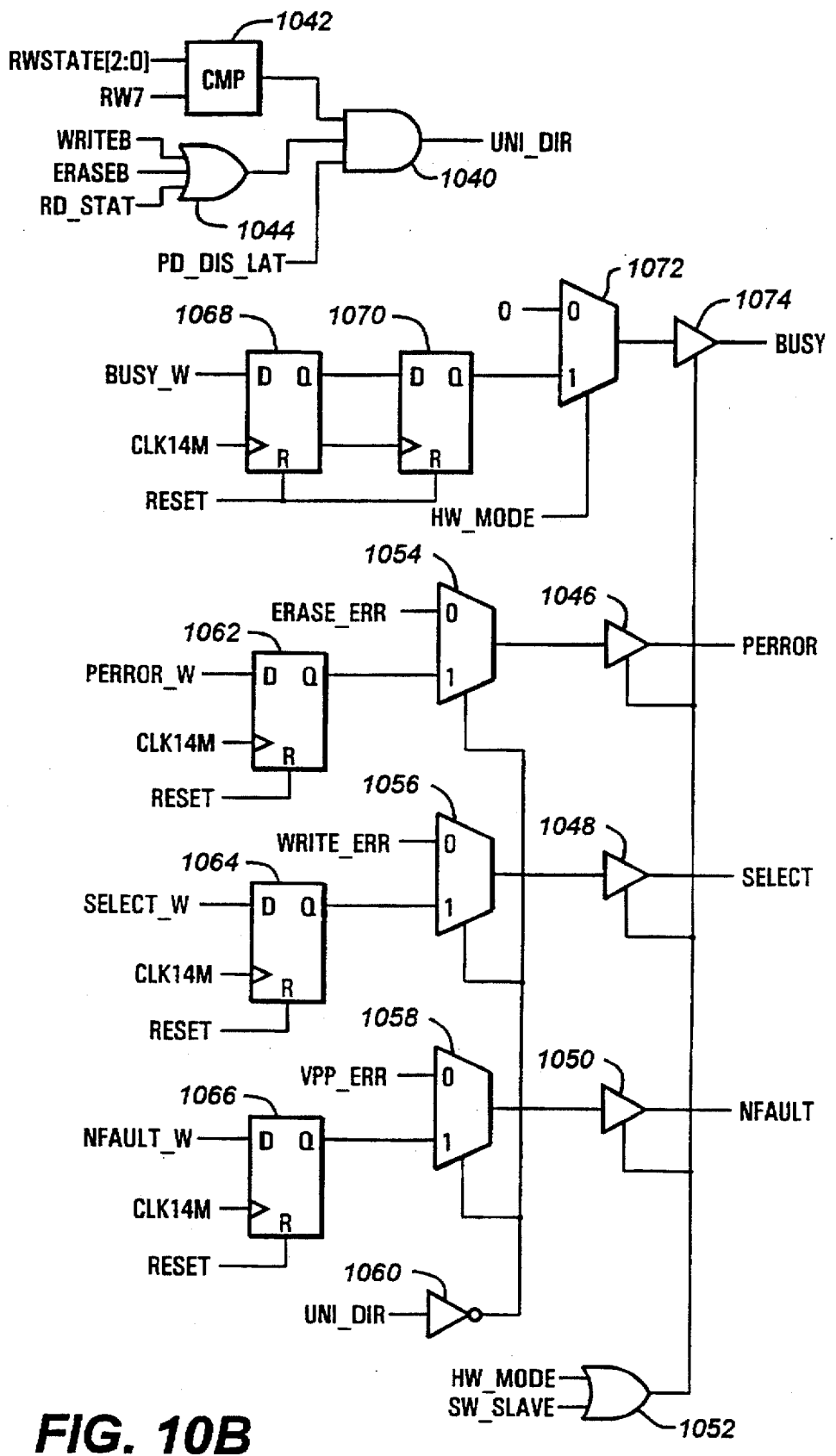

Referring now to FIG. 10B, logic for interfacing with certain of the output signals of the state machine PSTATE is shown. If the parallel port 124 is disabled via the parallel port disable command, then the signal PD_DIS_LAT is asserted high. The signal PD_DIS_LAT is provided to an input of an AND gate 1040, whose other inputs are connected to the output of a comparator 1042 and the output of an OR gate 1044. The output of the AND gate 140 provides the signal UNI_DIR.

The comparator 1042 determines if the state machine RWSTATE (FIGS. 11A–11C below) is in state RW7, which indicates the status bits output phase of a write operation, block erase operation, or a read status register operation. The inputs of the OR gate 1044 are connected to signals WRITEB, ERASEB and RD_STAT. Thus, if the state machine RWSTATE is in state RW7, and a write, block erase or read status register operation is being performed, and the parallel port 124 has been disabled, then the signal UNI_DIR is asserted high. If the parallel port 124 is disabled, the block erase error flag ERASE_ERR, the write error flag WRITE_ERR, and the VPP error flag VPP_ERR from the flash memory status register are provided to the host computer through the parallel port status signals PERROR, SELECT and NFAULT instead of through the parallel port data bus PD[7:0].

The parallel port signals PERROR, SELECT and NFAULT are driven by tristate buffers 1046, 1048 and 1050, respectively. The tristate buffers 1046, 1048 and 1050 are enabled by the output of an OR gate 1052, whose inputs are connected to the signals HW_MODE and SW_SLAVE. The signals HW_MODE and SW_SLAVE are provided by the mode register 143 and indicate hardware mode and software slave mode, respectively. Thus, the tristate buffers 1046, 1048 and 1050 are always enabled when the EPP controller 142 is in hardware mode.

The inputs of the tristate buffers 1046–1050 are connected to the outputs of multiplexors 1054, 1056 and 1058, respectively. The multiplexors 1054–1058 are each selected by the output of an inverter 1060, whose input is connected to the signal UNI_DIR. The 0 inputs of the multiplexors 1054–1058 are connected to the signals ERASE_ERR, WRITE_ERR and VPP_ERR, respectively. The 1 inputs of the multiplexors 1054–1058 are connected to the outputs of D flip-flops 1062, 1064 and 1066, respectively. The inputs of the D flip-flops 1062–1066 are connected to the signals PERROR_W, SELECT_W and NFAULT_W, respectively, which are provided by the state machine PSTATE. The registers 1062–1066 are clocked by CLK14M and reset by the signal RESET. Thus, when the signal UNI DIR is asserted high, indicating that status bits from the flash memory status register are to be outputted, the state of the status bits ERASE_ERR, WRITE_ERR, and VPP_ERR are placed onto signals PERROR, SELECT, and NFAULT, respectively.

The signal BUSY_W, generated by the state machine PSTATE, is connected to the D input of a D flip-flop 1068, whose output is connected to the D input of a D flip-flop 1070. Both D flip-flops 1068 and 1070 are clocked by CLK14M and reset by the signal RESET. The output of the D flip-flop 1070 is connected to the 1 input of a multiplexor 1072, whose 0 input is tied to ground. The multiplexor 1072 is selected by the signal HW_MODE. The output of the multiplexor is provided to the input of a tristate buffer 1074, which drives the parallel port signal BUSY. The tristate buffer 1074 is enabled by the output of the OR gate 1052. Thus, if the EPP controller 142 is in hardware mode, then the state of the signal BUSY_W is driven onto the signal BUSY. Otherwise, if the EPP controller 142 is in software slave mode, the signal BUSY is pulled low.

Figure 11A:
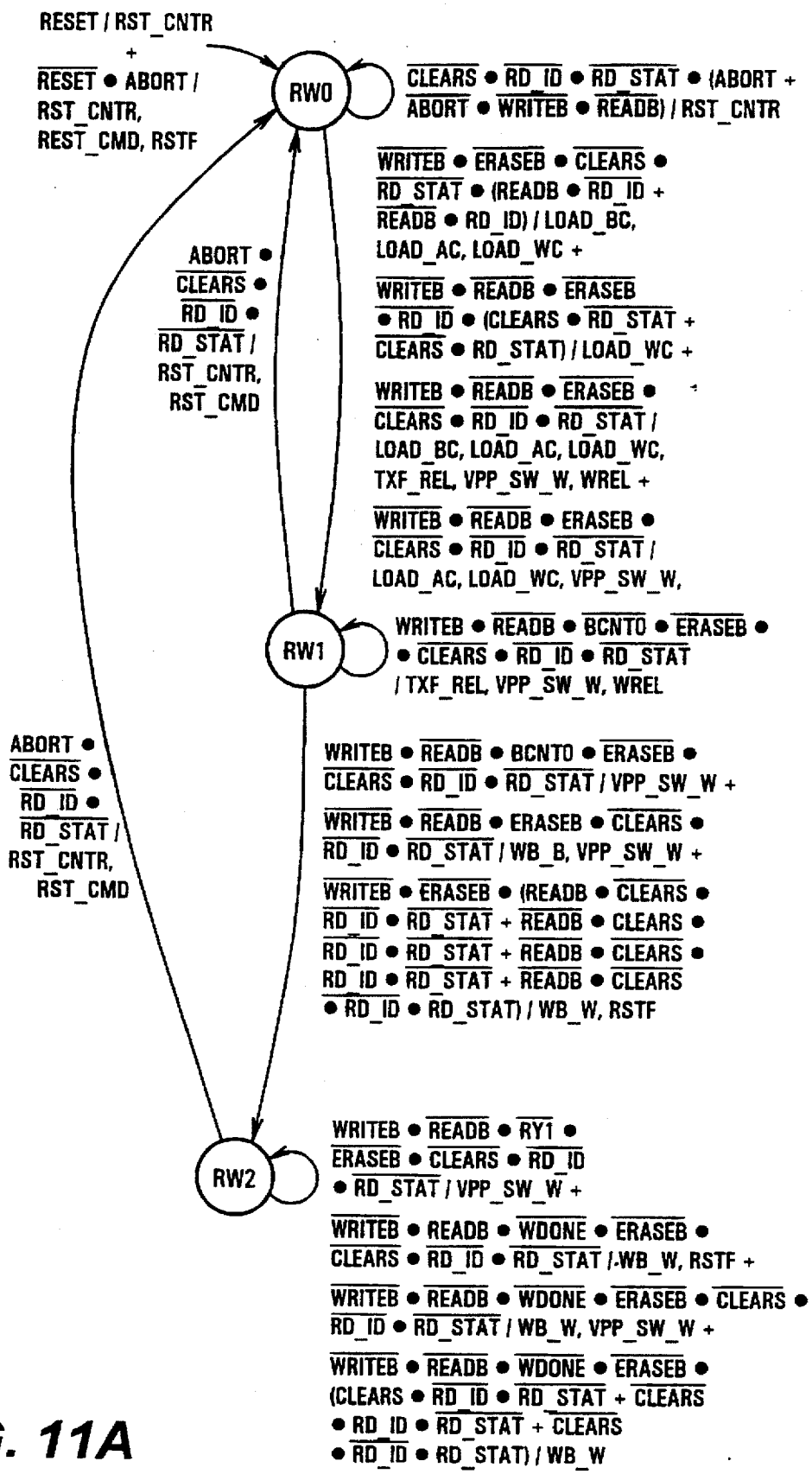
FIGS. 11A–11C are a state diagram of a state machine that controls the read and write to the flash memory devices located in the computer system of FIG. 1.
Figure 11B:
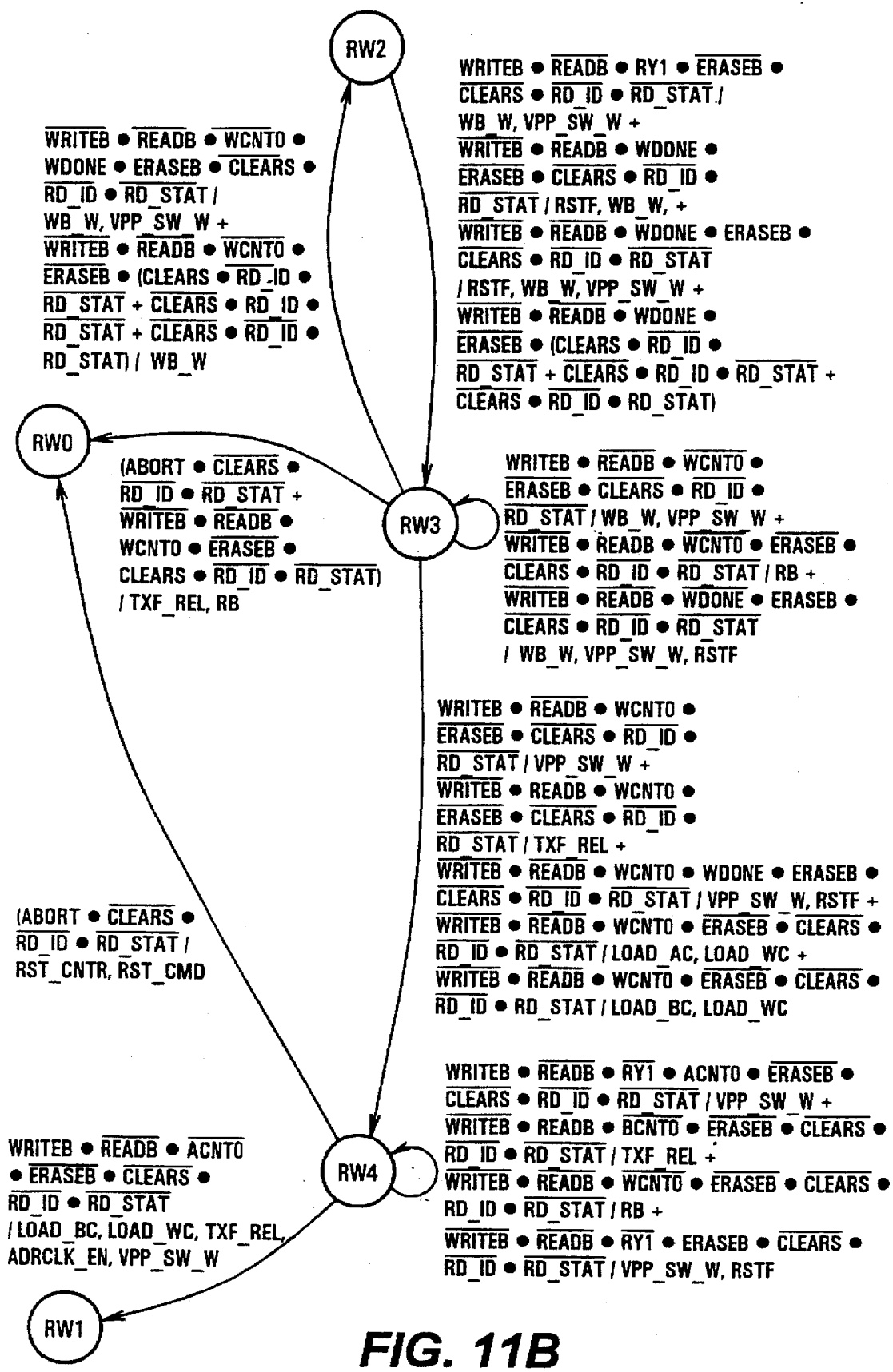
Figure 11C:
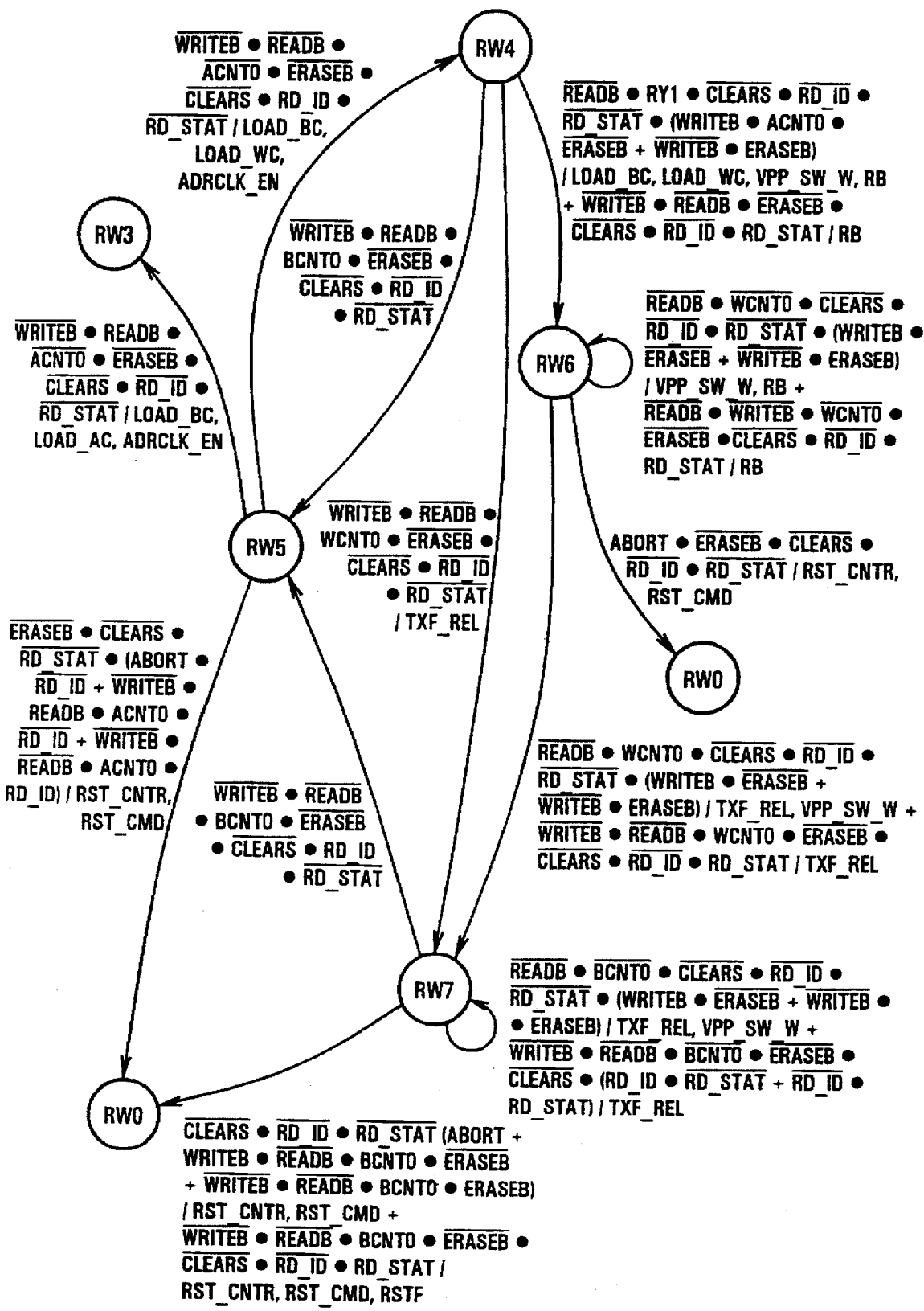

Referring now to FIGS. 11A, 11B and 11C, a state diagram is shown of the state machine RWSTATE, which controls data and address transfers between the EPP controller 142 and the flash EEPROMs 144 and 146. The inputs to the state machine RWSTATE are state signals RWSTATE [2:0] and signals WRITEB, READB, RY1, BCNT0, WCNT0, ACNT0, RESET, ABORT, WDONE, ERASEB, CLEARS, RD_ID and RD_STAT. The outputs of the state machine RWSTATE are state signals RWSTATE D[2:0] and signals LOAD_BC, LOAD_AC, LOAD_WC, WB_W, TXF_REL, RST_CNTR, ADRCLK_EN, VPP_SW_W, RB, RST_CMD, RSTF and WREL. Assertion of the signal TXF_REL causes the signal TXF_RELA to be asserted during an address cycle and the signal TXF_RELD to be asserted during a data cycle.

On a system reset, the signal RESET is asserted high to cause the state machine RWSTATE to enter into state RW0. With the transition, the signal RST_CNTR is asserted high. As described above, the signal RST_CNTR is used to reset the address counter 800, the byte counter 802 and the word counter 804. Also, when a termination initiation cycle is executed by the host computer, as indicated by the signal NINIT being asserted low, the signal ABORT is asserted high to cause the state machine RWSTATE to enter into state RW0. With this transition, the signals RST_CNTR, RST_CMD and RSTF are asserted high. The reset signal RST_CMD is used to reset the D flip-flops 708, 716, 724, 732, 740, 756 and 748 used to generate the signals WRITEB, READB, ERASEB, CLEARS, RD_ID, PD_DIS and RD_STAT, respectively.

The state machine RWSTATE remains in state RW0 if a command cycle is not being requested by the host computer, as indicated by the signals CLEARS, RD_ID, RD_STAT being deasserted low and either the signals ABORT, WRITEB and READB being deasserted low or the signal ABORT being asserted high. While the state machine remains in state RW0, the signal RST_CNTR is maintained high.

One of several commands requested by the host computer will cause the state machine RWSTATE to transition from state RW0 to state RW1. The first of these is a write command, which is indicated by the signal WRITEB being asserted high and the signals READB, ERASEB, CLEARS, RD_ID and RD_STATE being deasserted low. This causes the signals LOAD_BC, LOAD_AC, LOAD_WC, TXF_REL, VPP_SW_W and WREL to be asserted high. As discussed above, the signal LOAD_BC loads the byte counter 802, the signal LOAD_AC loads the address counter 800 and the signal LOAD_WC loads the word counter 804 to initialize those counters. The signal TXF_REL indicates to the state machine PSTATE that a transfer can be started. The signal WREL is provided to enable the clock input to the byte counter 802 when the state machine PSTATE reaches state DW3, which indicates that the EPP controller 142 is in the process of executing a data write cycle. The signal VPP_SW_W is generated to cause the 12-volt power supply voltage VPP to be asserted to the flash EEPROMs 144 or 146.

A block erase command from the host computer also causes the state machine RWSTATE to transition from state RW0 to state RW1. The block erase command is indicated by the signal ERASEB being asserted high and the signals WRITEB, READB, CLEARS, RD_ID and RD_STAT being deasserted low. This causes the output signals LOAD_AC, LOAD_WC and VPP_SW_W to be asserted. Only the address and word counters 800 and 804 are initialized, since no data is transferred from the host computer through the parallel port 124.

A clear status register or a read status register command also causes the state machine RWSTATE to transition to state RW1. The clear status register command is indicated by the signal CLEARS being asserted high and the signal RD_STAT being deasserted low. The read status command is indicated by the signal RD_STAT being asserted high and the signal CLEARS being deasserted low. In both cases, the signals WRITEB, READB, ERASEB and RD_ID are deasserted low. Either of these commands causes the signal LOAD_WC to be asserted high. For these two commands, the only data that need be provided to the flash EEPROMs 144 or 146 are the command addresses that are written to the command user interface. As a result, only the word counter 804 is needed, with the address counter 800 and the byte counter 802 not being used.

The transition to state RW1 also occurs if a read array command or a read ID command is requested. The read array command is indicated by the signal READB being asserted high and the signal RD_ID being deasserted low. The read ID command is indicated by the signal RD_ID being asserted high and the signal READB being deasserted low. In both cases, the signals WRITEB, ERASEB, CLEARS and RD_STAT are deasserted low. The signals LOAD_BC, LOAD_AC, LOAD_WC are asserted high in both cases.

For a write command, the state machine RWSTATE remains in state RW1 until the byte counter 802 causes the signal BCNT0 to be asserted high, indicating that the desired number of bytes have been transferred through the parallel port 124 to the EPP controller 142. Thus, the state machine RWSTATE stays in state RW1 while the signal WRITEB is asserted high and the signals READB, BCNT0, ERASEB, CLEARS, RD_ID and RD_STAT are deasserted low. While in state RW1, the signals TXF_REL, VPP_SW_W, and WREL are asserted high. The signal TXF_REL indicates to the state machine PSTATE that more data is expected from the host computer. The signal WREL enables the clocking of the byte counter 802 whenever the state machine PSTATE reaches state DW3.

For a write command, the state machine RWSTATE transitions from state RW1 to RW2 if the signal BCNT0 is asserted high This transition indicates that the desired number of bytes has been transferred from the host computer and causes the signal VPP_SW_W to be maintained high.

Figure 12:
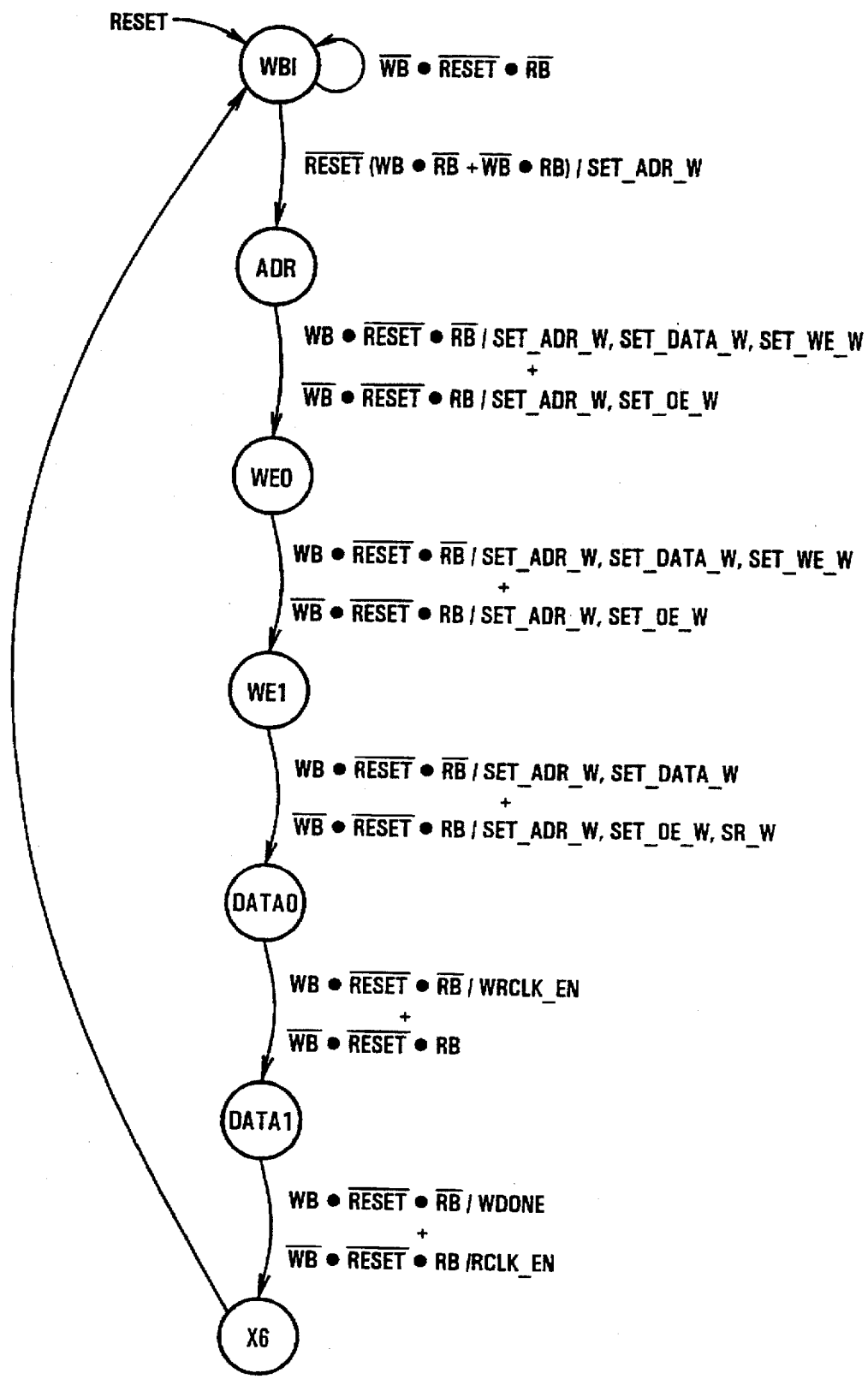
FIG. 12 is a state diagram of a state machine that controls the input signal timings to the flash memory devices located in the computer system of FIG. 1.

For a block erase operation, the state machine RWSTATE transitions directly from state RW1 to state RW2, causing the signals WB_W and VPP_SW_W to be asserted high. The purpose of the signal WB_W is described later in conjunction with a state machine RWBYTE (FIG. 12). A read array command, a clear status register command, a read ID command, and a read status register command also cause the state machine RWSTATE to directly transition from state RW1 to state RW2. These operations cause the signals WB_W and RSTF to be asserted high.

For a write command, the state machine RWSTATE stays in state RW2 while the signal RY1 is deasserted low, indicating that the flash EEPROMs 144 or 146 are not ready for a write cycle. The output signal VPP_SW_W is maintained high.

For a read array command, the state machine RWSTATE remains in state RW2 if the signal WDONE is not asserted high. The signal WDONE, when asserted high, indicates that the state machine RWBYTE (FIG. 12) has completed transferring data to the flash EEPROMs 144 or 146. At this stage, the data transferred is the command address 0×FF written to the command user interface of the flash EEPROMs 144 or 146. For the read array command, the signals WB_W and RSTF are asserted high in state RW2.

Similarly, the state machine RWSTATE remains in state RW2 for a block erase command if the signal WDONE is deasserted low. The signals WB_W and VPP_SW_W are asserted high in this case. For the block erase command, the command address 0×20 is written to the command user interface of the flash EEPROMs 144 or 146 in state RW2.

For the clear status register, read ID, or read status register commands, the state machine RWSTATE also remains in state RW2 if the signal WDONE is deasserted low. For these commands, the signal WB_W is asserted high. The command addresses written to the command user interface of the flash EEPROMs 144 or 146 are 0×50, 0×90, and 0×70 for the clear status register, read ID, and read status register commands, respectively.

From state RW2, the state machine RWSTATE returns to state RW0 if a termination initiation command is issued, as indicated by the signal ABORT being asserted high and the signals CLEARS, RD_ID, and RD_STAT being deasserted low. With the transition, the signals RST_CNTR and RST_CMD are asserted high by the state machine RWSTATE.

In state RW2, if the write command is asserted, the state machine RWSTATE transitions to state RW3 if the ready signal RY1 is asserted high by the flash EEPROMs 144 or 146. The signal RY1, which is the input to the state machine RWSTATE, is a latched version of the signal RY. With this transition, the state machine RWSTATE asserts the signals WB_W and VPP_SW_W high. The transition to state RW3 occurs after the flash EEPROMs 144 or 146 have indicated that they are ready for a write operation.

For a read array command, the transition to state RW3 occurs if the signal WDONE is asserted high, indicating that the command address 0×FF has been written. For this transition, the signals WB_W and RSTF are asserted high. The transition to state RW3 indicates that the flash EEPROMs 144 or 146 have been placed into read mode. As will be described below in FIG. 13, all the banks of the flash EEPROMs 144 or 146 are selected during the command address write phase of the read array operation. Thus, the command address write in state RW2 programs all the flash EEPROMs 144 or 146 to the read state simultaneously.

For a block erase command, the transition to state RW3 occurs if the signal WDONE is asserted high. For this transition, the signals WB_W, RSTF and VPP_SW_W are asserted high.

For the clear status register, read ID and read status register commands, the transition to state RW3 similarly occurs when the signal WDONE is asserted high. For these transitions, all the output signals of the state machine RWSTATE are deasserted low.

The state machine RWSTATE remains in state RW3 in a write operation if the signal WCNT0 is deasserted low, which indicates that the word counter 804 has not completed decrementing. As noted above, the command sequence for the write command consists of two cycles. The first cycle writes the command address 0×40 to the command user interface. The second cycle performs the actual write to the array of the selected bank of the flash EEPROMs 144 or 146. This process is repeated for each selected bank of flash EEPROMs 144 or 146. Referring back to FIG. 8, the clock input to the word counter 804 is enabled during a write command only if the signal OUT_DIR is also high. The signal OUT_DIR is toggled on the assertion of the signal WDONE, which is asserted by the state machine BSCAN (FIG. 12 below) to indicate the completion of a write, either to the user command interface or the array, the flash EEPROMs. Consequently, the word counter 804 is decremented once the two-cycle command sequence has been executed. As a result, the state machine RWSTATE remains in state RW3 until the command sequence has been executed to all the selected banks of the flash EEPROMs 144 or 146, as indicated by the signal WCNT0 being asserted high. The signals WB_W and VPP_SW_W are asserted high.

For a read array operation, the state machine RWSTATE remains in state RW3 if the signal WCNT0 is deasserted low, indicating that the appropriate number of words have not yet been read from the flash EEPROMs 144 or 146. The signal RB is asserted high by the state machine RWSTATE to enable the read.

For the block erase operation, the state machine RWSTATE remains in state RW3 if the signal WDONE is deasserted low. In this case, the signals WB_W, VPP_SW_W and RSTF are asserted high. For the block erase operation, the state machine RWSTATE transitions from state RW3 back to RW2 if the signal WDONE is asserted high and the signal WCNT0 is low. This causes the signals WB_W and VPP_SW to be asserted high. As noted earlier, two command addresses must be written to the command user interface for a block erase command. In state RW2, where the signal RSTF is deasserted low, the first command address 0×20 is written. In state RW3, where the signal RSTF is asserted high, the second command address 0×D0 is written. The transitions between states RW2 and RW3 continue until the command addresses have been written to all the selected banks of flash EEPROMs 144 or 146, which is indicated by the signals WCNT0 and WDONE both asserted high. After the command addresses have been written to all the banks of flash EEPROMs 144 or 146, the state machine RWSTATE transitions to state RW4, asserting the signals VPP_SW_W and RSTF high.

For the clear status register, read ID and read status register commands, the state machine RWSTATE transitions back to state RW2 from state RW3 if the signal WCNT0 is deasserted low. With the transition, the signal WB_W is asserted high. For these commands, the corresponding signal command addresses must be individually written to each selected bank of the flash EEPROMs 144 or 146. The command address write is performed in state RW2.

The state machine RWSTATE transitions from state RW3 back to state RW0 if one of two conditions occur: the signals ABORT is asserted high and the signals CLEARS, RD_ID and RD_STAT are deasserted low, or the signal WCNT0 is asserted high in a clear status register operation. In both cases, the signals TXF_REL and RB are asserted high. Thus, the clear status register operation ends once the status registers of the selected banks of flash EEPROMs 144 or 146 have been cleared.

The state machine RWSTATE transitions from state RW3 to state RW4 if the signal WCNT0 is asserted high for a write operation, a read array operation, a read ID operation or a read status register operation. For the write operation, the signal VPP_SW_W is maintained high to allow the flash memory bits to be programmed. For the read array operation, the signal TXF_REL is asserted high. For the read ID operation, the signals LOAD_AC and LOAD_WC are asserted high to begin the transfer of the IDs from the flash EEPROMs 144 or 146 to the EPP controller 142. For the read status register operation, the signals LOAD_BC and LOAD_WC are asserted high to begin the transfer of the status bits to the host computer.

From state RW4, the state machine RWSTATE transitions back to state RW0 if the signal ABORT is asserted high and the signals CLEARS, RD_ID and RD_STAT are deasserted low. With this transition, the signals RST_CNTR and RST_CMD are asserted high.

The state machine RWSTATE transitions from state RW4 to state RW1 for a write operation if the signal ACNT0 is deasserted low, indicating that one block of memory has not been completely written. Thus, the state machine RWSTATE transitions repeatedly between states RW1 and RW4 while it is writing a block of the flash EEPROMs 144 or 146. With the transition from state RW4 to state RW1, the signals LOAD_BC, LOAD_WC, TXF_REL, ADRCLK_EN and VPP_SW_W are all asserted high to begin a write to the next address location. As noted earlier, the signal TXF_REL indicates to the host computer that the EPP controller 142 is ready to accept the next transfer of data and the signal ADRCLK_EN is asserted high to enable the decrementing of the address counter 800.

The state machine RWSTATE remains in state RW4 under several conditions. For a write operation, the state machine RWSTATE remains in state RW4 if the ready signal RY1 is deasserted low and the signal ACNT0 is asserted high. In this situation, the signal VPP_SW_W is asserted high. This indicates that a block of the flash EEPROMs 144 or 146 has been programmed, but that the last programming step has not yet completed.

For a read array operation, the state machine RWSTATE remains in state RW4 if the signal BCNT0 is deasserted low, indicating that the requisite number of bytes have not been transferred to the host computer through the parallel port 124. The signal TXF_REL is asserted high in this situation to indicate to the state machine PSTATE (FIGS. 9A and 9B) that more data are available.

For a read ID operation, the state machine RWSTATE remains in state RW4 if the signal WCNT0 is deasserted low, indicating that the requisite number of words have not been transferred from the flash EEPROMs 144 or 146 to the EPP controller 142. The signal RB is asserted high in this case to enable the read operation.

For the block erase operation, the state machine RWSTATE remains in state RW4 if the ready signal RY1 is deasserted low. In this case, the signals VPP_SW_W and RSTF are asserted high. As with the write operation, the deasserted signal RY1 indicates that the erase operation of the flash EEPROMs 144 or 146 has not yet completed.

For the write operation, the state machine RWSTATE transitions from state RW4 to RW6 if the signals ACNTO and RY1 are asserted high, indicating that the write operation of an entire block has completed. For the block erase operation, the transition to state RW6 occurs if the ready signal RY1 is asserted high, indicating that the block erase operation has completed. For both these two cases, the signals LOAD_BC, LOAD_WC, VPP_SW_W and RB are asserted high. The signal RB is asserted high to retrieve the status register bits from the flash EEPROMs 144 or 146 to verify that the write or erase operations have completed successfully. The signals LOAD_BC and LOAD_WC are asserted high to begin transferring the status bits to the host computer.

For the read status register operation, the state machine transitions directly from state RW4 to RW6, asserting the signal RB high to enable the read of the status register bits.

For a read ID operation, the state machine RWSTATE transitions from state RW4 to RW7 if the signal WCNT0 is asserted high, which indicates that the ID bits have been read from the selected banks of the flash EEPROMs 144 or 146. With this transition, the transfer release signal TXF_REL is asserted high.

For a read array operation, the state machine RWSTATE transitions from state RW4 to RW5 if the signal BCNT0 is asserted high. All the output signals are deasserted low for this transition. The transition to state RW5 occurs after the appropriate number of bytes has been transferred to the host computer.

The state machine RWSTATE remains in state RW6 in a write or erase operation if the signal WCNT0 is deasserted low. This indicates that the selected number of words of the flash memory status bits have not yet been transferred to the EPP controller 142. The signals VPP_SW_W and RB remain asserted high to allow the status bits of the flash EPPROMs 144 or 146 to be read.

Similarly, for the read status register operation, if the signal WCNT0 is deasserted low, the state machine remains in state RW6, with the signal RB being asserted high.

The state machine transitions from state RW6 to state RW0 if the signal ABORT is asserted high and the signals ERASEB, CLEARS, RD_ID and RD_STAT are deasserted low. With this transition, the reset signals RST_CNTR or RST_CMD are asserted high.

The state machine RWSTATE transitions from state RW6 to RW7 in the write or erase operation if the signal WCNT0 is asserted high, indicating that the transfer of the status bits has completed between the flash EEPROMs 144 or 146 and the EPP controller 142. The signals TXF_REL and VPP_SW_W are asserted high in both cases.

For the read status register operation, the transition from state RW6 to RW7 occurs if the signal WCNT0 is asserted high, indicating that all the status bits have been transferred. In this case, the signal TXF_REL is asserted high.

The state machine RWSTATE remains in state RW7 in a write or erase operation if the signal BCNTO is deasserted low, indicating that the selected number of bytes have not completed transferring from the EPP controller 142 to the host computer through the parallel port 124. The signals TXF_REL and VPP_SW_W are maintained high. The asserted signal TXF_REL indicates to the state machine PSTATE that more data are available for transfer.

Similarly, in the case of the read ID and read status register operations, the state machine RWSTATE remains in state RW7 if the signal BCNT0 is deasserted low. In these cases, only the signal TXF_REL is asserted high.

In the read ID operation, the state machine RWSTATE transitions from state RW7 to state RW5 once the signal BCNT0 is asserted high. All output signals from the state machine RWSTATE are deasserted low with this transition. In state RW5, if the signal ACNT0 is deasserted low, then the state machine transitions from state RW5 to RW4, asserting the signals LOAD_BC, LOAD_WC, and ADRCLK_EN to load the byte counter 802, load the word counter 804, and the decrement the address counter 800, respectively. Thus, the next word of the ID is retrieved from the flash EEPROMs 144 or 146 when the state machine transitions again from state RW4 to RW7 back to state RW5. For the read ID operation, if the signal ACNT0 is asserted in state RW5, then the state machine RWSTATE transitions back to state RW0, asserting signals RST_CNTR and RST_CMD.

As described earlier in FIG. 8, the address counter 800 is loaded with the value 1 in a read ID operation. Thus the address counter 800 decrements from the value 1 down to the value 0 to cause the signal ACNT0 to be asserted high. As discussed earlier, a read to address 0x00000 retrieves the manufacturer code while a read to the address 0x00001 returns the device code.

The state machine RWSTATE transitions from state RW7 to state RW0 if the signal ABORT is asserted high and the signals CLEARS, RD_ID, RD-STAT are deasserted low. The transition from state RW7 to RW0 also occurs for the write and erase operations if the signals BCNT0 is asserted high, indicating that the status bits from the flash EEPROMs 144 or 146 have completed transferring to the host computer. The signals RST_CNTR and RST_CMD are asserted high in all three cases.

In the case of the read status register operation, the transition to state RW0 occurs if the signal BCNT0 is asserted high. The output signals RST_CNTR, RST_CMD and RSTF are asserted high.

In a read array operation, the state machine RWSTATE transitions from state RW5 to state RW3 if the signal ACNT0 is deasserted low, indicating that a 64k block of the flash EEPROMs 144 or 146 has not completely being read. Thus the state machine RWSTATE transitions repeatedly from state RW3 to RW4 to RW5 until an entire block of the flash EEPROMs 144 or 146 has been read. The transition from state RW5 to RW3 causes the signals LOAD_BC, LOAD_WC and ADRCLK_EN to be asserted high. Once the entire block has been read, as indicated by the signal ACNT0 being asserted, the state machine RWSTATE transitions from state RW5 to state RW0. The state machine RWSTATE also transitions from state RW5 to state RW0 if the signal ABORT is asserted high and the signals ERASEB, CLEARS, RD_STAT and RD_ID are deasserted low. With this transition, the output signals RST_CNTR and RST_CMD are asserted high.

Referring now to FIG. 12, a state diagram of the state machine RWBYTE is shown which sets up the input signal timings to the flash EPPROMs 144 or 146. The inputs to the state machine RWBYTE are state signals RW_BYTE[2:0] and the signals WB, RESET and RB. The outputs of the state machine RWBYTE are state signals RW_BYTE_D[2:0] and signals SET_ADR_W, SET_DATA_W, SET_WE_W, WDONE, WRCLK_EN, RCLK_EN, SET_OE_W, and SR_W. When the system reset signal RESET is asserted high, the state machine RWBYTE transitions to state WBI. In the ensuing description of the state machine RWBYTE, the signal RESET is assumed to be low.

If both the signals WB and RB are deasserted low, the state machine remains in state WBI. If either of the signals WB or RB is asserted high, but not both, then the state machine transitions to state ADR. The transition causes the signal SET_ADR_W to be asserted high, which enables the outputs of the address counter 800 to be provided to the system address bus SA[20:1]. From state ADR, the state machine transitions to state WE0 if either the signal WB or RB is asserted high. If the signal WB is asserted high, then the output signals SET_ADR_W, SET_DATA_W and SET_WE_W are asserted high. The signal SET_DATA_W allows the EPP controller 142 to drive the system data bus SD[15:0]. The signal SET_WE causes the write enable input MEMWR, to the flash EEPROMs 144 or 146 to be asserted low, thereby enabling the flash EEPROMs 144 or 146 for a write operation.

If the signal RB causes the transition to state WE0, then the signals SET_ADR_W and SET_OE_W are asserted high. The signal SET_OE_W causes the output enable signal MEMRD* to be provided to the flash EEPROMs 144 or 146.

From state WE0, the state machine transitions to state WE1 if either of the signals WB or RB is asserted. If WB is asserted, then the signals SET_ADR_W, SET_DATA_W and SET_WE_W are asserted high. For a write command, this transition does not occur until the state machine RWSTATE has transitioned from state RW2 to RW3, which signifies that the flash EEPROMs 144 or 146 asserted the ready signal RY to indicate that they are ready to accept a data transfer. The data write to either the command user interface or the array of the flash EEPROMs 144 or 146 occurs in states WE0 and WE1.

If the signal RB is asserted to cause the state machine to transition from state WE0 to state WE1, the signals SET_ADR_W and SET_OE_W are asserted high. From the time that the address is driven onto the system address bus SA[20:1] in state ADR, two wait states WE0 and WE1 are required before the read data from the flash EEPROMs 144 or 146 are valid on the system data bus SD[15:0].

From state WE1, the state machine transitions to state DATA0 if either of the signals WB or RB is asserted high. If the signal WB causes the transition, then the signals SET_ADR_W and SET_DATA_W are asserted high. The address enable and data enable signals SET_ADR_W and SET_DATA_W are maintained high after the write enable signal SET_WE_W has been deasserted to ensure that the address and data signals provided on the system address and data buses SA[20:1] and SD[15:0], respectively, remain enabled to satisfy the hold time requirements of the flash EEPROMs 144 or 146.

If the signal RB causes the transition, then the signals SET_ADR_W, SET_OE_W and SR_W are asserted high. The signal SR_W indicates to the EPP controller 142 that the read data on the system data bus SD[15:0] is valid.

The state machine RWSTATE transitions from state DATA0 to state DATA1 if either of the signals WB or RB is asserted high. The signal WB causes the output signal WRCLK_EN to be asserted high, which enables the decrementing of the word counter 804. This indicates that one word has been written to either the command user interface or the array of the flash EEPROMs 144 or 146.

If the signal RB causes the transition from DATA0 to DATA1, then all the output signals of the state machine RWBYTE are deasserted low. For the data read cycle, the state DATA1 is inserted to ensure that the data from the flash EEPROMs 144 or 146 have properly propagated to the parallel port data bus PD[7:0].

The state machine transitions from state DATA1 to state X6 if either of the signals WB or RB is asserted high. If the signal WB is asserted high, then the signal WDONE is asserted to indicate to the state machine RWSTATE that the write operation has completed. If the signal RB is asserted high, then signal RCLK_EN is asserted high. The signal RCLK_EN enables the clocking of the word counter 804, thereby allowing data from the next bank of flash memory to be read. From state X6, the state machine RWBYTE returns to state WBI.

Figure 13A:
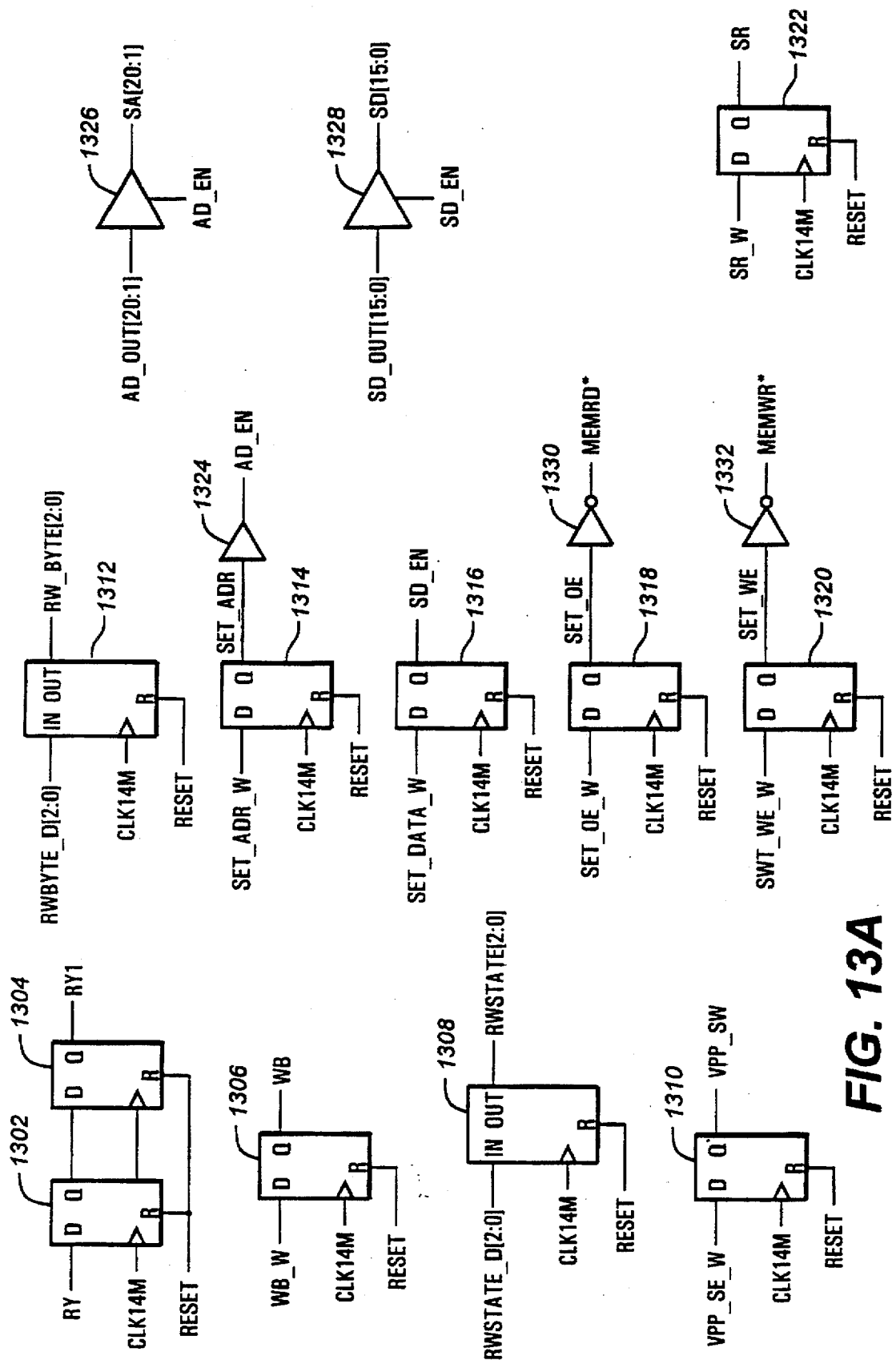
FIGS. 13A and 13B are a logic diagram of circuitry that interfaces with the signals provided to and by the state machines of FIGS. 11A–11C and 12.
Figure 13B:
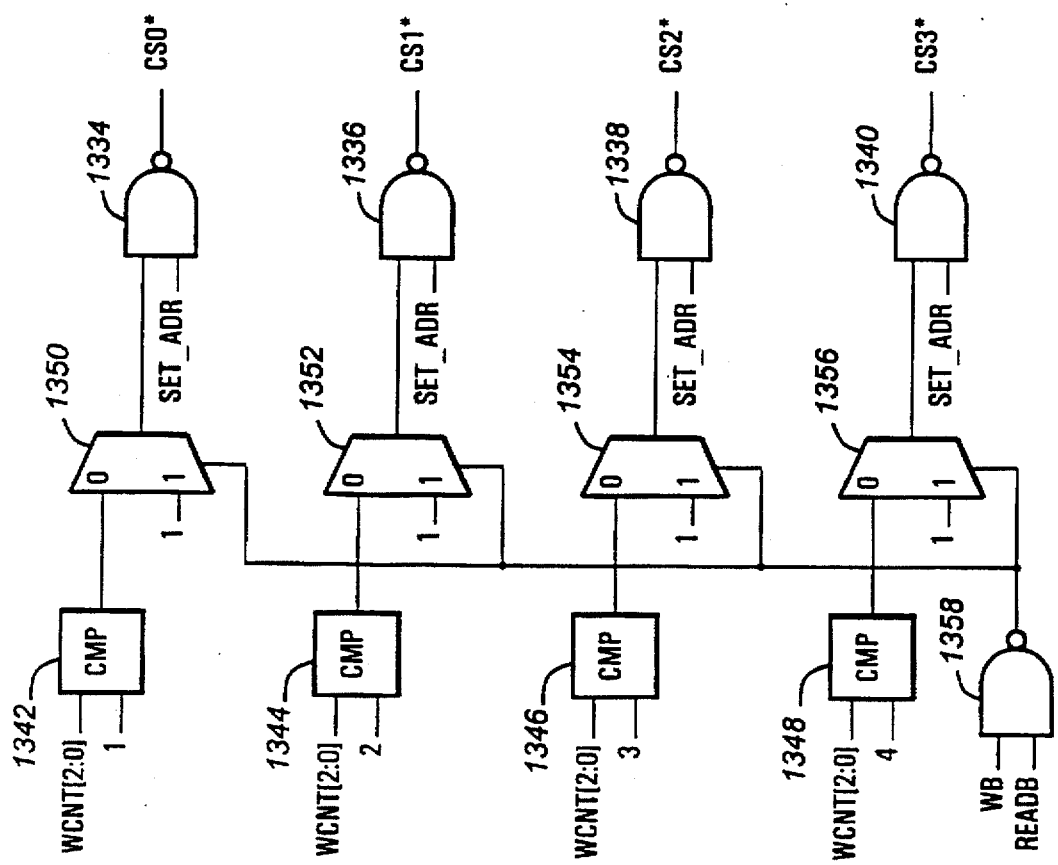

Referring now to FIGS. 13A and 13B, logic used to interface with signals provided by and to the state machines RWSTATE and RWBYTE is shown. The ready signal RY from the flash EEPROMs 144 or 146 is provided to the D input of a D flip-flop 1302. The output of the D flip-flop 1302 is connected to the D input of a D flip-flop 1304, whose output is connected to the signal RY1 provided to the state machine RWSTATE. The D flip-flops 1302 and 1304 are clocked on the rising edge of CLK14M and reset on the rising edge of the signal RESET.

The signal WB_W is connected to the D input of a D flip-flop 1306, which is clocked by CLK14M. The output of the D flip-flop 1306 is connected to the signal WB. The output state signals RWSTATE_D[2:0] from the state machine RWSTATE are provided to the input of a register 1308, which is clocked by the rising edge of CLK14M. The output of the register 1308 is connected to state signals RWSTATE[2:0]. The signal VPP_SW_W is latched into a D flip-flop 1310 on the rising edge the clock CLK14M. The output of the D flip-flop 1310 is connected to the signal VPP_SW. The D flip-flops 1306, 1308 and 1310 are all reset low by the system reset signal RESET.

The output state signals RWBYTE_D[2:0] from the state machine RWBYTE are latched into a register 1312 on the rising edge of the clock CLK14M. The output of the register 1312 is connected to the signals RWBYTE[2:0]. The signals SET_ADR_W, SET_DATA_W, SET_OE_W, SET_WE_W and SR_W are provided to the D inputs of D flip-flops 1314, 1316, 1318, 1320 and 1322, respectively. All the D flip-flops 1314–1322 are clocked on the rising edge of CLK14M and reset by the signal RESET. The outputs of the D flip-flops 1314–1322 provide signals SET_ADR, SD_EN, SET_OE, SET_WE and SR, respectively. The signal SET_ADR is connected to the input of a buffer 1324, which drives an address enable signal AD_EN. The address enable signal AD_EN is provided to the enable input of a tristate buffer 1326, whose input is connected to address signals AD_OUT[20:1]. When the signal AD_EN is asserted high, the contents of the signals AD_OUT[20:1] are driven onto the system bus SA[20:1].

The signal SD_EN is provided to the enable input of a tristate buffer 1328, whose input is connected to signals SD_OUT[15:0], which represent data latched from the parallel port data bus PD[7:0] that are to be provided to the system data bus SD[15:0]. When the signal SD_EN is asserted high, the contents of the signals SD_OUT[15:0] are driven onto the system data bus SD[15:0]. The signal SET_OE drives the input of an inverter 1330, whose output is connected to the output enable signal MEMRD, provided to the output enable inputs of the flash EEPROMs 144 or 146. The signal SET_WE drives an inverter 1332, whose output is connected to the write signal MEMWR* provided to the write enable inputs of the flash EEPROMs 144 or 146.

In FIG. 13B, the signal SET_ADR is connected to one input of each of NAND gates 1334, 1336, 1338 and 1340, which provide the flash chip select signals CS0*, CS1*, CS2*, and CS3*, respectively. Each of the other inputs of the NAND gates 1334–1340 are connected to the output of multiplexors 1350, 1352, 1354 and 1356, respectively. The 0 input of the multiplexor 1350 is connected to the output of a comparator 1342, which compares the value of the word counter signals WCNT[2:0] with the value 1. The 0 input of the multiplexor 1352 is connected to the output of a comparator 1344, which compares the value of the signals WCNT[2:0] with the value 2. The 0 input of the multiplexor 1354 is connected to the output of a comparator 1346, which compares the value of the signals WCNT[2:0] with the value 3. The 0 input of the multiplexor 1356 is connected to the output of a comparator 1348, which compares the value of the signals WCNT[2:0] with the value 4. Each of the 1 inputs of the multiplexors 1350–1356 are tied high. The select inputs of the multiplexors 1350–1356 are connected to the output of an AND gate 1358, whose inputs are connected to the signals WB and READB. As noted above, the signals CS0*–CS3* correspond to banks 0–3, respectively, of the flash EEPROMs 144 and 146. Thus, during the command write phase for the read array operation, the chip select signals CS0*–CS3* are all asserted low. Otherwise, the value of the word counter signals WCNT[2:0] determine which of the signals CS0*–CS3* is asserted low when the address enable signal SET_ADR is asserted high.

Figure 14A:
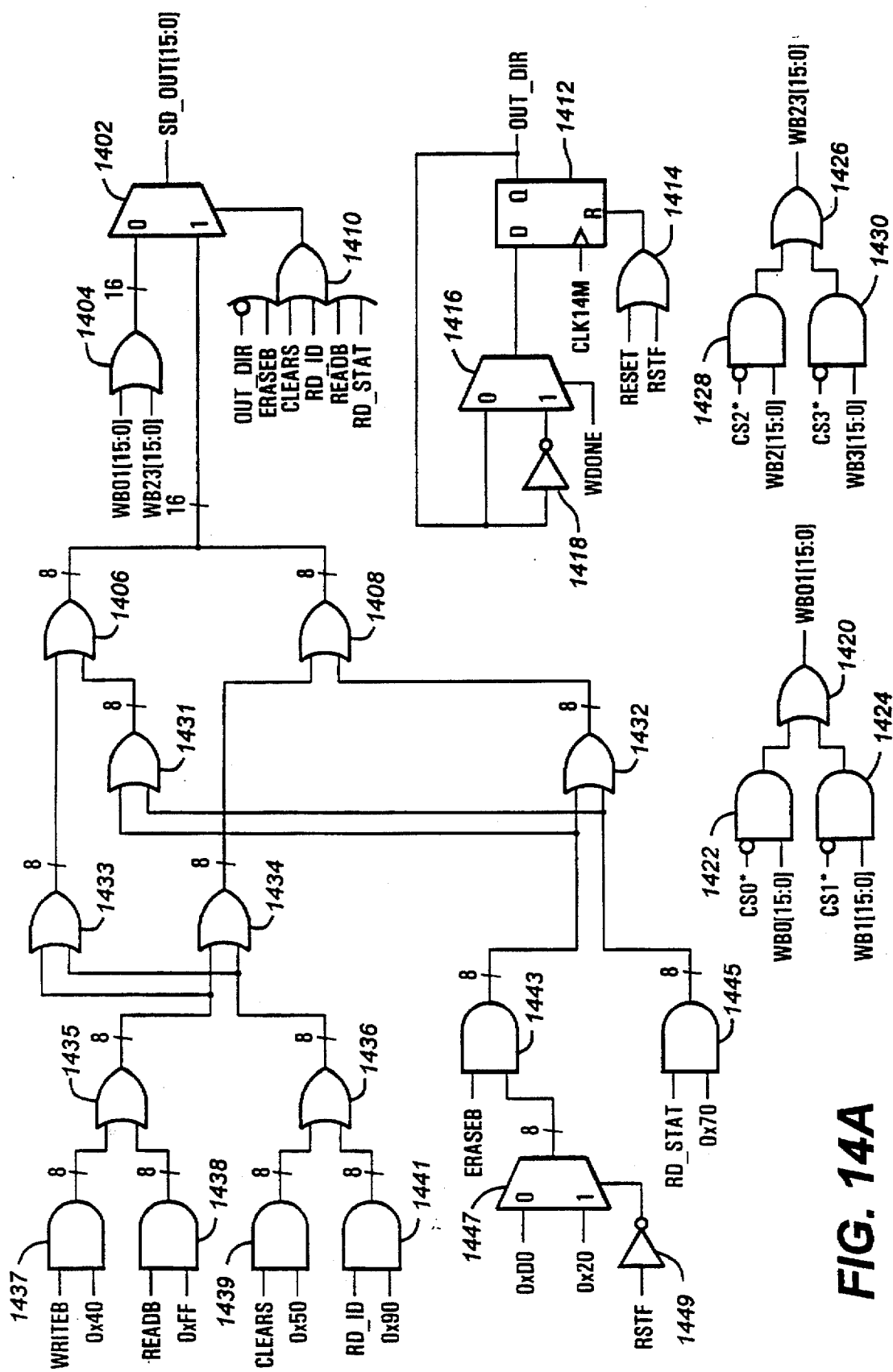
FIGS. 14A and 14B are a logic diagram of a multiplexor selecting the proper data signals to be provided to the system bus of the computer system of FIG. 1.
Figure 14B:
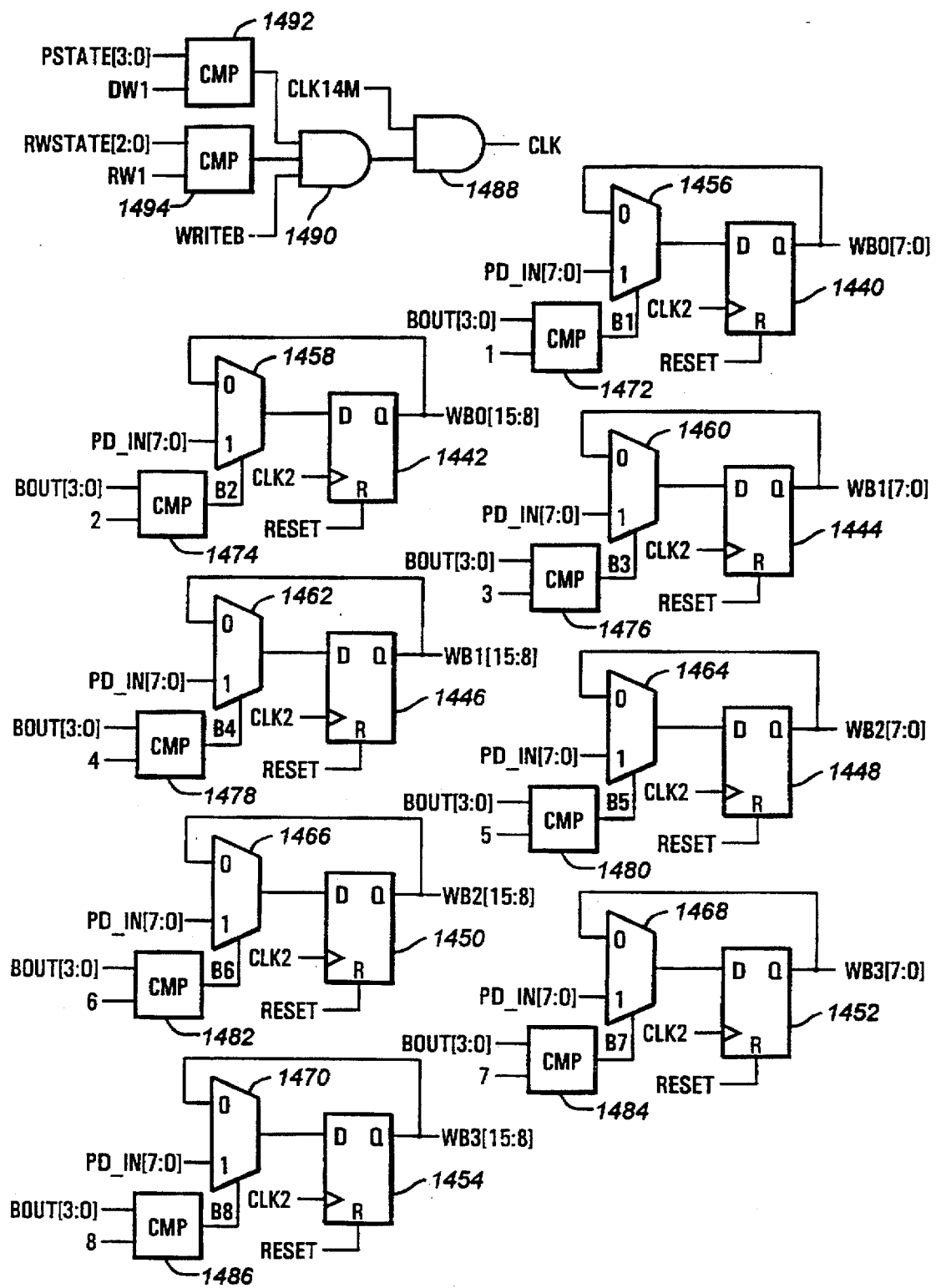

Referring now to FIGS. 14A and 14B, logic used to generate signals SD_OUT[15:0], which are provided to the system data bus SD[15:0], is shown. The signals SD_OUT [15:0] are provided by a multiplexor 1402, whose 0 input is connected to the output of an OR gate 1404 and whose 1 input is connected to the concatenated outputs of OR gates 1406 and 1408. The OR gate 1406 provides the 8 most significant bits and the OR gate 1408 provides the 8 least significant bits to the 1 input of the multiplexor 1402. The OR gate 1404 receives multiplexed signals of the parallel port data bus PD[7:0], while the OR gates 1406 and 1408 receive the multiplexed signals of the command addresses. The select input of the multiplexor 1402 is connected to the output of an OR gate 1410, whose inputs are connected to the inverted state of a signal OUT_DIR and to the signals ERASEB, CLEARS, RD_ID, READB and RD_STAT.

The signal OUT_DIR is provided by a D flip-flop 1412, whose D input is connected to the output of a multiplexor 1416. The 0 input of the multiplexor 1416 is connected to the signal OUT_DIR and the 1 input is connected to the output of an inverter 1418, whose input is connected to the signal OUT_DIR. The select input of the multiplexor 1416 is connected to the signal WDONE. Thus, whenever the state machine RWBYTE reaches state X6 with the signal WB asserted high, which causes the signal WDONE to be asserted high, the state of the D flip-flop 1412 is toggled on the rising edge of the clock CLK14M. The reset signal of the D flip-flop 1412 is connected to the output of an OR gate 1414, whose inputs are connected to the signals RESET and RSTF. Thus, the initial data provided to the signals SD_OUT[15:0] are the command addresses. If a write cycle is requested, as indicated by all the signals ERASEB, CLEARS, RD_ID, READB, and RD STAT being deasserted low, then the signal OUT_DIR switches the multiplexor 1402 to receive signals from the parallel port data bus PD[7:0] after the initial command sequence.

The first input of the OR gate 1404 is connected to the output of an OR gate 1420, and the second input of the OR gate 1404 is connected to the output of an OR gate 1426. The first input of the OR gate 1420 is connected to the output of an AND gate 1422, which is enabled by the inverted state of the signal CS0*. The other input of the AND gate 1422 is connected to signals WB0[15:0]. The second input of the OR gate 1420 is connected to the output of an AND gate 1424, which is enabled by the inverted state of the signal CS1*. The other input of the AND gate 1424 is connected to signals WB1[15:0].

The first input of the OR gate 1426 is connected to the output of an AND gate 1428, which is enabled by the inverted state of the signal CS2*. The other input of the AND gate 1428 is connected to signals WB2[15:0]. The second input of the OR gate 1426 is connected to the output of an AND gate 1430, which is enabled by the inverted state of the signal CS3*. The other input of the AND gate 1430 is connected to signals WB3[15:0]. Thus the signals WB0[15:0], WB1[15:0], WB2[15:0] and WB3[15:0] are the write data for banks 0–3 of the flash EEPROMs 144 and 146, respectively. The AND gates 1422, 1424, 1428 and 1430 and the OR gates 1420, 1426 and 1404 form a multiplexor to select one of the words WB0[15:0], WB1[15:0], WB2[15:0], and WB3[15:0].

As noted above, the 1 input of the multiplexor 1402 is connected to the concatenated outputs of the OR gates 1406 and 1408. As the flash command address consists only of one byte of data, and the system data bus SD[15:0] is 16 bits wide, the OR gates 1406 and 1408 preferably provide identical addresses. Thus, the inputs of the OR gate 1408 are connected to the outputs of OR gates 1432 and 1434. The inputs of the OR gate 1406 are connected to the outputs of OR gates 1431 and 1433. The inputs of the OR gate 1433 are connected to the outputs of OR gates 1435 and 1436, as are the inputs of the OR gate 1434. The inputs of the OR gate 1431 are connected to the outputs of AND gates 1443 and 1445, as are the inputs of the OR gate 1432. The inputs of the OR gate 1435 are connected to the outputs of AND gates 1437 ad 1438. The inputs of the OR gate 1436 are connected to the outputs of AND gates 1439 and 1441.

The inputs of the AND gate 1437 are connected to the signal WRITEB and the value 0×40. The inputs of the AND gate 1438 are connected to the signal READB and the value 0×FF. The inputs of the AND gate 1439 are connected to the signal CLEARS and the value 0×50. The inputs of the AND gate 1441 are connected to the signal RD_ID and the value 0×90.

The inputs of the AND gate 1443 are connected to the signal ERASEB and the output of a multiplexor 1447, whose select input is connected to the output of an inverter 1449. The inverter 1449 is driven by the signal RSTF. The 0 input of the multiplexor 1447 is connected to the value 0×D0, and its 1 input is connected to the value 0×20. For the first cycle of the command sequence of a block erase command, the signal RSTF is deasserted low. As a result, the value 0×20 is selected. For the second cycle, the signal RSTF is asserted high, thereby causing the value 0×D0 to be selected. The inputs of the AND gate 1445 are connected to the signal RD_STAT and the value 0×70.

Thus, depending upon which command is selected, the appropriate value is multiplexed and provided to the signals SD_OUT[15:0].

Referring now to FIG. 14B, logic used to generate the signals WB0[15:0], WB1[15:0], WB2[15:0] and WB3[15:0] is shown. The signals WB0[7:0], WB0[15:8], WB1[7:0], WB1[15:8], WB2[7:0], WB2[15:8], WB3[7:0]and WB3 [15:8] are provided by registers 1440, 1442, 1444, 1446, 1448, 1450, 1452 and 1454, respectively. The inputs of the registers 1440–1454 are connected to outputs of multiplexors 1456, 1458, 1460, 1462, 1464, 1466, 1468 and 1470, respectively. Each of the 1 inputs of the multiplexors 1456–1470 is connected to the latched data inputs PD_IN [7:0]. The select inputs of the multiplexors 1456–1470 are connected to the outputs of comparators 1472, 1474, 1476, 1478, 1480, 1482, 1484 and 1486, respectively. The comparator 1472 compares the byte counter signals BCNT[3:0] with the value 1. The other comparators 1474–1486 compares the value of the signals BCNT[3:0] with the values 2, 3, 4, 5, 6, 7 and 8, respectively. The 0 inputs of the multiplexors 1456–1470 are connected to the outputs of the registers 1440–1454, respectively. Thus, if one of the comparators 1472–1486 determines that a match has occurred, then the contents of the latched data inputs PD_IN[7:0] are loaded into the appropriate one of the registers 1440–1454. Otherwise, the contents of the registers 1440–1454 remain unchanged. The clock inputs to the registers 1440–1454 are connected to the output of an AND gate 1488, whose inputs are connected to the clock CLK14M and the output of an AND gate 1490. The inputs of the AND gate 1490 are connected to the output of a comparator 1492, the output of a comparator 1494 and the signal WRITEB. The comparator 1492 determines if the state machine PSTATE is in state DW1, which indicates a data write cycle, and the comparator 1494 determines if the state machine RWSTATE is in state RW1, which indicates that a command from the host computer has been recognized. Thus, if the state machine PSTATE is in state DW1, the state machine RWSTATE is in state RW1, and a write operation is occurring, then the contents of the latched data inputs PD_IN[7:0] are latched into the appropriate one of the registers 1440–1454. The data enable signal SD_EN provided by the D flip-flop 1316 in FIG. 13A determines when the latched data signals are driven onto the system data bus SD[15:0].

Figure 15A:
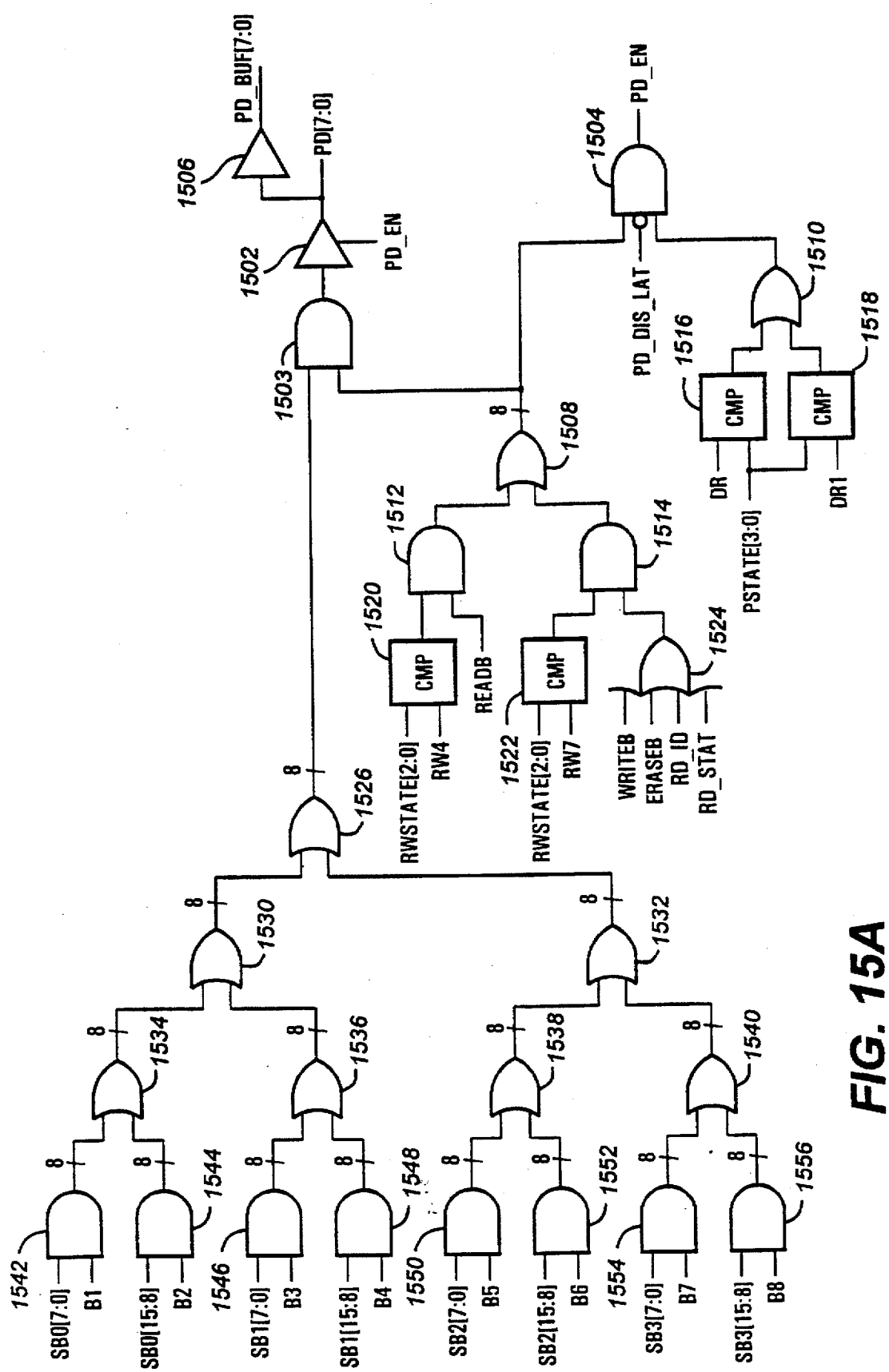
FIGS. 15A and 15B are a logic diagram of a multiplexor selecting the proper output byte to be provided to the parallel port of the computer system of FIG. 1.
Figure 15B:
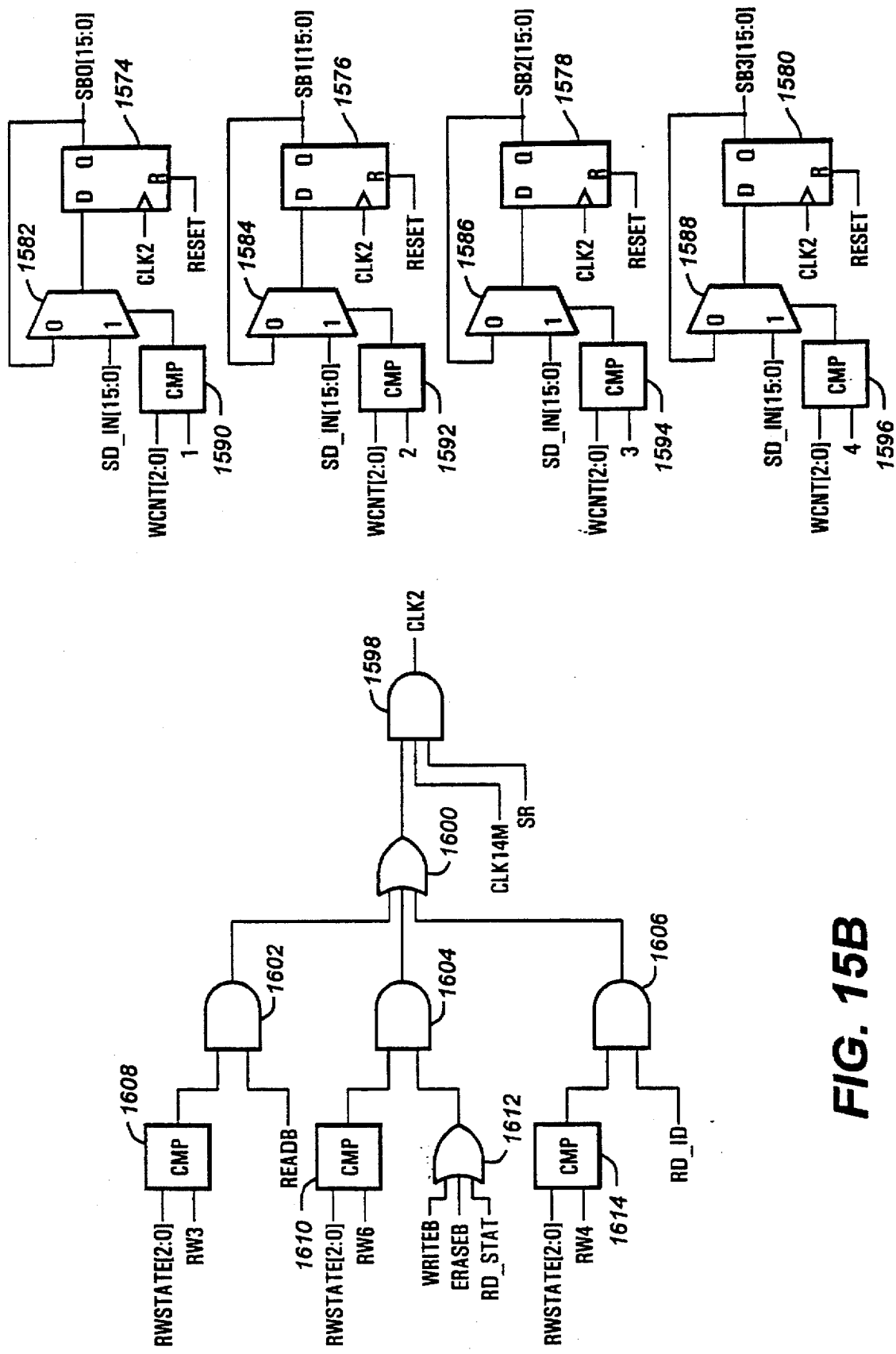

Referring now to FIGS. 15A and 15B, logic used to latch in the read data from the system data bus SD[15:0] is shown. The parallel port data bus PD[7:0] is driven by a tristate buffer 1502, whose input is connected to the output of an AND gate 1503. The enable input of the tristate buffer 1502 is connected to a signal PD_EN, which is provided by a three-input AND gate 1504. The parallel port data bus PD[7:0] is also connected to the input of a buffer 1506, which drives the input signals PD BUF[7:0].

The inputs of the AND gate 1504 are connected to the output of an OR gate 1508, the output of an OR gate 1510 and the inverted state of the signal PD_DIS_LAT. If the parallel port 124 is disabled, as indicated by the signal PD_DIS_LAT being asserted high, the tristate buffer 1502 cannot be enabled. The inputs of the OR gate 1510 are connected to the output of a comparator 1516 and a comparator 1518. The comparator 1516 determines if the state machine PSTATE is in state DR, which indicates a data read cycle, and the comparator 1518 determines if the state machine PSTATE is in state DR1. As noted above, the state machine PSTATE transitions to state DR1 from state DR in a data read cycle after the host has acknowledged that the parallel port data bus PD[7:0] contains valid data.

The inputs of the OR gate 1508 are connected to the output of an AND gate 1512 and an AND gate 1514. The inputs of the AND gate 1512 are connected to the output of a comparator 1520 and to the signal READB. The comparator 1520 determines if the state machine RWSTATE is in state RW4, which indicates for a read array command that data is being transferred to the host computer. The inputs of the AND gate 1514 are connected to the output of a comparator 1522 and the output of an OR gate 1524. The comparator 1522 determines if the state machine RWSTATE is in state RW7. The inputs of the OR gate 1524 are connected to signals WRITEB, ERASEB, RD_ID and RD_STAT. If the state machine RWSTATE is in state RW7 and a write, block erase, read ID or read status register operation is occurring, then the OR gate 1508 outputs a high to the input of the AND gate 1504. Thus, the tristate buffer 1502 is enabled during the data transfer stage of a read array operation, or during the status register read stage of a write or block erase operation, or during the output phase of a read ID or read status register operation.

The inputs of the AND gate 1503 are connected to the output of an OR gate 1526 and the output of the OR gate 1508. The inputs of the OR gate 1526 are connected to the output of an OR gate 1530 and an OR gate 1532. The inputs of the OR gate 1530 are connected to the outputs of OR gates 1534 and 1536, and the inputs of the OR gate 1532 are connected to the outputs of OR gates 1538 and 1540. The inputs of the OR gate 1534 are connected to the outputs of AND gates 1542 and 1544. The inputs of the OR gate 1536 are connected to the outputs of AND gates 1546 and 1548. The inputs of the OR gate 1538 are connected to outputs of AND gates 1550 and 1552. The inputs of the OR gate 1540 are connected to the outputs of AND gates 1554 and 1556.

The first inputs of the AND gates 1542–1556 are connected to signals SB0[7:0], SB0[15:8], SB1[7:0], SB1[15:8], SB2[7:0], SB2[15:8], SB3[7:0]and SB3[15:8], respectively. The second inputs of the AND gates 1542–1556 are connected to the outputs of the comparators 1472, 1474, 1476, 1478, 1480, 1482, 1484, and 1486, respectively. The comparators 1472–1486 compare the value of the byte counter signals BCNT[2:0]with the values 1, 2, 3, 4, 5, 6, 7 and 8, respectively. The AND gates 1542–1556 and the OR gates 1526, 1530, 1532 and 1534–1540 form an effective multiplexor to route the appropriate byte to the parallel port data bus PD[7:0].

The signals SB0[15:0], SB1[15:0], SB2[15:0], and SB3[15:0] are provided by registers 1574, 1576, 1578 and 1580, respectively. The inputs of the registers 1574–1580 are connected to the outputs of multiplexors 1582, 1584, 1586 and 1588, respectively. The 1 inputs of the multiplexors 1582–1588 are connected to the system data inputs SD_IN[15:0]. The select inputs of the multiplexors 1582–1588 are connected to the outputs of comparators 1590, 1592, 1594 and 1596, respectively. The 0 inputs of the multiplexors 1582–1588 are connected to the output of the registers 1574–1580, respectively. The registers 1574–1580 are reset by the signal RESET and are clocked by the output of an AND gate 1598.

The inputs of the AND gate 1598 are connected to the output of an OR gate 1600, the clock CLK14M and the signal SR. The inputs of the OR gate 1600 are connected to the outputs of AND gates 1602, 1604 and 1606. The inputs of the AND gate 1602 are connected to the output of a comparator 1608 and to the signal READB. The comparator 1608 determines if the state machine RWSTATE is in state RW3. The inputs of the AND gate 1604 are connected to the output of a comparator 1610 and the output of an OR gate 1612. The comparator 1610 determines if the state machine RWSTATE is in state RW6, and the inputs of the OR gate 1612 are connected to the signals WRITEB, ERASEB and RD_STAT. The inputs of the AND gates 1606 are connected to the output of a comparator 1614 and to the signal RD_ID. The comparator 1614 determines if the state machine RWSTATE is in state RW4.

The OR gate 1600 outputs a high value if one of three conditions is true: a read array operation is performed and the state machine RWSTATE is in state RW3, indicating that data is being read from the flash EEPROMs 144 or 146; a write, block erase or read status register operation is being performed and the state machine RWSTATE is in state RW6, which indicates the read of the status register in the flash EEPROMs 144 or 146 is occurring; or if a read ID operation is being performed and the state machine RWSTATE is in state RW4, indicating that the ID is valid on the system data bus SD[15:0]. Thus, for any one of the above-conditions, if the signal SR is asserted high, then the state of the system data bus SD[15:0] is latched into the appropriate one of the registers 1574–1580 on the rising edge of the clock CLK14M. The signal SR indicates that the read of the flash EEPROMs 144 or 146 has produced valid output data. The output of the appropriate one of the registers 1574–1580 is then provided to the parallel port data bus PD[7:0] if the tristate buffer 1502 is enabled.

The foregoing has described a controller circuit that controls the transfer of a computer operating system from a host computer into a hand-held computer system through the parallel port without the need of intervention from the microprocessor. The operating system is loaded into flash memory devices located in the hand-held computer. The protocol used for the transfer is the IEEE 1284 bi-directional parallel port standard. To begin the transfer of data, the host computer performs a negotiation according to the 1284 standard with the hand-held computer. After the host computer has determined that the hand-held computer is 1284 compliant, it embeds two flash command bytes to indicate the type of command to be performed, selects the desired banks of flash memory, and selects the block in the flash memory. The commands that are performed include a write, a read array, a block erase, a read ID, a read status register, a clear status register, and a parallel port disable command. The controller circuit performs handshaking functions through the parallel port with the host computer, and it seizes control of the system data bus when a transfer is desired.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method of loading data provided by an external computer into a memory device located in a computer system having a microprocessor, a parallel port and a system bus, wherein the external data is loaded into the memory device without intervention by the microprocessor, wherein a circuit and the memory device are coupled to the system bus, and wherein the external data is provided to the computer system through the parallel port, the method comprising the steps of:

receiving command signals from the parallel port, wherein said command signals include information representing one of a plurality of commands, and wherein one of said plurality of commands is a memory write command;

decoding said command signals to determine if said memory write command is asserted;

obtaining control of the system bus when said memory write command is decoded;

receiving the external data from the parallel port; and writing the external data into the memory device when control of the system bus has been obtained.

2. The method of claim 1, wherein the memory device includes a status register containing a status bit to indicate if an error occurred during said writing of the external data into the memory device, and wherein said write error status bit is provided to the system bus, the method further comprising the steps of:

receiving said write error status bit; and providing said write error status bit to the parallel port, wherein said write error status bit is read by the external computer.

3. The method of claim 2, wherein the parallel port includes a data bus portion and a status signals portion, and wherein said write error status bit is provided to said data bus portion.

4. The method of claim 3, wherein said plurality of commands include a parallel port disable command, the method further comprising the steps of:

decoding said command signals to determine if said parallel port disable command is asserted;

disabling said parallel port data bus portion when said parallel port disable command is decoded; and providing said write error status bit to said parallel port status signals portion when said parallel port disable command is decoded.

5. The method of claim 1, wherein the external data include an operating system program for the computer system.

6. The method of claim 1, wherein said command signals further include an address representing the location of the memory device to which the write command is to be performed.

7. The method of claim 6, wherein said address provided by said command signals forms the starting address in the memory device, and wherein address signal inputs of the memory device are provided by an address counter, the method further comprising the steps of:

latching in said address, wherein said address forms the starting count value of said address counter; and incrementing said address counter upon completion of said writing of the external data into the memory device.

8. The method of claim 1, wherein the memory device is a non-volatile memory device.

9. The method of claim 1, wherein the transfer of data through the parallel port between the circuit and the external computer is according to IEEE 1284 Specification cycles, one of said IEEE 1284 Specification cycles being a negotiation cycle, and wherein the external computer provides said command signals during said negotiation cycle.

10. The method of claim 9, wherein an Enhanced Parallel Port communications mode is requested by the external computer during said negotiation cycle by providing a predetermined extensibility value to the parallel port, the method further comprising the steps of:

receiving said predetermined extensibility value; and asserting a signal indicating that said Enhanced Parallel Port communications mode has been selected when said predetermined extensibility value is received.

11. The method of claim 10, wherein the parallel port includes a data bus portion and a status signals portion, and wherein said predetermined extensibility value is placed on said data bus portion.

12. The method of claim 11, further comprising the steps of:

asserting a predetermined number of status signals in said status signals portion in response to said predetermined extensibility value, wherein the external computer provides a second value to the parallel port after said predetermined number of status signals are asserted, said second value indicating that said command signals are being provided by the external computer.

13. The method of claim 12, wherein said second value is placed on said data bus portion.

14. A circuit for loading data provided by an external computer into a memory device located in a computer system having a microprocessor, a parallel port and a system bus, wherein the external data is loaded into the memory device without intervention by the microprocessor, wherein the circuit and the memory device are coupled to the system bus, and wherein the external data is provided to the computer system through the parallel port, the circuit comprising:

a command receiver coupled to the parallel port for receiving command signals from the parallel port, wherein said command signals include information representing one of a plurality of commands, and wherein one of said plurality of commands is a memory write command;

a decoder coupled to said command receiver fur decoding said command signals to determine if said memory write command is asserted;

a bus controller coupled to said decoder for obtaining control of the system bus when said memory write command is decoded;

a data receiver coupled to the parallel port for receiving the external data from the parallel port; and a memory controller coupled to the system bus, said controller bus, and said data receiver for writing the external data into the memory device when control of the system bus has been obtained.

15. The circuit of claim 14, wherein the memory device includes a status register containing a status bit to indicate if an error occurred during said writing of the external data into the memory device, and wherein said write error status bit is provided to the system bus, the circuit further comprising:

a status error bit receiver coupled to the system bus for receiving said write error status bit; and a parallel port write generator coupled to said error status bit receiver for providing said write error status bit to the parallel port, wherein said write error status bit receiver is read by the external computer.

16. The circuit of claim 15, wherein the parallel port includes a data bus portion and a status signals portion, and wherein said write error status bit is provided to said data bus portion.

17. The circuit of claim 16, wherein said plurality of commands include a parallel port disable command, the circuit further comprising:

a disabler command decoder coupled to said command receiver for decoding said command signals to determine if said parallel port disable command is asserted;

a disabler coupled to said disable command decoder for disabling said parallel port data bus portion when said parallel port disable command is decoded; and a write error status bit operator coupled to said disable command decoder for providing said write error status bit to said parallel port status signals portion when said parallel port disable command is decoded.

18. The circuit of claim 14, wherein the external data include an operating system program for the computer system.

19. The circuit of claim 14, wherein said command signals further include an address representing the location of the memory device to which the write command is to be performed.

20. The circuit of claim 19, wherein said address provided by said command signals forms the starting address in the memory device, the circuit further comprising:

an address counter coupled to said command receiver for latching in said address, wherein said address forms the starting count value of said address counter, and wherein said address counter provides address signals to tile memory device; and an incrementer connected to said address counter for incrementing said address counter upon completion of said writing of the external data into the memory device.

21. The circuit of claim 14, wherein the memory device is organized as a plurality of banks, the circuit further comprising:

a byte counter coupled to said command signals receiver for providing a signal indicating when an appropriate number of bytes have been transferred through the parallel port, said appropriate number of bytes dependent upon the number of banks of the memory device selected.

22. The circuit of claim 21, further comprising:

a word counter coupled to said memory controller for providing a signal indicating when an appropriate number of words have been transferred over the system bus, said appropriate number of words dependent upon the number off banks of the memory device selected.

23. The circuit of claim 14, wherein the memory device is a non-volatile memory device.

24. The circuit of claim 14, wherein the transfer of data through the parallel port between the circuit and the external computer is according to IEEE 1284 Specification cycles, one of said IEEE 1284 Specification cycles being a negotiation cycle, and wherein the external computer provides said command signals during said negotiation cycle.

25. The circuit of claim 24, wherein an Enhanced Parallel Port communications mode is requested by the external computer during said negotiation cycle by providing a predetermined extensibility value to the parallel port the circuit further comprising:

an extensibility receiver coupled to the parallel poll for receiving said predetermined extensibility value; and a generator coupled to said extensibility receiver for asserting a signal indicating that said Enhanced Parallel Port communications mode has been selected when said extensibility value is received.

26. The circuit of claim 25, wherein the parallel port includes a data bus portion and a status signals potion, and wherein said predetermined extensibility value is placed on said data bus portion.

27. The circuit of claim 26, further comprising:

a status generator coupled to the parallel port for asserting a predetermined number of status signals in said status signals portion to indicate that the circuit has responded to said predetermined extensibility value, wherein the external computer provides a second value to the parallel port after assertion of said predetermined number of status signals, said second value indicating that said command signals are being provided by the external computer.

28. The circuit of claim 27, wherein said second value is placed on said data bus potion.

29. The circuit of claim 14, wherein the computer system is a hand-held computer system.

30. The circuit of claim 29, wherein the memory device is a non-volatile memory device.

31. The circuit of claim 30, wherein the external data include an operating system program for the hand-held computer system.

* * * * *

UNITED STATES PATENT AND TRADEMARK OFFICE
CERTIFICATE OF CORRECTION

PATENT NO. : 5,729,683
DATED : MARCH 17, 1998
INVENTOR(S) : HUNG QUANG LE; PATRICK R. COOPER

It is certified that error appears in the above-identified patent and that said Letters Patent is hereby corrected as shown below:

In column 40, line 60, claim 20, please delete "tile" and insert therefor --the--.

In column 41, line 12, claim 22, please delete "off" and insert therefor --of--.

In column 42, line 4, claim 26, please delete "potion" and insert therefor --portion--.

In column 42, line 20, claim 28, please delete "potion" and insert therefor --portion--.

Signed and Sealed this

Nineteenth Day of May, 1998

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,729,683
DATED : March 17, 1998
INVENTOR(S) : Hung Quang Le et al.

It is certified that error appears in the above-identified patent and that said Letters Patent is hereby corrected as shown below:

<u>Column 40,</u>
Line 5, delete "fur" and insert -- for --.

<u>Column 41,</u>
Line 24, after "port" insert -- , --.
Line 26, delete "poll" and insert -- port --.

Signed and Sealed this

Seventeenth Day of January, 2006

JON W. DUDAS
*Director of the United States Patent and Trademark Office*